US011644015B2

(12) United States Patent
Bodishbaugh et al.

(10) Patent No.: US 11,644,015 B2
(45) Date of Patent: May 9, 2023

(54) SYSTEMS AND METHODS FOR GENERATION OF ELECTRICAL POWER AT A DRILLING RIG

(71) Applicant: ICE Thermal Harvesting, LLC, Houston, TX (US)

(72) Inventors: Adrian Benjamin Bodishbaugh, Houston, TX (US); Carrie Jeanne Murtland, Houston, TX (US)

(73) Assignee: ICE Thermal Harvesting, LLC, Houston, TX (US)

(*) Notice: Subject to any disclaimer, the term of this patent is extended or adjusted under 35 U.S.C. 154(b) by 0 days.

(21) Appl. No.: 17/657,009

(22) Filed: Mar. 29, 2022

(65) Prior Publication Data

US 2022/0316453 A1    Oct. 6, 2022

Related U.S. Application Data

(63) Continuation-in-part of application No. 17/682,126, filed on Feb. 28, 2022, now Pat. No. 11,359,612, and
(Continued)

(51) Int. Cl.
*F03G 7/04* (2006.01)
*E21B 47/07* (2012.01)
(Continued)

(52) U.S. Cl.
CPC ............ *F03G 7/045* (2021.08); *E21B 34/025* (2020.05); *E21B 34/066* (2013.01); *E21B 36/00* (2013.01); *E21B 41/0085* (2013.01); *E21B 47/07* (2020.05); *F01K 11/02* (2013.01); *F01K 17/02* (2013.01); *F01K 25/08* (2013.01);
(Continued)

(58) Field of Classification Search
CPC ....................... F03G 7/04–45; F03G 4/00–074
See application file for complete search history.

(56) References Cited

U.S. PATENT DOCUMENTS 3,517,208 A    6/1970    Williams et al.
3,757,516 A    9/1973    McCabe
(Continued)

FOREIGN PATENT DOCUMENTS

AU    2007204830 A1    7/2007
AU    2009238733 B2    8/2013
(Continued)

OTHER PUBLICATIONS

International Search Report and Written Opinion for PCT/US2022/071472, dated May 9, 2022.
(Continued)

*Primary Examiner* — Laert Dounis
(74) *Attorney, Agent, or Firm* — Womble Bond Dickinson (US) LLP

(57) ABSTRACT

Embodiments of systems and methods for generating power in the vicinity of a drilling rig are disclosed. During a drilling operation, heat generated by drilling fluid flowing from a borehole, exhaust from an engine, and/or fluid from an engine's water (or other fluid) jacket, for example, may be utilized by corresponding heat exchangers to facilitate heat transfer to a working fluid. The heated working fluid may cause an ORC unit to generate electrical power.

22 Claims, 17 Drawing Sheets

Related U.S. Application Data a continuation-in-part of application No. 17/670,827, filed on Feb. 14, 2022, now Pat. No. 11,421,663, and a continuation-in-part of application No. 17/650,811, filed on Feb. 11, 2022, now Pat. No. 11,578,706, and a continuation-in-part of application No. 17/578,550, filed on Jan. 19, 2022, and a continuation-in-part of application No. 17/578,528, filed on Jan. 19, 2022, now Pat. No. 11,480,074, and a continuation-in-part of application No. 17/578,520, filed on Jan. 19, 2022, now Pat. No. 11,326,550, and a continuation-in-part of application No. 17/578,542, filed on Jan. 19, 2022, now Pat. No. 11,359,576, said application No. 17/682,126 is a continuation of application No. 17/494,936, filed on Oct. 6, 2021, now Pat. No. 11,293,414, said application No. 17/670,827 is a continuation-in-part of application No. 17/305,296, filed on Jul. 2, 2021, now Pat. No. 11,255,315, said application No. 17/494,936 is a continuation-in-part of application No. 17/305,296, filed on Jul. 2, 2021, now Pat. No. 11,255,315, said application No. 17/650,811 is a continuation of application No. 17/305,298, filed on Jul. 2, 2021, now Pat. No. 11,280,322, application No. 17/657,009 is a continuation-in-part of application No. 17/305,297, filed on Jul. 2, 2021.

(60) Provisional application No. 63/269,862, filed on Mar. 24, 2022, provisional application No. 63/269,572, filed on Mar. 18, 2022, provisional application No. 63/261,601, filed on Sep. 24, 2021, provisional application No. 63/200,908, filed on Apr. 2, 2021.

(51) Int. Cl.
| | | |
|---|---|---|
| *E21B 34/06* | (2006.01) | |
| *E21B 41/00* | (2006.01) | |
| *F01K 25/08* | (2006.01) | |
| *F03G 4/00* | (2006.01) | |
| *F03G 4/06* | (2006.01) | |
| *E21B 36/00* | (2006.01) | |
| *F01K 11/02* | (2006.01) | |
| *F01K 17/02* | (2006.01) | |
| *E21B 34/02* | (2006.01) | |

(52) U.S. Cl.
CPC ............. *F03G 4/023* (2021.08); *F03G 4/035* (2021.08); *F03G 4/06* (2021.08); *F03G 4/072* (2021.08)

(56) References Cited

U.S. PATENT DOCUMENTS

| | | | |
|---|---|---|---|
| 3,808,794 A | 5/1974 | Wood | |
| 3,875,749 A | 4/1975 | Baciu | |
| 3,908,381 A | 9/1975 | Barber et al. | |
| 3,988,895 A | 11/1976 | Sheinbaum | |
| 4,063,417 A | 12/1977 | Shields | |
| 4,079,590 A | 3/1978 | Sheinbaum | |
| 4,112,687 A | 9/1978 | Dixon | |
| 4,112,745 A | 9/1978 | McCabe | |
| 4,149,385 A | 4/1979 | Sheinbaum | |
| 4,157,730 A | 6/1979 | Despois et al. | |
| 4,224,796 A | 9/1980 | Stiel et al. | |
| 4,228,657 A | 10/1980 | Leo | |
| 4,356,401 A | 10/1982 | Santi | |
| 4,369,373 A | 1/1983 | Wiseman | |
| 4,484,446 A | 11/1984 | Goldsberry | |
| 4,542,625 A | 9/1985 | Bronicki | |
| 4,558,568 A | 12/1985 | Hoshino et al. | |
| 4,576,005 A | 3/1986 | Force | |
| 4,590,384 A | 5/1986 | Bronicki | |
| 4,982,568 A | 1/1991 | Kalina | |
| 4,996,846 A | 3/1991 | Bronicki | |
| 5,038,567 A | 8/1991 | Mortiz | |
| 5,117,908 A | 6/1992 | Hofmann | |
| 5,199,507 A * | 4/1993 | Westmoreland | E21B 19/084 173/147 |
| 5,311,741 A | 5/1994 | Blaize | |
| 5,421,157 A | 6/1995 | Rosenblatt | |
| 5,440,882 A | 8/1995 | Kalina | |
| 5,483,797 A | 1/1996 | Rigal et al. | |
| 5,497,624 A | 3/1996 | Amir et al. | |
| 5,517,822 A | 5/1996 | Haws et al. | |
| 5,526,646 A | 6/1996 | Bronicki et al. | |
| 5,555,731 A | 9/1996 | Rosenblatt | |
| 5,570,579 A | 11/1996 | Larjola | |
| 5,598,706 A | 2/1997 | Bronicki et al. | |
| 5,660,042 A | 8/1997 | Bronicki et al. | |
| 5,661,977 A | 9/1997 | Shnell | |
| 5,671,601 A | 9/1997 | Bronicki et al. | |
| 5,685,362 A | 11/1997 | Brown | |
| 5,816,048 A | 10/1998 | Bronicki et al. | |
| 5,839,282 A | 11/1998 | Bronicki et al. | |
| 5,860,279 A | 1/1999 | Bronicki et al. | |
| RE36,282 E | 8/1999 | Nitschke | |
| 5,970,714 A | 10/1999 | Bronicki et al. | |
| 5,974,804 A | 11/1999 | Sterling | |
| 6,212,890 B1 | 4/2001 | Amir | |
| 6,536,360 B2 | 3/2003 | O'Connor | |
| 6,585,047 B2 | 7/2003 | McClung | |
| 6,695,061 B2 | 2/2004 | Fripp et al. | |
| 6,724,687 B1 | 4/2004 | Stephenson et al. | |
| 6,853,798 B1 | 2/2005 | Weiss | |
| 6,857,268 B2 | 2/2005 | Stinger et al. | |
| 6,857,486 B2 | 2/2005 | Chitwood et al. | |
| 6,989,989 B2 | 1/2006 | Brasz et al. | |
| 7,096,665 B2 | 8/2006 | Stinger et al. | |
| 7,174,716 B2 | 2/2007 | Brasz et al. | |
| 7,224,080 B2 | 5/2007 | Smedstad | |
| 7,225,621 B2 | 6/2007 | Zimron et al. | |
| 7,234,314 B1 | 6/2007 | Wiggs | |
| 7,237,383 B2 | 7/2007 | Ahrens-Botzong et al. | |
| 7,254,949 B2 | 8/2007 | Brasz et al. | |
| 7,281,379 B2 | 10/2007 | Brasz | |
| 7,287,381 B1 | 10/2007 | Pierson et al. | |
| 7,289,325 B2 | 10/2007 | Brasz et al. | |
| 7,313,926 B2 | 1/2008 | Gurin | |
| 7,320,221 B2 | 1/2008 | Bronicki | |
| 7,334,410 B2 | 2/2008 | Creighton et al. | |
| 7,337,842 B2 | 3/2008 | Roddy et al. | |
| 7,353,653 B2 | 4/2008 | Bronicki | |
| 7,428,816 B2 | 9/2008 | Singh et al. | |
| 7,472,548 B2 | 1/2009 | Meksvanh | |
| 7,493,768 B2 | 2/2009 | Klaus et al. | |
| 7,753,122 B2 | 7/2010 | Curlett | |
| 7,823,386 B2 | 11/2010 | Zimron et al. | |
| 7,891,187 B2 | 2/2011 | Mohr | |
| 7,891,189 B2 | 2/2011 | Bottger et al. | |
| 7,900,450 B2 | 3/2011 | Gurin | |
| 7,934,383 B2 | 5/2011 | Gutierrez et al. | |
| 7,942,001 B2 | 5/2011 | Radcliff et al. | |
| 7,950,230 B2 | 5/2011 | Nishikawa et al. | |
| 8,046,999 B2 | 11/2011 | Doty | |
| 8,096,128 B2 | 1/2012 | Held et al. | |
| 8,099,198 B2 | 1/2012 | Gurin | |
| 8,146,360 B2 | 4/2012 | Myers et al. | |
| 8,166,761 B2 | 5/2012 | Moghtaderi et al. | |
| 8,193,659 B2 | 6/2012 | Bronicki et al. | |
| 8,272,217 B2 | 9/2012 | Lengert | |
| 8,309,498 B2 | 11/2012 | Funkhouser et al. | |
| 8,371,099 B2 | 2/2013 | Gutierrez et al. | |
| 8,381,523 B2 | 2/2013 | Zadok | |
| 8,430,166 B2 | 4/2013 | Danko | |
| 8,438,849 B2 | 5/2013 | Kaplan et al. | |
| 8,459,029 B2 | 6/2013 | Lehar | |
| 8,511,085 B2 | 8/2013 | Frey et al. | |
| 8,528,333 B2 | 9/2013 | Juchymenko | |
| 8,534,069 B2 | 9/2013 | Parrella | |

(56) References Cited

U.S. PATENT DOCUMENTS

| | | |
|---|---|---|
| 8,555,643 B2 | 10/2013 | Kalina |
| 8,555,912 B2 | 10/2013 | Woolley et al. |
| 8,572,970 B2 | 11/2013 | Matteson et al. |
| 8,578,714 B2 | 11/2013 | Nagurny et al. |
| 8,596,066 B2 | 12/2013 | Zimron et al. |
| 8,616,000 B2 | 12/2013 | Parrella |
| 8,616,001 B2 | 12/2013 | Held et al. |
| 8,616,323 B1 | 12/2013 | Gurin |
| 8,656,720 B1 | 2/2014 | Hardgrave |
| 8,667,799 B2 | 3/2014 | Batscha |
| 8,674,525 B2 | 3/2014 | Van den Bossche et al. |
| 8,680,704 B1 | 3/2014 | Rooney |
| 8,707,697 B2 | 4/2014 | Nitschke |
| 8,707,698 B2 | 4/2014 | Conry |
| 8,708,046 B2 | 4/2014 | Montgomery et al. |
| 8,720,563 B2 | 5/2014 | Joseph et al. |
| 8,752,382 B2 | 6/2014 | Lehar |
| 8,756,908 B2 | 6/2014 | Sheridan et al. |
| 8,771,603 B2 | 7/2014 | Harless et al. |
| 8,783,034 B2 | 7/2014 | Held |
| 8,791,054 B2 | 7/2014 | Deville |
| 8,820,075 B2 | 9/2014 | Kaminsky |
| 8,820,079 B2 | 9/2014 | Zyhowski et al. |
| 8,839,857 B2 | 9/2014 | Schultz et al. |
| 8,841,041 B2 | 9/2014 | Biederman et al. |
| 8,850,814 B2 | 10/2014 | Kaplan et al. |
| 8,857,186 B2 | 10/2014 | Held |
| 8,869,531 B2 | 10/2014 | Held |
| 8,881,805 B2 | 11/2014 | Klemencic |
| 8,959,914 B2 | 2/2015 | Kasuya et al. |
| 8,984,883 B2 | 3/2015 | Riley |
| 8,984,884 B2 | 3/2015 | Xu et al. |
| 9,003,798 B2 | 4/2015 | Yanagi |
| 9,014,791 B2 | 4/2015 | Held |
| 9,062,898 B2 | 6/2015 | Held et al. |
| 9,077,220 B2 | 7/2015 | Kyle et al. |
| 9,080,789 B2 | 7/2015 | Hamstra et al. |
| 9,091,278 B2 | 7/2015 | Vermeersch |
| 9,109,398 B2 | 8/2015 | Harris et al. |
| 9,115,604 B2 | 8/2015 | Bronicki |
| 9,118,226 B2 | 8/2015 | Kacludis et al. |
| 9,121,259 B2 | 9/2015 | Bryant et al. |
| 9,150,774 B2 | 10/2015 | Reddy et al. |
| 9,181,930 B2 | 11/2015 | Klemencic |
| 9,217,370 B2 | 12/2015 | Wang et al. |
| 9,234,522 B2 | 1/2016 | Jonsson et al. |
| 9,243,616 B2 | 1/2016 | Lee et al. |
| 9,297,367 B2 | 3/2016 | Ramaswamy et al. |
| 9,316,404 B2 | 4/2016 | Gurin |
| 9,322,300 B2 | 4/2016 | Mirmobin et al. |
| 9,331,547 B2 | 5/2016 | Bronicki |
| 9,341,084 B2 | 5/2016 | Xie et al. |
| 9,341,086 B2 | 5/2016 | Batscha et al. |
| 9,376,937 B2 | 6/2016 | Goswami et al. |
| 9,394,764 B2 | 7/2016 | Favilli et al. |
| 9,394,771 B2 | 7/2016 | Wiggs |
| 9,403,102 B2 | 8/2016 | Wu et al. |
| 9,441,504 B2 | 9/2016 | Held |
| 9,458,738 B2 | 10/2016 | Held et al. |
| 9,488,160 B2 | 11/2016 | Fisher et al. |
| 9,499,732 B2 | 11/2016 | Reddy et al. |
| 9,512,348 B2 | 12/2016 | Reyes et al. |
| 9,512,741 B2 | 12/2016 | Myogan et al. |
| 9,574,551 B2 | 2/2017 | Parrella, Sr. et al. |
| 9,587,161 B2 | 3/2017 | Fisk, Jr. |
| 9,587,162 B2 | 3/2017 | Fisk, Jr. |
| 9,638,065 B2 | 5/2017 | Vermeersch et al. |
| 9,649,582 B2 | 5/2017 | Shnell |
| 9,671,138 B2 | 6/2017 | Batscha et al. |
| 9,683,463 B2 | 6/2017 | Juchymenko |
| 9,726,157 B2 | 8/2017 | Sweatman |
| 9,726,441 B2 | 8/2017 | Reissner et al. |
| 9,732,634 B2 | 8/2017 | Hikichi et al. |
| 9,745,870 B2 | 8/2017 | Johnson et al. |
| 9,759,096 B2 | 9/2017 | Vermeersch |
| 9,762,460 B2 | 9/2017 | Pawlowski et al. |
| 9,777,602 B2 | 10/2017 | Juchymenko |
| 9,784,140 B2 | 10/2017 | Huntington et al. |
| 9,784,248 B2 | 10/2017 | Batscha et al. |
| 9,797,273 B2 | 10/2017 | Nishiguchi et al. |
| 9,816,402 B2 | 11/2017 | Kauffman et al. |
| 9,816,443 B2 | 11/2017 | Sheridan et al. |
| 9,829,194 B2 | 11/2017 | Aumann et al. |
| 9,840,662 B2 | 12/2017 | Pascarella et al. |
| 9,845,423 B2 | 12/2017 | Frantz et al. |
| 9,863,282 B2 | 1/2018 | Hart et al. |
| 9,874,112 B2 | 1/2018 | Giegel |
| 9,932,861 B2 | 4/2018 | Preuss et al. |
| 9,932,970 B1 | 4/2018 | Jeter |
| 9,957,432 B2 | 5/2018 | Galindo et al. |
| 9,994,751 B2 | 6/2018 | Hulse et al. |
| 10,005,950 B2 | 6/2018 | Smith et al. |
| 10,024,198 B2 | 7/2018 | Held et al. |
| 10,059,870 B2 | 8/2018 | Joseph et al. |
| 10,060,283 B2 | 8/2018 | Tomigashi et al. |
| 10,060,302 B2 | 8/2018 | Weng et al. |
| 10,060,652 B2 | 8/2018 | Tahara |
| 10,077,683 B2 | 9/2018 | Close |
| 10,082,030 B2 | 9/2018 | Genrup et al. |
| 10,113,389 B2 | 10/2018 | Pandey et al. |
| 10,113,535 B2 | 10/2018 | Conlon |
| 10,138,405 B2 | 11/2018 | Kulkarni et al. |
| 10,138,560 B2 | 11/2018 | Reyes et al. |
| 10,221,770 B2 | 3/2019 | Sheridan |
| 10,227,893 B2 | 3/2019 | McCune et al. |
| 10,247,044 B2 | 4/2019 | Barmeier et al. |
| 10,247,046 B2 | 4/2019 | Schuster et al. |
| 10,267,184 B2 | 4/2019 | Bowan et al. |
| 10,323,545 B2 | 6/2019 | Johnson |
| 10,352,197 B2 | 7/2019 | Grill et al. |
| 10,357,726 B2 | 7/2019 | Qin et al. |
| 10,400,635 B2 | 9/2019 | Johnson et al. |
| 10,435,604 B2 | 10/2019 | Kontomaris et al. |
| 10,458,206 B2 | 10/2019 | Al-Dossary et al. |
| 10,465,104 B2 | 11/2019 | Ravi et al. |
| 10,465,491 B2 | 11/2019 | Moore |
| 10,472,994 B2 | 11/2019 | Avadhanula et al. |
| 10,494,897 B2 | 12/2019 | Pandey et al. |
| 10,495,098 B2 | 12/2019 | Preuss et al. |
| 10,519,814 B2 | 12/2019 | Quoilin |
| 10,527,026 B2 | 1/2020 | Muir et al. |
| 10,563,927 B2 | 2/2020 | Papadopoulos et al. |
| 10,570,777 B2 | 2/2020 | Bowan |
| 10,570,782 B2 | 2/2020 | Lintl et al. |
| 10,584,660 B2 | 3/2020 | Sheridan et al. |
| 10,590,324 B2 | 3/2020 | Kulkarni et al. |
| 10,590,802 B2 | 3/2020 | McCune et al. |
| 10,598,160 B2 | 3/2020 | Sumrall |
| 10,612,423 B2 | 4/2020 | Ohman |
| 10,619,520 B2 | 4/2020 | Juchymenko |
| 10,626,709 B2 | 4/2020 | Al-Dossary |
| 10,670,340 B2 | 6/2020 | Batscha et al. |
| 10,704,426 B2 | 7/2020 | Goethals et al. |
| 10,724,805 B2 | 7/2020 | Barmeier et al. |
| 10,767,904 B2 | 9/2020 | von Düring |
| 10,788,267 B2 | 9/2020 | Dokic et al. |
| 10,794,292 B2 | 10/2020 | Kupratis et al. |
| 10,883,388 B2 | 1/2021 | Held |
| 10,934,895 B2 | 3/2021 | Held et al. |
| 10,947,626 B2 | 3/2021 | Pinder et al. |
| 10,947,839 B2 | 3/2021 | Cuthbert et al. |
| 10,975,279 B2 | 4/2021 | Kontomaris et al. |
| 11,022,070 B2 | 6/2021 | Aumann et al. |
| 11,137,169 B2 | 10/2021 | Buscheck et al. |
| 11,168,673 B2 | 11/2021 | Younes et al. |
| 11,174,715 B2 | 11/2021 | Atisele |
| 11,187,112 B2 | 11/2021 | Held |
| 11,187,212 B1 | 11/2021 | Bodishbaugh et al. |
| 11,220,932 B2 | 1/2022 | Kontomaris et al. |
| 11,255,315 B1 | 2/2022 | Bodishbaugh et al. |
| 11,255,576 B2 | 2/2022 | Higgins et al. |
| 11,274,660 B2 | 3/2022 | Radke |
| 11,274,663 B1 | 3/2022 | Bodishbaugh et al. |
| 11,280,226 B2 | 3/2022 | Duffney |

(56) References Cited

U.S. PATENT DOCUMENTS

| | | | |
|---|---|---|---|
| 11,293,414 B1 | 4/2022 | Bodishbaugh et al. |
| 11,326,479 B2 | 5/2022 | Radke |
| 11,326,550 B1 | 5/2022 | Bodishbaugh et al. |
| 11,359,612 B1 | 6/2022 | Bodishbaugh et al. |
| 11,365,652 B2 | 6/2022 | Gaia et al. |
| 11,396,828 B2 | 7/2022 | Chase |
| 11,486,370 B2 | 11/2022 | Bodishbaugh et al. |
| 2003/0010652 A1 | 1/2003 | Hunt |
| 2003/0029169 A1 | 2/2003 | Hanna et al. |
| 2004/0011038 A1 | 1/2004 | Stinger et al. |
| 2004/0011039 A1 | 1/2004 | Stinger et al. |
| 2004/0237890 A1 | 12/2004 | Bour |
| 2005/0034467 A1 | 2/2005 | Varney |
| 2005/0247056 A1 | 11/2005 | Cogswell et al. |
| 2005/0247059 A1 | 11/2005 | Cogswell et al. |
| 2006/0026961 A1 | 2/2006 | Bronicki |
| 2006/0130480 A1 | 6/2006 | Lovelace |
| 2007/0025854 A1 | 2/2007 | Moore et al. |
| 2008/0168772 A1 | 7/2008 | Radcliff et al. |
| 2008/0217523 A1 | 9/2008 | O'Sullivan |
| 2009/0211253 A1* | 8/2009 | Radcliff ............... F01K 23/065 60/670 |
| 2009/0217664 A1 | 9/2009 | Rapp et al. |
| 2009/0257902 A1 | 10/2009 | Emens |
| 2009/0320477 A1 | 12/2009 | Juchymenko |
| 2010/0018207 A1 | 1/2010 | Juchymenko |
| 2010/0077752 A1 | 4/2010 | Papile |
| 2010/0077792 A1 | 4/2010 | Gurin |
| 2010/0187319 A1 | 7/2010 | Isom et al. |
| 2010/0194111 A1 | 8/2010 | Van den Bossche et al. |
| 2010/0218930 A1 | 9/2010 | Proeschel |
| 2010/0300093 A1 | 12/2010 | Doty |
| 2011/0000210 A1 | 1/2011 | Miles |
| 2011/0030404 A1 | 2/2011 | Gurin |
| 2011/0041502 A1 | 2/2011 | Zimron et al. |
| 2011/0041505 A1 | 2/2011 | Kasuya et al. |
| 2011/0083620 A1 | 4/2011 | Yoon |
| 2011/0100003 A1 | 5/2011 | McLeod et al. |
| 2011/0126539 A1 | 6/2011 | Ramaswamy et al. |
| 2011/0138809 A1 | 6/2011 | Ramaswamy et al. |
| 2011/0272166 A1 | 11/2011 | Hunt |
| 2011/0314818 A1 | 12/2011 | Breen et al. |
| 2012/0001429 A1 | 1/2012 | Saar et al. |
| 2012/0042650 A1 | 2/2012 | Ernst et al. |
| 2012/0111004 A1 | 5/2012 | Conry |
| 2012/0131918 A1 | 5/2012 | Held |
| 2012/0145397 A1 | 6/2012 | Schultz et al. |
| 2012/0174581 A1 | 7/2012 | Vaughan et al. |
| 2012/0192560 A1 | 8/2012 | Ernst et al. |
| 2012/0198844 A1 | 8/2012 | Kaminsky |
| 2012/0261092 A1 | 10/2012 | Heath et al. |
| 2012/0291433 A1 | 11/2012 | Meng et al. |
| 2012/0292112 A1* | 11/2012 | Lakic ..................... E21B 7/002 175/57 |
| 2012/0292909 A1 | 11/2012 | Erikson |
| 2012/0315158 A1 | 12/2012 | Klaus |
| 2013/0041068 A1 | 2/2013 | Reddy et al. |
| 2013/0067910 A1 | 3/2013 | Ishiguro et al. |
| 2013/0091843 A1 | 4/2013 | Zyhowski et al. |
| 2013/0168089 A1 | 7/2013 | Berg et al. |
| 2013/0168964 A1 | 7/2013 | Xu et al. |
| 2013/0217604 A1 | 8/2013 | Fisk, Jr. |
| 2013/0247569 A1 | 9/2013 | Suter |
| 2013/0298568 A1 | 11/2013 | Pierson et al. |
| 2013/0299123 A1 | 11/2013 | Matula |
| 2013/0299170 A1 | 11/2013 | Joseph et al. |
| 2014/0011908 A1 | 1/2014 | Reddy et al. |
| 2014/0026574 A1 | 1/2014 | Leibowitz et al. |
| 2014/0033713 A1 | 2/2014 | Juchymenko |
| 2014/0057810 A1 | 2/2014 | Fisk, Jr. |
| 2014/0087978 A1 | 3/2014 | DeVille |
| 2014/0102098 A1 | 4/2014 | Bowan et al. |
| 2014/0123643 A1 | 5/2014 | Ming |
| 2014/0130498 A1 | 5/2014 | Randolph |
| 2014/0158429 A1 | 6/2014 | Kader et al. |
| 2014/0178180 A1 | 6/2014 | Sheridan |
| 2014/0206912 A1 | 7/2014 | Iglesias |
| 2014/0224469 A1* | 8/2014 | Mirmobin ............. F24H 9/2007 165/244 |
| 2014/0296113 A1 | 10/2014 | Reyes et al. |
| 2014/0305125 A1 | 10/2014 | Wang et al. |
| 2014/0366540 A1 | 12/2014 | Zyhowski et al. |
| 2015/0021924 A1 | 1/2015 | Parella |
| 2015/0047351 A1 | 2/2015 | Ishikawa et al. |
| 2015/0135708 A1 | 5/2015 | Lutz et al. |
| 2015/0226500 A1 | 8/2015 | Reissner et al. |
| 2015/0252653 A1 | 9/2015 | Shelton, Jr. |
| 2015/0300327 A1 | 10/2015 | Sweatman et al. |
| 2015/0330261 A1 | 11/2015 | Held |
| 2015/0345341 A1 | 12/2015 | Kacludis et al. |
| 2015/0345482 A1 | 12/2015 | Klitzing et al. |
| 2015/0361831 A1 | 12/2015 | Myers |
| 2016/0003108 A1 | 1/2016 | Held et al. |
| 2016/0010512 A1 | 1/2016 | Close |
| 2016/0017758 A1 | 1/2016 | Vermeersch et al. |
| 2016/0017759 A1 | 1/2016 | Gayawal et al. |
| 2016/0040557 A1 | 2/2016 | Vermeersch |
| 2016/0047540 A1 | 2/2016 | Aumann et al. |
| 2016/0061055 A1 | 3/2016 | Bowan |
| 2016/0076405 A1 | 3/2016 | Hashimoto et al. |
| 2016/0084115 A1 | 3/2016 | Ludewig et al. |
| 2016/0130985 A1 | 5/2016 | O'Connor et al. |
| 2016/0160111 A1 | 6/2016 | Smith et al. |
| 2016/0177887 A1 | 6/2016 | Fischer |
| 2016/0201521 A1 | 7/2016 | Karthauser |
| 2016/0222275 A1 | 8/2016 | Galindo et al. |
| 2016/0257869 A1 | 9/2016 | Kulkarni et al. |
| 2016/0312646 A1 | 10/2016 | Juano |
| 2016/0340572 A1 | 11/2016 | Pascarella et al. |
| 2016/0369408 A1 | 12/2016 | Reyes et al. |
| 2017/0058181 A1 | 3/2017 | Frantz et al. |
| 2017/0058722 A1 | 3/2017 | Noureldin et al. |
| 2017/0130614 A1 | 5/2017 | Held et al. |
| 2017/0145815 A1 | 5/2017 | Cuthbert et al. |
| 2017/0159504 A1 | 6/2017 | Ostrom et al. |
| 2017/0175582 A1 | 6/2017 | McCune et al. |
| 2017/0175583 A1 | 6/2017 | McCune et al. |
| 2017/0226402 A1 | 8/2017 | Patil et al. |
| 2017/0233635 A1 | 8/2017 | Pandey et al. |
| 2017/0240794 A1 | 8/2017 | Iverson et al. |
| 2017/0254223 A1 | 9/2017 | Goethals et al. |
| 2017/0254226 A1 | 9/2017 | Heber et al. |
| 2017/0261268 A1 | 9/2017 | Barmeier et al. |
| 2017/0276026 A1 | 9/2017 | Barmeier et al. |
| 2017/0276435 A1 | 9/2017 | Papadopoulos et al. |
| 2017/0284230 A1 | 10/2017 | Juchymenko |
| 2017/0314420 A1 | 11/2017 | Bowan et al. |
| 2017/0321104 A1 | 11/2017 | Ravi et al. |
| 2017/0321107 A1 | 11/2017 | Joseph et al. |
| 2017/0362963 A1 | 12/2017 | Hostler et al. |
| 2018/0094548 A1 | 4/2018 | Jeter |
| 2018/0128131 A1 | 5/2018 | Zyhowski et al. |
| 2018/0224164 A1 | 8/2018 | Lakic |
| 2018/0274524 A1 | 9/2018 | Moncarz et al. |
| 2018/0313340 A1 | 11/2018 | Spadacini et al. |
| 2018/0328138 A1 | 11/2018 | Pandey et al. |
| 2018/0340450 A1 | 11/2018 | Avadhanula et al. |
| 2018/0355703 A1 | 12/2018 | Al-Dossary |
| 2018/0356044 A1 | 12/2018 | Monti et al. |
| 2019/0048759 A1 | 2/2019 | Noureldin et al. |
| 2019/0055445 A1 | 2/2019 | Kulkarni et al. |
| 2019/0128147 A1 | 5/2019 | Liu et al. |
| 2019/0128567 A1 | 5/2019 | Redfern |
| 2019/0390660 A1 | 12/2019 | McBay |
| 2020/0011426 A1 | 1/2020 | Juchymenko |
| 2020/0025032 A1 | 1/2020 | McCune et al. |
| 2020/0095899 A1 | 3/2020 | Merswolke et al. |
| 2020/0200123 A1 | 6/2020 | Aumann et al. |
| 2020/0200483 A1 | 6/2020 | Ahlbom |
| 2020/0217304 A1 | 7/2020 | Sumrail |
| 2020/0232342 A1 | 7/2020 | McCune et al. |
| 2020/0248063 A1 | 8/2020 | Stone |
| 2020/0292240 A1 | 9/2020 | Chase |
| 2020/0308992 A1 | 10/2020 | Juchymenko |

(56) References Cited

U.S. PATENT DOCUMENTS

| | | |
|---|---|---|
| 2020/0309101 A1 | 10/2020 | Muir et al. |
| 2020/0354839 A1 | 11/2020 | Pinder et al. |
| 2020/0386212 A1 | 12/2020 | Atisele |
| 2020/0399524 A1 | 12/2020 | Pisklak et al. |
| 2021/0017439 A1 | 1/2021 | Ramirez Angulo et al. |
| 2021/0062682 A1 | 3/2021 | Higgins et al. |
| 2021/0071063 A1 | 3/2021 | Stone |
| 2021/0140684 A1 | 5/2021 | Younes et al. |
| 2021/0172344 A1 | 6/2021 | Juchymenko |
| 2021/0205738 A1 | 7/2021 | Blomqvist et al. |
| 2021/0372668 A1 | 12/2021 | Buscheck et al. |
| 2022/0090521 A1 | 3/2022 | Kontomaris et al. |
| 2022/0154603 A1 | 5/2022 | Duffney |
| 2022/0186636 A1 | 6/2022 | Ohman et al. |
| 2022/0186984 A1 | 6/2022 | Gaia et al. |

FOREIGN PATENT DOCUMENTS

| | | | | |
|---|---|---|---|---|
| AU | 2011336831 B2 | 12/2016 | | |
| AU | 2012306439 B2 | 3/2017 | | |
| AU | 2014225990 B2 | 7/2018 | | |
| CA | 2692629 | 1/2009 | | |
| CA | 2698334 | 4/2009 | | |
| CA | 2676502 A1 | 2/2011 | | |
| CA | 2679612 | 5/2018 | | |
| CA | 2676502 | 12/2018 | | |
| CA | 2952379 C | 4/2019 | | |
| CN | 204661610 U | 9/2015 | | |
| CN | 103174473 | 10/2015 | | |
| CN | 102812212 | 4/2016 | | |
| CN | 103174475 | 8/2016 | | |
| CN | 106517718 | 3/2017 | | |
| CN | 107246550 | 10/2017 | | |
| CN | 108302946 A | 7/2018 | | |
| CN | 108457609 A | 8/2018 | | |
| CN | 207761721 U | 8/2018 | | |
| CN | 209457990 U | 10/2019 | | |
| CN | 111837006 | 10/2020 | | |
| CN | 111911255 | 11/2020 | | |
| CN | 113266815 A | 8/2021 | | |
| CN | 113983844 A | 1/2022 | | |
| DE | 10337240 A1 | 3/2005 | | |
| DE | 102011006066 A1 | 9/2012 | | |
| DE | 102012214907 A1 | 10/2013 | | |
| DE | 102012014443 | 1/2014 | | |
| DE | 102013009351 | 1/2014 | | |
| DE | 102018201172 A1 | 7/2019 | | |
| EP | 0652368 | 5/1995 | | |
| EP | 1507069 A1 | 2/2005 | | |
| EP | 2530255 A2 | 12/2012 | | |
| EP | 2201666 | 3/2013 | | |
| EP | 1573173 | 4/2013 | | |
| EP | 1713877 | 5/2013 | | |
| EP | 1869293 | 5/2013 | | |
| EP | 2222939 | 11/2013 | | |
| EP | 1706667 B1 | 10/2014 | | |
| EP | 2167872 | 2/2016 | | |
| EP | 2446122 B1 | 8/2017 | | |
| EP | 2478201 B1 | 8/2017 | | |
| EP | 3102796 B1 | 1/2018 | | |
| EP | 3514339 A1 | 7/2019 | | |
| EP | 2550436 B1 | 8/2019 | | |
| EP | 3464836 | 4/2020 | | |
| EP | 3631173 A1 | 4/2020 | | |
| EP | 2948649 B1 | 12/2020 | | |
| EP | 3540331 B1 | 12/2020 | | |
| FR | 2738872 | 3/1997 | | |
| GB | 2336943 | 6/2003 | | |
| IN | 247090 | 12/2003 | | |
| IN | 256000 | 1/2005 | | |
| IN | 202111000822 | 10/2021 | | |
| JP | 08192150 | 7/1996 | | |
| JP | 2001183030 | 7/2001 | | |
| JP | 2009127627 A | 6/2009 | | |
| JP | 2010166805 A | 7/2010 | | |
| JP | 2010249501 A | 11/2010 | | |
| JP | 2010249502 A | 11/2010 | | |
| JP | 2011064451 A | 3/2011 | | |
| JP | 4668189 B2 | 4/2011 | | |
| JP | 2011069370 A | 4/2011 | | |
| JP | 2011106459 A | 6/2011 | | |
| JP | 2011137449 A | 7/2011 | | |
| JP | 2013151931 A | 8/2013 | | |
| JP | 2013238228 A | 11/2013 | | |
| JP | 2014016124 A | 1/2014 | | |
| JP | 2014080975 A | 5/2014 | | |
| JP | 2014109279 A | 6/2014 | | |
| JP | 2015149885 A | 8/2015 | | |
| JP | 2016006323 A | 1/2016 | | |
| JP | 2016105687 A | 6/2016 | | |
| JP | 2016188640 A | 11/2016 | | |
| JP | 2021167601 A | 10/2021 | | |
| KR | 101126833 | 3/2012 | | |
| KR | 20120067710 | 6/2012 | | |
| KR | 20120067710 A | * 6/2012 | | |
| KR | 20130023578 A | 3/2013 | | |
| KR | 1691908 | 1/2017 | | |
| KR | 2075550 | 2/2020 | | |
| KR | 2185002 | 12/2020 | | |
| NZ | 581457 | 11/2011 | | |
| RU | 2006142350 | 6/2008 | | |
| SG | 191467 | 7/2013 | | |
| SG | 191468 | 7/2013 | | |
| SG | 192327 | 8/2013 | | |
| WO | 1993/001397 | 1/1993 | | |
| WO | WO-9428298 A1 | * 12/1994 | ........... | F01K 23/065 |
| WO | 2005014981 A1 | 2/2005 | | |
| WO | 2005019606 A1 | 3/2005 | | |
| WO | 2005049975 | 6/2005 | | |
| WO | 2005100755 A1 | 10/2005 | | |
| WO | 2006/014609 | 2/2006 | | |
| WO | 2006/027770 | 3/2006 | | |
| WO | 2006060253 | 6/2006 | | |
| WO | 2006/092786 | 9/2006 | | |
| WO | 2006138459 | 12/2006 | | |
| WO | 2007048999 | 5/2007 | | |
| WO | 20070079245 | 7/2007 | | |
| WO | 2007137373 | 12/2007 | | |
| WO | 2008052809 | 5/2008 | | |
| WO | 2008106774 A1 | 9/2008 | | |
| WO | 2009017471 | 2/2009 | | |
| WO | 2009017474 | 2/2009 | | |
| WO | 2009027302 A2 | 3/2009 | | |
| WO | 2009030283 A2 | 3/2009 | | |
| WO | 2009/058112 | 5/2009 | | |
| WO | 2009095127 A2 | 8/2009 | | |
| WO | 2009/142608 | 11/2009 | | |
| WO | 2010021618 | 2/2010 | | |
| WO | 2010/039448 | 4/2010 | | |
| WO | 2010/065895 | 6/2010 | | |
| WO | 2009017473 | 8/2010 | | |
| WO | 2010106089 A2 | 9/2010 | | |
| WO | 2010127932 A2 | 11/2010 | | |
| WO | 2010/143046 | 12/2010 | | |
| WO | 2010/143049 | 12/2010 | | |
| WO | 2011012047 A1 | 2/2011 | | |
| WO | 2011/066032 | 6/2011 | | |
| WO | 2011073469 | 6/2011 | | |
| WO | 2011/061601 | 8/2011 | | |
| WO | 2011/103560 | 8/2011 | | |
| WO | 2011093854 | 8/2011 | | |
| WO | 2011/137980 | 11/2011 | | |
| WO | 2012060510 | 5/2012 | | |
| WO | 2012/079694 | 6/2012 | | |
| WO | 2012074940 A2 | 6/2012 | | |
| WO | 2012/112889 | 8/2012 | | |
| WO | 2012/142765 | 10/2012 | | |
| WO | 2012/151447 | 11/2012 | | |
| WO | 2013/014509 | 1/2013 | | |
| WO | 2013059695 | 4/2013 | | |
| WO | 2013/082575 | 6/2013 | | |
| WO | 2013103592 | 7/2013 | | |
| WO | 2013110375 A2 | 8/2013 | | |
| WO | 2013115668 A1 | 8/2013 | | |

(56) References Cited

FOREIGN PATENT DOCUMENTS

| | | |
|---|---|---|
| WO | 2013/136131 | 9/2013 |
| WO | 2014019755 A1 | 2/2014 |
| WO | 2014042580 | 3/2014 |
| WO | 2014053292 A2 | 4/2014 |
| WO | 2014059235 A1 | 4/2014 |
| WO | 2014065977 | 5/2014 |
| WO | 2014/124061 | 8/2014 |
| WO | 2014/167795 | 10/2014 |
| WO | 2014154405 A1 | 10/2014 |
| WO | 2014159520 A1 | 10/2014 |
| WO | 2014159587 A1 | 10/2014 |
| WO | 2014160257 A1 | 10/2014 |
| WO | 2014164620 | 10/2014 |
| WO | 2014164620 A1 | 10/2014 |
| WO | 2014165053 | 10/2014 |
| WO | 2014165053 A1 | 10/2014 |
| WO | 2014165144 A1 | 10/2014 |
| WO | 2014191157 A2 | 12/2014 |
| WO | 2015/040279 | 3/2015 |
| WO | 2015034987 A1 | 3/2015 |
| WO | 2015/059069 | 4/2015 |
| WO | 2015078829 A1 | 6/2015 |
| WO | 2015/135796 | 9/2015 |
| WO | 2015131940 A1 | 9/2015 |
| WO | 2015/158600 | 10/2015 |
| WO | 2015192005 A1 | 12/2015 |
| WO | 2016039655 A1 | 3/2016 |
| WO | 2016049712 | 4/2016 |
| WO | 2016050365 A1 | 4/2016 |
| WO | 2016050366 A1 | 4/2016 |
| WO | 2016050367 A1 | 4/2016 |
| WO | 2016050368 A1 | 4/2016 |
| WO | 2016050369 A1 | 4/2016 |
| WO | 2016/069242 | 5/2016 |
| WO | 2013103631 | 5/2016 |
| WO | 2016073245 A1 | 5/2016 |
| WO | 2016/087920 | 6/2016 |
| WO | 2016099975 A1 | 6/2016 |
| WO | 2016147419 | 9/2016 |
| WO | 2016/196144 | 12/2016 |
| WO | 2016204287 | 12/2016 |
| WO | 2017041147 | 3/2017 |
| WO | 2017065683 | 4/2017 |
| WO | 2017123132 | 7/2017 |
| WO | 2017/146712 | 8/2017 |
| WO | 2017/147400 | 8/2017 |
| WO | 2017203447 | 11/2017 |
| WO | 2018/044690 | 3/2018 |
| WO | 2018/107279 | 6/2018 |
| WO | 2018106528 | 6/2018 |
| WO | 2018/210528 | 11/2018 |
| WO | 2018217969 A1 | 11/2018 |
| WO | 2018227068 A1 | 12/2018 |
| WO | 2019004910 | 1/2019 |
| WO | 2019060844 | 3/2019 |
| WO | 2019067618 | 4/2019 |
| WO | 2019086960 A1 | 5/2019 |
| WO | 2019/157341 | 8/2019 |
| WO | 2019155240 | 8/2019 |
| WO | 2019/178447 | 9/2019 |
| WO | 2020152485 | 7/2020 |
| WO | 2020153896 | 7/2020 |
| WO | 2020/186044 | 9/2020 |
| WO | 2020201843 | 10/2020 |
| WO | 2020/229901 | 11/2020 |
| WO | 2020/097714 | 12/2020 |
| WO | 2020239067 | 12/2020 |
| WO | 2020239068 | 12/2020 |
| WO | 2020239069 | 12/2020 |
| WO | 2020251980 A1 | 12/2020 |
| WO | 2021004882 | 1/2021 |
| WO | 2021013465 A1 | 1/2021 |
| WO | 2021096696 A1 | 5/2021 |
| WO | 2021107834 | 6/2021 |
| WO | 2022/061320 | 3/2022 |

OTHER PUBLICATIONS

Richter, Alexander, GreenFire Energy and Mitsui Oil Exploration Co. are partnering on a closed-loop geothermal pilot project in Japan, Think GeoEnergy, Apr. 6, 2021.

Edwards, Alex, Dallas Innovates, Hunt Energy Network's New Venture Will Put 50 Batteries Across Texas, Giving ERCOT a Portfolio of Energy Generation, Apr. 1, 2021.

Guo, Boyun, Petroleum Enginnering, A Computer-Assisted Approach, Dec. 21, 2006.

Li, Tailu et al., Cascade utilization of low temperature geothermal water in oilfield combined power generation, gathering heat tracing and oil recovery, Applied Thermal Engineering 40 (2012).

Sherven, Bob, Automation Maximizes performance for shale wells, Oil&Gas Journal, 2013.

Hu, Kaiyong et al., A case study of an ORC geothermal power demonstration system under partial load conditions in Huabei Oilfield, China, ScientDirect, 2017.

Liu, Xiaolei et al., A systematic study of harnessing low-temperature geothermal energy from oil and gas reservoirs, Elsevier, ScienceDirect, Energy, 2017.

Nang, Kai, et al., A comprehensive review of geothermal energy extraction and utilization in oilfields, Elsevier, ScienceDirect, Journal of Petroleum Science and Engineering, 2017.

Cutright, Bruce L., The Transformation of Tight Shale Gas Reservoirs to Geothermal Energy Production, Bureau of Economic Geology University of Texas, Austin Texas, Jun. 14, 2011.

Khennich, Mohammed et al., Optimal Design of ORC Systems with a Low-Temperature Heat Source, Entropy 2012, 14, 370-389; doi:10.3390/e14020370.

Dambly, Benjamin W., et al., The Organic Rankine Cycle for Geothermal Power Generation, Geothermal Energy, 2007.

Obi, John Besong, State of art on ORC applications for waste heat recovery and micro-cogeneration for installations up to 100kWe, Elsevier, Energy Procedia 82 (2015) 994-1001.

Obafunmi, Jaiyejeje Sunday, Thermodynamic Analysis of Organic Rankine Cycles, Eastern Mediterranean Universit Jul. 2014, Gazimağusa, North Cyprus.

Dong, Bensi et al., Potential of low temperature organic Rankine cycle with zeotropic mixtures as working fluid, Elsevier, ScienceDirect, Energy Procedia 105 (2017) 1489-1494.

Iqbal, MdArbab et al., Trilateral Flash Cycle (TFC): a promising thermodynamic cycle for low grade heat to power generation, Elsevier, ScienceDirect, Energy Procedia 160 (2019) 208-214.

Bao, Junjiang et al., A review of working fluid and expander selections for organic Rankine cycle, Elsevier, ScienceDirect, Renewable and Sustainable Energy Reviews 24 (2013) 325-342.

Ajimotokan, Habeeb A. et al., Trilateral Flash Cycle for Recovery of Power from a Finite Low-Grade Heat Source, Proceedings of the 24th European Symposium on Computer Aided Process Engineering—ESCAPE 24 Jun. 15-18, 2014, Budapest, Hungary. Copyright ©2014 Elsevier B.V.

HUNG Tzu-Chen, et al., The Development and Application of a Small-Scale Organic Rankine Cycle for Waste Heat Recovery, IntechOpen, 2019.

Kong, Rithy et al., Thermodynamic performance analysis of a R245fa organic Rankine cycle (ORC) with different kinds of heat sources at evaporator, Elsevier, ScienceDirect, Case Studies in Thermal Engineering 13 (2019) 100385.

Lukawski, Maciej Z. et al., Impact of molecular structure of working fluids on performance of organic Rankine cycles (ORCs), Sustainable Energy Fuels, 2017, 1, 1098.

Saleh, Bahaa et al., Working fluids for low-temperature organic Rankine cycles, Elsevier, ScienceDirect, Energy 32 (2007) 1210-1221.

Brasz, Lars J. et al., Ranking of Working Fluids for Organic Rankine Cycle Applications, Purdue University, Purdue e-Pubs, (2004). International Refrigeration and Air Conditioning Conference. Paper 722.

Miller, Patrick C., Research uses landfill gas tech for Bakken flaring solution, The Bakken magazine, Sep. 16, 2015.

(56) References Cited

OTHER PUBLICATIONS

Electratherm, Inc., Power+ Generator 4400B & 4400B+, Nov. 24, 2020.
Electratherm, Inc., Heat To Power Generation Base Load Renewable Energy, Mar. 2020.
Electratherm, Inc., Power+ Generator, Nov. 25, 2020.
Electratherm, Inc., Generating Clean Power From Waste Heat, Nov. 2020.
Electratherm, Inc., Power+ Generator, May 19, 2020.
Sneary, Loy et al., Gulf Coast Green Energy, Flare Gas Reduction Trial Using an Organic Rankine Cycle Generator, Jan. 11, 2016.
Enertime, ORC for Industrial Waste Heat Recovery, Aug. 2017.
Enogia, Generate power from your waste heat thanks to our ORC, 2019.
UTC Power, PureCycle, 200 Heat-to-Electricity Power System, 2004.
Rank, MT3 machine, Dec. 17, 2018.
Heat Recovery Solutions, Clean Cycle Containerized Solution, 2009.
Triogen BV, Specification: E-Box Engine Application, Feb. 15, 2019.
"From Waste Heat To High Performance", Pbog (Permian Basin Oil and Gas Magazine), Apr. 26, 2013.
"Turning Waste Heat Into Clean Power; GNP'S Expander System", Great Northern Power Corporation, 2022.
Ng et al., "Thermo-Economic Performance of an Organic Rankine Cycle System Recovering Waste Heat Onboard an Offshore Service Vessel", Journal of Marine Science and Engineering, May 14, 2020.
"First Flare Elimination Demonstration", ElectraTherm, 2022.
International Search Report and Written Opinion for PCT/US2022/071475, dated May 17, 2022.
International Search Report and Written Opinion for PCT/US2022/071323, dated Jun. 28, 2022.
International Search Report and Written Opinion for PCT/US2022/071325, dated Jun. 28, 2022.
International Search Report and Written Opinion for PCT/US2022/071327, dated Aug. 29, 2022.
International Search Report and Written Opinion for PCT/US2022/071328, dated Sep. 9, 2022.
International Search Report and Written Opinion for PCT/US2022/071329, dated Aug. 25, 2022.
International Search Report and Written Opinion for PCT/US2022/071486, dated Jun. 14, 2022.
International Search Report and Written Opinion for PCT/US2022/071480, dated Aug. 3, 2022.
International Search Report and Written Opinion for PCT/US2022/071482, dated Aug. 2, 2022.
International Search Report and Written Opinion for PCT/US2022/071474, dated Jun. 10, 2022.
Invitation to Pay Additional Fees and Communication Relating to Results of Partial International Search for PCT/US2022/071329, dated Jun. 27, 2022.
Invitation to Pay Additional Fees and Communication Relating to Results of Partial International Search for PCT/US2022/071327, dated Jul. 4, 2022.
International Search Report and Written Opinion for PCT/US2022/071484, dated Jun. 27, 2022.
International Search Report and Written Opinion for PCT/US2022/071319, dated Jul. 12, 2022.
International Search Report and Written Opinion for PCT/US2022/071313, dated Jul. 5, 2022.
International Search Report and Written Opinion for PCT/US2022/071517, dated Jun. 27, 2022.

* cited by examiner

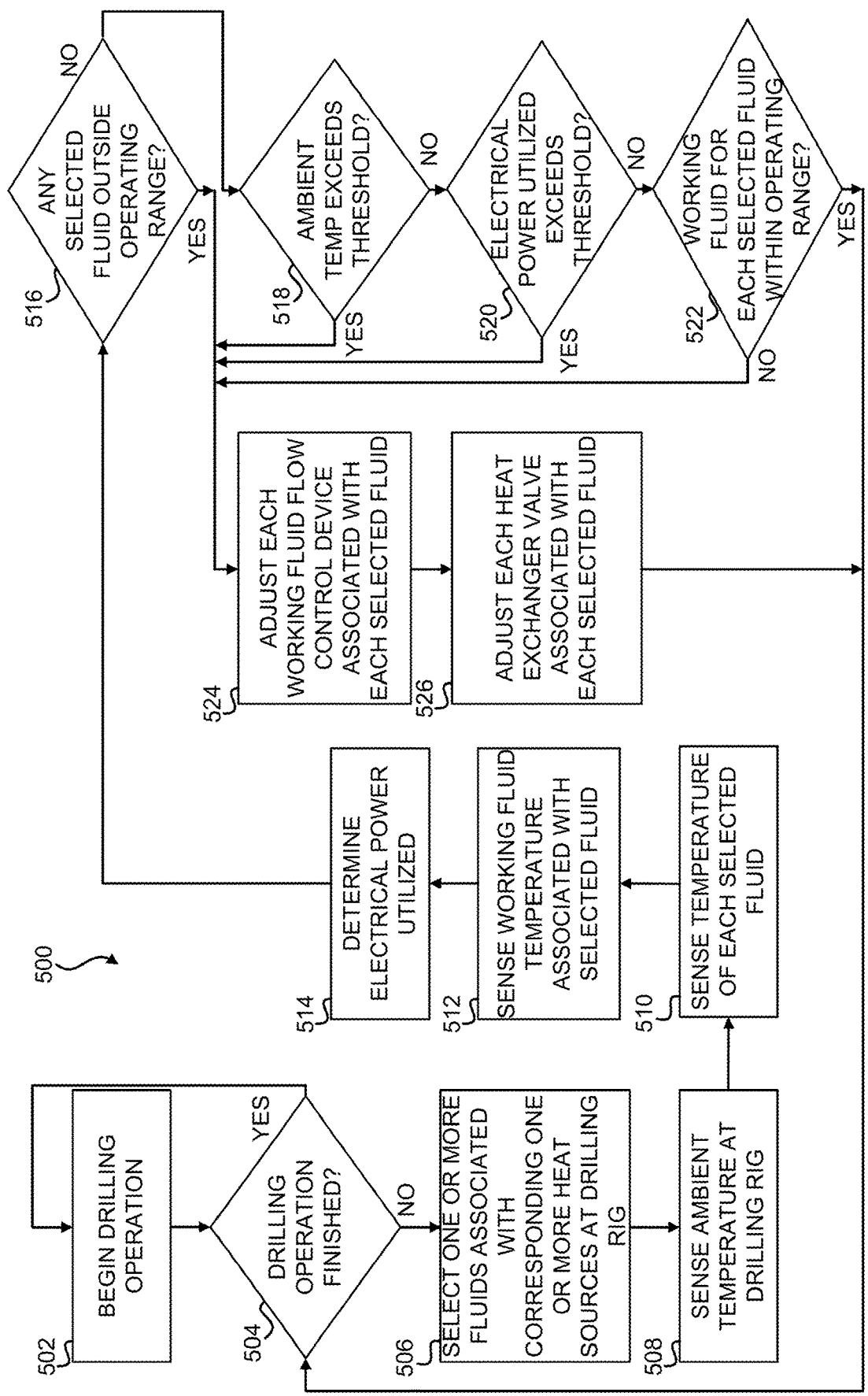

SYSTEMS AND METHODS FOR GENERATION OF ELECTRICAL POWER AT A DRILLING RIG

CROSS REFERENCE TO RELATED APPLICATIONS

This application is a non-provisional of and claims priority to and the benefit of U.S. Provisional Application No. 63/269,862, filed Mar. 24, 2022, titled "Systems and Methods for Generation of Electrical Power at a Drilling Rig," and U.S. Provisional Application No. 63/269,572, filed Mar. 18, 2022, titled "Systems and Methods for Generation of Electrical Power at a Drilling Rig," U.S. Provisional Application No. 63/261,601, filed Sep. 24, 2021, titled "Systems and Methods Utilizing Gas Temperature as a Power Source," and U.S. Provisional Application No. 63/200,908, filed Apr. 2, 2021, titled "Systems and Methods for Generating Geothermal Power During Hydrocarbon Production," the disclosures of all of which are incorporated herein by reference in their entireties. This application also is a continuation-in-part of U.S. Non-Provisional application Ser. No. 17/305,297, filed Jul. 2, 2021, titled "Systems for Generating Geothermal Power in an Organic Rankine Cycle Operation During Hydrocarbon Production Based on Working Fluid Temperature," which claims priority to and the benefit of U.S. Provisional Application No. 63/200,908, filed Apr. 2, 2021, titled "Systems and Methods for Generating Geothermal Power During Hydrocarbon Production," the disclosures of all of which are incorporated herein by reference in their entireties. This application further is a continuation-in-part of U.S. Non-Provisional application Ser. No. 17/578,520, filed Jan. 19, 2022, titled "Systems and Methods Utilizing Gas Temperature as a Power Source," which claims priority to and the benefit of U.S. Provisional Application No. 63/261,601, filed Sep. 24, 2021, titled "Systems and Methods Utilizing Gas Temperature as a Power Source," and U.S. Provisional Application No. 63/200,908, filed Apr. 2, 2021, titled "Systems and Methods for Generating Geothermal Power During Hydrocarbon Production," the disclosures of all of which are incorporated herein by reference in their entireties. This application also further is a continuation-in-part of U.S. Non-Provisional application Ser. No. 17/578,528, filed Jan. 19, 2022, titled "Systems and Methods Utilizing Gas Temperature as a Power Source," which claims priority to and the benefit of U.S. Provisional Application No. 63/261,601, filed Sep. 24, 2021, titled "Systems and Methods Utilizing Gas Temperature as a Power Source," and U.S. Provisional Application No. 63/200,908, filed Apr. 2, 2021, titled "Systems and Methods for Generating Geothermal Power During Hydrocarbon Production," the disclosures of all of which are incorporated herein by reference in their entireties. The application still further is a continuation-in-part of U.S. Non-Provisional application Ser. No. 17/578,542, filed Jan. 19, 2022, titled "Systems and Methods Utilizing Gas Temperature as a Power Source," which claims priority to and the benefit of U.S. Provisional Application No. 63/261,601, filed Sep. 24, 2021, titled "Systems and Methods Utilizing Gas Temperature as a Power Source," and U.S. Provisional Application No. 63/200,908, filed Apr. 2, 2021, titled "Systems and Methods for Generating Geothermal Power During Hydrocarbon Production," the disclosures of all of which are incorporated herein by reference in their entireties. This application additionally is a continuation-in-part of U.S. Non-Provisional application Ser. No. 17/578,550, filed Jan. 19, 2022, titled "Systems and Methods Utilizing Gas Temperature as a Power Source," which claims priority to and the benefit of U.S. Provisional Application No. 63/261,601, filed Sep. 24, 2021, titled "Systems and Methods Utilizing Gas Temperature as a Power Source," and U.S. Provisional Application No. 63/200,908, filed Apr. 2, 2021, titled "Systems and Methods for Generating Geothermal Power During Hydrocarbon Production," the disclosures of all of which are incorporated herein by reference in their entireties. The application is also a continuation-in-part of U.S. Non-Provisional application Ser. No. 17/650,811, filed Feb. 11, 2022, titled "Systems for Generating Geothermal Power in an Organic Rankine Cycle Operation During Hydrocarbon Production Based on Wellhead Fluid Temperature," which is a continuation of U.S. Non-Provisional application Ser. No. 17/305,298, filed Jul. 2, 2021, titled "Controller for Controlling Generation of Geothermal Power in an Organic Rankine Cycle Operation During Hydrocarbon Production," now U.S. Pat. No. 11,280,322, issued Mar. 22, 2022, which claims priority to and the benefit of U.S. Provisional Application No. 63/200,908, filed Apr. 2, 2021, titled "Systems and Methods for Generating Geothermal Power During Hydrocarbon Production," the disclosures of all of which are incorporated herein by reference in their entireties. This application further still is a continuation-in-part of U.S. Non-Provisional application Ser. No. 17/670,827, filed Feb. 14, 2022, titled "Systems and Methods for Generation of Electrical Power in an Organic Rankine Cycle Operation," which is a continuation-in-part of U.S. Non-Provisional application Ser. No. 17/305,296, filed Jul. 2, 2021, titled "Controller for Controlling Generation of Geothermal Power in an Organic Rankine Cycle Operation During Hydrocarbon Production," now U.S. Pat. No. 11,255,315, issued Feb. 22, 2022, which claims priority to and the benefit of U.S. Provisional Application No. 63/200,908, filed Apr. 2, 2021, titled "Systems and Methods for Generating Geothermal Power During Hydrocarbon Production," the disclosures of all of which are incorporated herein by reference in their entireties. This application yet further is a continuation-in-part of U.S. Non-Provisional application Ser. No. 17/682,126, filed Feb. 28, 2022, titled "Systems and Methods for Generation of Electrical Power in an Organic Rankine Cycle Operation," which is a continuation of U.S. Non-Provisional application Ser. No. 17/494,936, filed Oct. 6, 2021, titled "Systems and Methods for Generation of Electrical Power in an Organic Rankine Cycle Operation," now U.S. Pat. No. 11,293,414, issued Apr. 5, 2022, which is a continuation-in-part of U.S. Non-Provisional application Ser. No. 17/305,296, filed Jul. 2, 2021, titled "Controller for Controlling Generation of Geothermal Power in an Organic Rankine Cycle Operation During Hydrocarbon Production," now U.S. Pat. No. 11,255,315, issued Feb. 22, 2022, which claims priority to and the benefit of U.S. Provisional Application No. 63/200,908, filed Apr. 2, 2021, titled "Systems and Methods for Generating Geothermal Power During Hydrocarbon Production," the disclosures of all of which are incorporated herein by reference in their entireties.

FIELD OF DISCLOSURE

Embodiments of this disclosure relate to generating electrical power from heat generated on, in, at, about, or adjacent a drilling rig, and more particularly, to systems and methods for generating electrical power in an organic Rankine cycle (ORC) operation in the vicinity of a drilling rig during drilling operations to thereby supply electrical power to one or more of operational equipment, a grid power structure, and an energy storage device.

BACKGROUND

In some instances, an organic Rankine cycle (ORC) generator or unit may include a working fluid loop that flows to a heat source, such that the heat from the heat source causes the working fluid in the loop to change phases from a liquid to a vapor. The vaporous working fluid may then flow to a gas expander, causing the gas expander to rotate. The rotation of the gas expander may cause a generator to generate electrical power. The vaporous working fluid may then flow to a condenser or heat sink. The condenser or heat sink may cool the working fluid, causing the working fluid to change phase from the vapor to the liquid. The working fluid may circulate through the loop in such a continuous manner, thus the ORC generator or unit may generate electrical power.

SUMMARY

As noted, for example, organic Rankine cycle (ORC) generators or units may generate electrical power via an ORC operation based on heat transfer to a working fluid. While various types of sources of heat may be utilized, there is currently no system, method, or controller available to utilize heat generated in the vicinity (e.g., at, on, in, about, or adjacent) of a drilling rig and, more particularly, to utilize heated drilling mud and/or to optimize or ensure that drilling fluid or drilling mud is cooled to a preselected or specified level, that the overall energy efficiency of equipment at the drilling rig is increased, that the amount of electrical power utilized at the drilling rig is decreased, and/or that engine performance or efficiency is increased. For example, when drilling fluid or drilling mud is utilized as the source of heat in such operations, then a mud chiller may not be utilized or may consume less electrical power to cool the drilling fluid or drilling mud to a particular, preselected, and/or specified temperature. Further, the mud chiller may utilize electrical power generated by the ORC unit. In other embodiments, working fluid flowing to a heat exchanger corresponding to the drilling fluid or drilling mud may be increased or decreased to adjust generation of electrical power and/or control temperature of the drilling fluid or drilling mud. In other embodiments, engine performance and/or efficiency and/or electrical power generation may be adjusted based on the amount of working fluid flowing to heat exchangers corresponding to heat associated with engine exhaust and/or with fluid from an engine's water jacket.

Accordingly, Applicants have recognized a need for systems and methods to generate electrical power by use of heat generated in the vicinity of a drilling rig during drilling operations to thereby supply electrical power to one or more of in-field operational equipment, a grid power structure, and an energy storage device, and/or, more particularly to provide electrical power to a mud chiller and/or increase efficiency of a generator and/or engine at the drilling rig. The present disclosure includes embodiments of such systems and methods.

As noted, the present disclosure is generally directed to systems and methods for generating electrical power by use of heat generated at a drilling rig during a drilling operation. During drilling operations, drilling fluid or drilling mud is pumped through a drill string or drill pipe to and through a drill bit positioned or connected to the distal end of the drill string or drill pipe. The drill bit may break apart rock and/or other formations in the subsurface via rotation of the drill string or drill pipe and/or via the flow of drilling fluid through the drill bit (e.g., the flow of drilling fluid to cause the drill bit to rotate) thereby forming a borehole. The drilling fluid may also cool the drill bit. As the drill bit operates, the friction between the drill bit and the rock and/or other formations in the subsurface may generate heat. Such heat may cause the drill bit to exhibit premature wear and/or to not operate properly. Further, the heat may decrease the overall lifetime (e.g., the time that the drill bit is utilized) of the drill bit and/or other bottom-hole assembly components (e.g., drill collars, stabilizers, reamers, shocks, hole-openers, bit subs, etc.). To ensure that the drill bit operates properly and/or to extend the life or use of the drill bit, the drilling fluid may be utilized to cool the drill bit. The drilling fluid may also be utilized to carry cuttings and other debris caused by forming the borehole. The drilling fluid may flow up the borehole above the surface and out of the borehole via a drilling fluid return pipeline. The drilling fluid return pipeline may connect directly to a drilling fluid heat exchanger or may connect to the drilling fluid heat exchanger via a control valve. The control valve may divert a portion or all of the drilling fluid to the drilling fluid heat exchanger.

The drilling rig may include other sources of heat. For example, an engine to drive the drilling fluid pump or mud pump may produce heated fluid via an engine's water jacket and/or heated exhaust. In such examples, the exhaust may be transported, via an exhaust pipeline to an exhaust heat exchanger. An exhaust control valve may be positioned along the exhaust pipeline to divert a portion or all of the exhaust from the exhaust heat exchanger to the atmosphere when the exhaust is outside a specified operating range.

Another source of heat may include fluid from an engine's water (or other fluid, e.g., coolant) jacket, for example. As an engine operates, the engine may generate heat. The heat may cause parts and consumables (e.g., oil and/or seals and/or sealants) to wear out or break down faster and/or cause formation of deposits thereby impeding airflow through the engine and decreasing engine performance. As such, an engine may include a water jacket. Water or other coolant may flow through the jacket, absorb heat from the engine, and flow to a heat sink where the absorbed heat may dissipate. In such examples, fluid from the engine's water jacket may flow through a water jacket pipeline to a water jacket heat exchanger. A water jacket fluid control valve may be positioned along the water jacket fluid pipeline to divert a portion or all of the water or other coolant in the water jacket to a water jacket heat exchanger when the fluid from the engine's water jacket is within a specified operating range.

In such embodiments, a system may include each of these heat exchangers. Each of the heat exchangers may connect to a supply manifold and a return manifold. The amount of working fluid flowing to/from the supply manifold and return manifold, respectively, and/or the amount of working fluid flowing to each heat exchanger from the return manifold may be controlled by one or more flow control devices. Adjusting the flow of working fluid to any of the heat exchangers may be performed based on a number of factors, such as engine performance and/or efficiency and/or electrical power generation may be adjusted based on the amount of working fluid flowing to heat exchangers corresponding to heat associated with engine exhaust and/or with fluid from an engine's water jacket.

Accordingly, an embodiment of the disclosure is directed to a method for generating power in an organic Rankine cycle (ORC) operation in the vicinity of a drilling rig. The method may include, during a drilling operation, pumping, via a pump, drilling fluid from a drilling fluid container to a proximal end of a drill pipe. The pump may be driven by an engine during the drilling operation. Further, the drilling rig may include one or more additional engines to provide electrical power to drilling rig equipment. The drilling fluid may flow through an interior of the drill pipe to the distal end of the drill pipe. The distal end of the drill pipe may be connected to a drill bit. The flow of drilling fluid may cause the drill bit to rotate. The rotation of the drill bit may form a borehole in a subsurface and thereby generate a heated drilling fluid. The heated drilling fluid may flow up the borehole to a drilling fluid return pipe above the subsurface via an annulus defined by a space between an outer surface of the drill pipe and an inner surface of the borehole. The method may include diverting, via a heat exchanger supply valve, the heated drilling fluid from the drilling fluid return pipe to a heat exchanger. The heat exchanger may be positioned to transfer heat from the heated drilling fluid to a flow of a working fluid to generate a cooled drilling fluid and a heated working fluid. The heated working fluid may cause an ORC unit to generate electrical power. The method may include returning the cooled drilling fluid to the drilling fluid container.

An embodiment of a method also may include, prior to returning the cooled drilling fluid to the drilling fluid container, degassing the cooled drilling fluid and removing cuttings included in the cooled drilling fluid from formation of the borehole. The method further may include, prior to diversion of the heated drilling fluid, sensing, via a temperature sensor positioned along the drilling fluid return pipe, a temperature of the heated drilling fluid. The method additionally may include, in response to the temperature of the heated drilling fluid being lower than an ORC operating range, adjusting the heat exchanger supply valve to a closed position to thereby prevent heated drilling fluid to flow therethrough, and in response to the temperature of the heated drilling fluid being within an ORC operating range, adjusting the heat exchanger supply valve to an opened position to thereby divert the heated drilling fluid to the heat exchanger. The transfer of heat from the heated drilling fluid to the flow of the working fluid may extend a time that bottom-hole assembly components are utilized and reduces a total amount of electrical power generated by generator sets of the drilling rig.

In another embodiment, a method may include, during operation of (1) the pump via the engine and (2) the one or more additional engines, transporting exhaust produced by one of the engine or one or more additional engines to a second heat exchanger. The second heat exchanger may indirectly transfer heat from the exhaust to a flow of a second working fluid thereby to cause the ORC unit to generate electrical power. The method may include, prior to transport of the exhaust to the second heat exchanger: sensing, via an exhaust inlet sensor, an exhaust thermal mass of the exhaust produced by one of the one or more engines; and, in response to the exhaust thermal mass being outside of an exhaust thermal mass range, adjusting an exhaust control valve to partially or fully prevent or allow flow of the exhaust from the one of the one or more engines to the second heat exchanger. The one or more additional engines may drive generator sets and each of the generator sets may generate a total of about 2 megawatts to about 10 megawatts of electrical power. The exhaust from the engine and one or more of the additional engines, for example, may be about 500° Fahrenheit (F) to about 1200° F. at about 2000 cubic feet per minute (CFM) to about 20000 CFM.

In another embodiment, a method may include, during operation of (1) the pump via the engine and (2) the one or more additional engines, transporting a flow of heated coolant from a water jacket associated with one of the one or more engines to a third heat exchanger, the third heat exchanger to indirectly transfer heat from the heated coolant to a flow of a third working fluid, thereby to cause the ORC unit to generate electrical power. The method may include, prior to transport of the heated coolant to the second heat exchanger, sensing, via a water jacket inlet temperature sensor, a heated coolant temperature of the flow of heated coolant from the water jacket, and in response to the heated coolant temperature being outside of a water jacket temperature range, adjusting a water jacket control valve to prevent or allow flow of the heated coolant from the water jacket to the second heat exchanger. The heated coolant, for example, may be about 165° F. to about 230° F. at about 70 gallons per minute to about 250 gallons per minute.

In another embodiment, a first heat exchanger, a second heat exchanger, and a third heat exchanger may connect to a working fluid manifold and one or more working fluid flow control devices positioned therebetween. The method may include, in response to a determination that an ambient temperature exceeds an engine operating range, increasing, via a corresponding flow control device, an amount of working fluid flowing from the working fluid manifold to one or more of the second heat exchanger and the third heat exchanger, and in response to a determination that electrical power utilization of a drilling fluid chiller exceeds an operating range, increasing, via a corresponding flow control device, an amount of working fluid flowing from the working fluid manifold to the heat exchanger.

Another embodiment of the disclosure is directed to a method for generating power based on heat generated in the vicinity of a drilling rig. The drilling rig may be one of an on-shore drilling rig or off-shore drilling rig. Such a method may be executed, performed, or operate during a drilling operation. The method may include receiving, via a return pipe positioned above a subsurface, a heated drilling fluid from a fluid channel defined by a space between an outer surface of a drilling pipe and an inner surface of a borehole, and directing the heated drilling fluid from the drilling fluid return pipe to a heat exchanger. The heat exchanger may be positioned to transfer heat from the heated drilling fluid to a flow of a working fluid to generate a cooled drilling fluid, thereby to cause an ORC unit to generate electrical power. The electrical power generated may be one of direct current (DC) or alternating current (AC) power. On-site equipment at the drilling rig may utilize the electrical power. Such utilization of the electrical power by the on-site equipment may reduce total fuel usage of the drilling rig during the drilling operation. Electrical power may be supplied to one or more of on-site drilling rig equipment (including, but not limited to, a fluid or mud chiller), to the grid, or an energy storage device. The electrical power may be supplied to on-site drilling rig equipment during peak drilling operation hours. In other embodiments, electrical power may be supplied to one or more of the grid, an energy storage device, cryptocurrency miners, or drilling fluid chillers during off-peak drilling operation hours. Finally, the method may include returning the cooled drilling fluid to a drilling fluid container.

Another embodiment of the disclosure is directed to a method for generating power in an organic Rankine cycle (ORC) operation in the vicinity of a drilling rig. Such a method may be executed, performed, or operate during a drilling operation. The method may include pumping, via a pump, drilling fluid from a drilling fluid container to a proximal end of a drill pipe. The drilling fluid may flow through an interior of the drill pipe to the distal end. The distal end of the drill pipe may be connected to a drill bit. The flow of drilling fluid may cause the drill bit to rotate. The rotation of the drill bit may form a borehole in a subsurface and thereby generate a heated drilling fluid. The heated drilling fluid may flow up the borehole to a drilling fluid return pipe above the subsurface via an annulus defined by a space between an outer surface of the drill pipe and an inner surface of the borehole. The method may include receiving, via a return pipe positioned above the subsurface, the heated drilling fluid, and sensing, via a return pipe temperature sensor, a temperature of the heated drilling fluid in the return pipe. The method also may include sensing, via a working fluid temperature sensor, a temperature of a flow of working fluid from a heat exchanger. The flow of working fluid may flow through the heat exchanger to facilitate transfer of heat from heated drilling fluid to the flow of working fluid thereby causing an ORC unit to generate electrical power and generate cooled drilling fluid. The heat exchanger may be connected to the return pipe via a heat exchanger valve and the heated drilling fluid may flow therethrough. The method further may include, in response to one or more of a (1) determination that the temperature of heated drilling fluid in the return pipe is greater than or equal to a threshold or (2) a determination that the temperature of the flow of working fluid from the heat exchanger is within an operating range, adjusting an opened/closed position of a heat exchanger valve to allow continuous diversion of the heated drilling fluid to a heat exchanger to facilitate transfer of heat from heated drilling fluid to a flow of working fluid and generate cooled drilling fluid. Such determinations may occur at pre-determined or pre-selected intervals. The method may include returning the cooled drilling fluid to the drilling fluid container.

Another embodiment of the disclosure is directed to a system for generating power in an organic Rankine cycle (ORC) operation in the vicinity of a drilling rig during drilling operations. The system may include a drilling fluid container to store an amount of drilling fluid. The system may include a container pipe including a first end and a second end. The first end of the container pipe may be in fluid communication with the drilling fluid container. The system may include a drilling fluid pump in fluid communication with the second end of the container pipe. The system may include a drilling fluid pipe including a first end and a second end, the first end of the drilling fluid pipe may be connected to the drilling fluid pump. The drilling fluid pump may pump drilling fluid therethrough. The system may include a drill string including a proximal end, a distal end, an outer surface, and an inner surface. The proximal end of the drill string may be connected to the second end of the drilling fluid pipe. The drill string inner surface may define a cavity, the drilling fluid to flow therethrough. The system may include a drill bit connected to the distal end of the drill string. The drill bit may rotate based on rotation of the drill string and/or the flow of the drilling fluid. The drill bit may form a borehole in a subsurface geological formation. The system may include a drilling fluid return pipe positioned above the subsurface geological formation and connected to an annulus defined by an inner surface of the borehole and the outer surface of the drill string. The drilling fluid may include aggregate from the drill bit. The system may include a heat exchanger connected to drilling fluid return pipe. The heat exchanger may facilitate heat transfer from the drilling fluid to the to transfer heat to a working fluid flow. The system may include an ORC unit to generate electrical power using heat from the working fluid flow. The ORC unit may include a generator, a gas expander, a condenser, an internal heat exchanger, and a loop for the flow of organic working fluid, the loop defined by a fluid path through the condenser, generator, and a first fluid path of the internal heat exchanger, the internal heat exchanger including a second fluidic path to connect to the heat exchanger and the working fluid flowing therethrough, the internal heat exchanger to indirectly transfer heat from the working fluid to the organic working fluid thereby causing the organic working fluid to change phases from a liquid to a vapor, the flow of the vapor to cause the generator to generate electrical power via rotation of a gas expander as defined by an ORC operation, the condenser to cool the flow of the organic working fluid, and the cooling to cause the organic working fluid to change phases from the vapor to the liquid.

In other embodiments, a system may include a pump engine to drive the drilling pump, one or more generation sets to generate electrical power for use at the drilling rig, and one or more engines connected to and to drive the one or more generation sets. The pump engine and one or more engines may produce exhaust. Each of the pump engine and one or more engines may include exhaust outlets. In such embodiments, the system also may include one or more exhaust conduits including a first end and a second end. Each of the one or more exhaust conduit's first end may be in fluid communication with each of the exhaust outlets of the pump engine and one or more engines. The system may include an exhaust manifold to connect to each of the one or more exhaust conduit's second end, the exhaust from each of the pump engine and one or more engines may aggregate therein one or more exhaust heat exchangers to connect to the exhaust manifold, to receive the aggregated exhaust from each of the pump engine and one or more engines, and configured to facilitate heat transfer from exhaust to a second working fluid.

In other embodiments, a system may include one or more water or other fluid (e.g., coolant) jackets as will be understood by those skilled in the art. Each of the one or more water jackets may corresponding to one of the pump engine and one or more engines and to cool the one of the pump engine and one or more engines during drilling operation. The system may include one or more water jacket heat exchangers each in fluid communication with one of the one or more water jackets and configured to facilitate heat transfer from fluid within the water jacket to a second working fluid.

Another embodiment of the disclosure is directed to a system for generating power in an organic Rankine cycle (ORC) operation in the vicinity of a drilling rig during drilling operations. The system may include a drilling fluid container to store an amount of drilling fluid. The system may include a container pipe including a first end and a second end. The first end of the container pipe may be in fluid communication with the drilling fluid container. The system also may include a drilling fluid pump in fluid communication with the second end of the container pipe. The system further may include a drilling fluid pipe including a first end and a second end. The first end of the drilling fluid pipe may be connected to the drilling fluid pump, the drilling fluid pump to pump drilling fluid therethrough, and a drill string including a proximal end, a distal end, an outer surface, and an inner surface. The proximal end of the drill string may be connected to the second end of the drilling fluid pipe. The drill string inner surface may define a cavity, the drilling fluid to flow therethrough. The system still further may include a drill bit connected to the distal end of the drill string. The drill bit may rotate based on rotation of the drill string and flow of the drilling fluid. The drill bit may form a borehole in a subsurface geological formation. The system also may include drilling fluid return pipe positioned above the subsurface geological formation and connected to an annulus defined by an inner surface of the borehole and the outer surface of the drill string, the drilling fluid, including aggregate from the drill bit, to flow therethrough. The system still further may include a heat exchanger connected to drilling fluid return pipe. The heat exchanger may facilitate heat transfer from the drilling fluid to the to transfer heat to a working fluid flow. The system also may include an ORC unit to generate electrical power using the heat transferred to the working fluid flow.

Another embodiment of the disclosure is directed to a controller to control electrical power generated in an organic Rankine cycle (ORC) operation in the vicinity of a drilling rig during drilling operations. The controller may include an input in signal communication with a drilling fluid return pipe sensor to provide a temperature of a drilling fluid entering a drilling fluid return pipe. The controller may further include a set of inputs/outputs in signal communication with a heat exchanger valve and a working fluid flow control device. The controller may be configured to, in response to the drilling fluid being within an operating range, transmit one or more signals to (1) to adjust a heat exchanger valve's position to thereby divert drilling fluid to a heat exchanger or (2) to adjust the working fluid flow control device to thereby control an amount of heat transferred to the working fluid flow. The heat exchanger may facilitate transfer of heat from the drilling fluid to a working fluid flow and the heat transferred to the working fluid may cause an ORC unit to generate electricity. The controller may further include a second input in signal communication with a heat exchanger working fluid outlet temperature sensor. The heat exchanger working fluid outlet temperature sensor may provide a working fluid outlet temperature of a working fluid flow from the heat exchanger. Adjustment of the one or more of (1) heat exchanger valve's position or (2) working fluid flow control device may further be based on the working fluid outlet temperature.

Another embodiment of the disclosure is directed to a method to increase, for one or more of an engine, a generator set, or a bottom-hole assembly, performance and lifespan. Such a method may be executed, performed, or operate during a drilling operation. The method may include sensing, via a drilling fluid return pipe sensor, a temperature of a flow of drilling fluid from a borehole, and sensing, via an ambient temperature sensor, an ambient temperature of a drilling rig. The method also may include determining electrical power utilized by drilling rig equipment and generated by a generator set driven by an engine, and in response to one or more of (a) the temperature of the flow of drilling fluid from the borehole exceeding an operating range, (b) the ambient temperature exceeding an ambient temperature threshold, or (c) the electrical power utilized by the drilling rig equipment exceeding a power requirement threshold: adjusting one or more of (1) a first working fluid flow control device; (2) a second working fluid flow control device; or (3) a third working flow control device. The first working fluid flow control device may control a flow of working fluid to a drilling fluid heat exchanger.

An embodiment of a drilling fluid heat exchanger, for example, may be configured to transfer heat from the drilling fluid to the flow of the working fluid, the transferred heat to cause an ORC unit to generate electrical power. Adjustment of the first working fluid flow control device may cause an increase in working fluid flow to the drilling fluid heat exchanger thereby causing a decrease in the temperature in drilling fluid to thereby decrease cooling via a mud chiller and to further thereby decrease overall electrical power utilized at the drilling rig. The second working fluid flow control device may control a flow of working fluid to an exhaust heat exchanger. The exhaust fluid heat exchanger may be configured to transfer heat from exhaust generated by the engine to the flow of the working fluid, the transferred heat to cause an ORC unit to generate electrical power. Adjustment of the second working fluid flow control device may cause an increase in working fluid flow to the exhaust heat exchanger thereby causing an increase in overall electrical power generated by the ORC unit due to the high heat of the exhaust and to thereby optimize engine and generator set performance. The third working fluid flow control device may control a flow of working fluid to a water jacket heat exchanger. The water jacket fluid heat exchanger may be configured to transfer heat from water jacket fluid of a water jacket, the water jacket configured to cool the engine, to the flow of the working fluid, the transferred heat to cause an ORC unit to generate electrical power. Adjustment of the third working fluid flow control device may cause an increase in working fluid flow to the water jacket heat exchanger thereby causing an increase in engine performance due to increased heat transfer from the engine to the working fluid.

Another embodiment of the disclosure is directed to a method for generating power in an organic Rankine cycle (ORC) operation in the vicinity of a drilling rig. The method may include operating a drilling rig to form a borehole in a subsurface formation. The method may also include, during operation of the drilling rig, selecting one or more fluids from one or more corresponding heat sources. The one or more fluids selected may flow to one or more corresponding heat exchangers. Each of the one or more corresponding heat exchangers may be positioned to transfer heat from the heated drilling fluid to a flow of a working fluid to generate a heated working fluid. The heated working fluid may cause an ORC unit to generate electrical power. The one or more heat sources may include exhaust produced by one of one or more engines positioned in the vicinity of the drilling rig or fluid from a fluid jacket corresponding to one of the one or more engines. Additionally, the one or more heat sources may include drilling fluid utilized during operation of the drilling rig. One or more of the one or more heat sources may be selected based on temperature of fluid from each of the one or more heat sources, the ambient temperature at the drilling rig, engine optimization, electrical power output maximization, or electrical power utilization at the drilling rig.

Another embodiment of the disclosure is directed to a method for generating power in an organic Rankine cycle (ORC) operation in the vicinity of a drilling rig. The method may include, during a drilling operation, selecting, based on one or more of (a) engine optimization, (b) electrical power output maximization, or (c) electrical power utilization at the drilling rig, diversion of an amount of one or more of (1) engine exhaust, via a first heat exchanger supply valve, from an engine exhaust conduit to a first heat exchanger and (2) fluid, via a second heat exchanger supply valve, from an engine fluid jacket to a second heat exchanger. Each of the first heat exchanger and the second heat the heat exchanger may be positioned to transfer heat from the engine exhaust and fluid to a flow of a working fluid to generate a heated working fluid. The heated working fluid may cause an ORC unit to generate electrical power. Selection of diversion of the amount of one or more of engine exhaust and fluid may be further based on ambient temperature at the drilling rig, temperature of the engine exhaust, temperature of the fluid, temperature of working fluid corresponding to the engine exhaust, and temperature of working fluid corresponding to the fluid.

Another embodiment of the disclosure is directed to a method for increasing one or more of engine, generator set, or bottom-hole assembly performance and lifespan. The method may be executed during a drilling operation. The method may include sensing, via an ambient temperature sensor, an ambient temperature of a drilling rig. The method may include determining electrical power utilized by drilling rig equipment and generated by a generator set driven by an engine. The method may include, in response to one or more of (a) the ambient temperature exceeding an ambient temperature threshold or (b) the electrical power utilized by the drilling rig equipment exceeding a power requirement threshold: adjusting one or more of (1) a first working fluid flow control device, or (2) a second working fluid flow control device. The first working fluid flow control device may control a flow of working fluid to an exhaust heat exchanger. The exhaust fluid heat exchanger may be configured to transfer heat from exhaust generated by the engine to the flow of the working fluid. The transferred heat may cause a power generation unit to generate electrical power, the second working fluid flow control device may control a flow of working fluid to a fluid jacket heat exchanger. The fluid jacket fluid heat exchanger may be configured to transfer heat from the fluid of the fluid jacket to the flow of the working fluid. The fluid jacket may be configured to cool the engine. The transferred heat may cause a power generation unit to generate electrical power.

Still other aspects and advantages of these embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present invention herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF DRAWINGS

These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the scope of the disclosure.

FIG. 5 is a flow diagram of a method of electrical power generation in which, during a drilling operation, working fluid is heated via one or more heat sources, according to one or more embodiments of the disclosure.

DETAILED DESCRIPTION

Figure 1A:
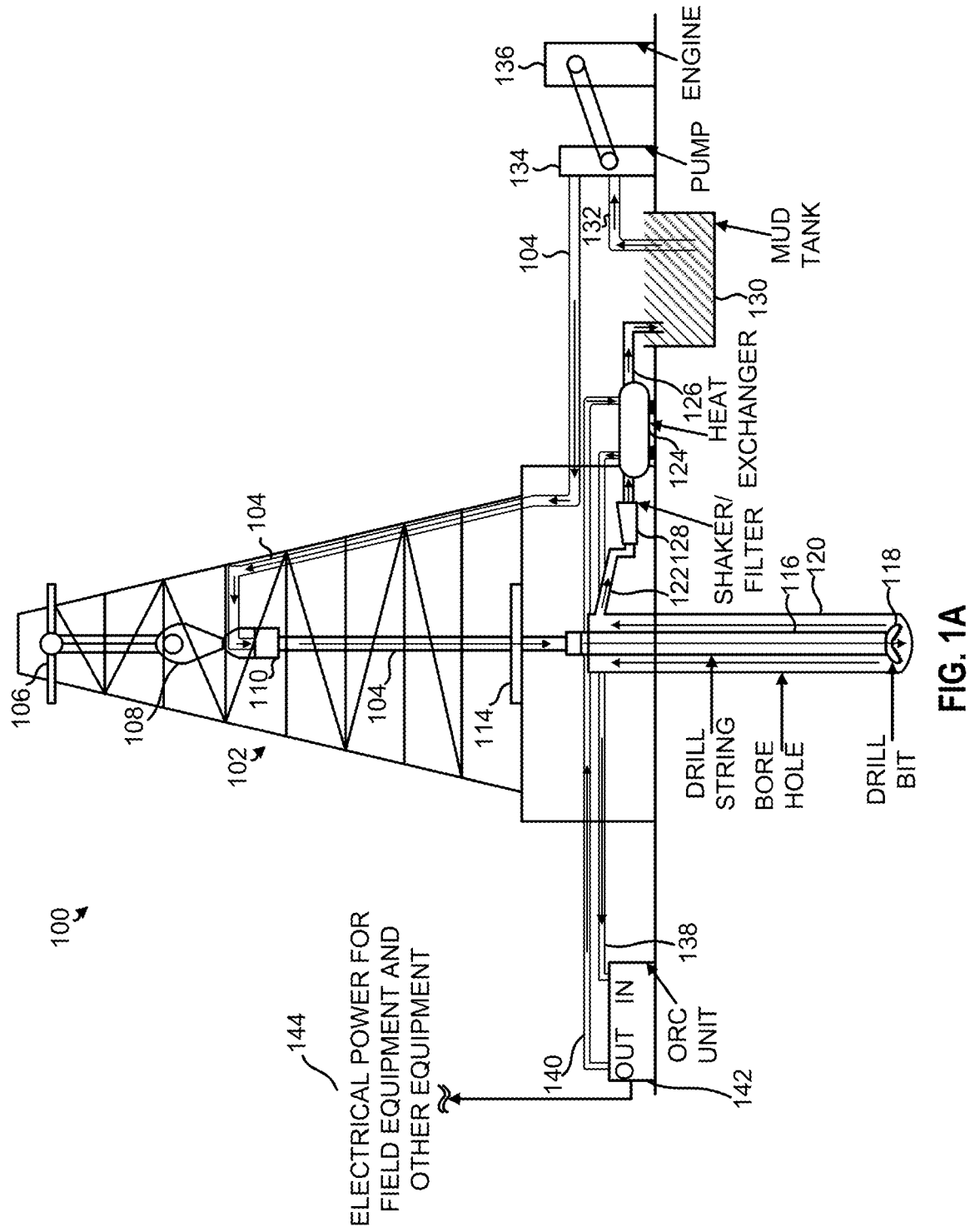
FIG. 1A, FIG. 1B, and FIG. 1C are side-view perspectives of implementations of systems to generate electrical power at a drilling rig, according to one or more embodiments of the disclosure.

So that the manner in which the features and advantages of the embodiments of the systems and methods disclosed herein, as well as others that will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the systems and methods disclosed herein and are therefore not to be considered limiting of the scope of the systems and methods disclosed herein as it may include other effective embodiments as well.

The present disclosure is directed to embodiments of systems and methods for generating electrical power (e.g., via a power generation unit such as an organic Rankine cycle (ORC) operation or other operations utilizing heat to generate electrical power as will be understood by those skilled in the art) based on heat from a flow of drilling fluid or mud and other sources (e.g., engine exhaust, coolant from an engine's water jacket, other heat generating equipment or devices, etc.) to thereby supply electrical power to one or more of equipment or operational equipment, a grid power structure, an energy storage device, and/or other devices. Drilling rig operations typically include pumping of drilling fluid or drilling mud through a drill string or drill pipe to a drill bit connected to the drill string or drill pipe at the drill string or drill pipe's proximal end. The drilling fluid may cool the drill bit and, in some embodiments, other bottom-hole assembly components or devices. During the drilling operation, the drill bit's temperature may increase due to the friction between the drill bit and the rock and/or other substrate of the subsurface formation. After the drilling fluid cools the drill bit, the drilling fluid may flow or may be pumped or transmitted to the surface (e.g., to a drilling fluid return pipeline) via an annulus defined by a space between the outer surface of the drill string or drill pipe and the surface or inner surface of the borehole. The drilling fluid may flow, via the drilling fluid return pipeline, to a drilling fluid tank, container, or pit. Other equipment or devices may be positioned therebetween. For example, a fluid or mud chiller and/or shale shaker may be positioned prior to the drilling fluid tank, container, or pit. The heat generated or carried by the drilling fluid or drilling mud, as well as the heat produced by the equipment on-site (e.g., engine exhaust and/or cooling fluid in a water jacket of an engine, computing devices or systems, and/or any other equipment which generates heat during drilling operations), may be utilized via either external and/or internal heat exchangers to produce electrical power (e.g., via one or more ORC units or other equipment configured to convert heat to electrical power).

In such examples, ORC generators or units, for example, may use a pipeline in communication with heat sources to allow a working fluid to change phase from liquid to vapor. As the working fluid changes phase from a liquid to a vaporous state, the vaporous state working fluid may flow up the pipe or pipeline to a gas expander. The vaporous state working fluid may flow through and cause the gas expander to rotate. The rotation of the gas expander may cause a generator to generate electrical power, as will be described below. The vaporous state working fluid may flow through the gas expander to a heat sink, condenser, or other cooling apparatus. The heat sink, condenser, or other cooling apparatus may cool the working fluid thereby causing the working fluid to change phases from a vapor to a liquid.

In the present disclosure, a drilling fluid return pipeline may connect directly to an inlet of a drilling fluid heat exchanger or may connect to a secondary supply pipeline via a drilling fluid control valve, the secondary supply pipeline connecting to the inlet of the drilling fluid heat exchanger. In such embodiments, the drilling fluid may flow directly to and through the drilling fluid heat exchanger or the drilling fluid control valve may divert a portion or all of the drilling fluid to the drilling fluid heat exchanger. The drilling fluid may flow through the drilling fluid heat exchanger thereby facilitating transfer of heat from the flow of drilling fluid to a working fluid.

Sensors to sense or determine various characteristics of the drilling fluid and/or other heated fluid from other equipment may be positioned throughout the drilling rig. In such an embodiment, the drilling fluid control valve's position may be adjusted to increase or decrease the amount of drilling fluid flowing to the drilling fluid heat exchanger. Similar valves may be included for each heat source. Further, each heat exchanger may connect to a return manifold and a supply manifold, each manifold positioned between the heat exchangers and the ORC unit. The supply manifold and/or the return manifold may include flow control devices to adjust the amount of working fluid flowing to any particular heat exchanger, thus enabling control of electrical power output and/or other factors.

For example, adjustment of a first working fluid flow control device may cause an increase or decrease in a working fluid flow to the drilling fluid heat exchanger thereby causing a decrease or increase, respectively, in the temperature in drilling fluid. Based on the increase or decrease of working fluid to the drilling fluid heat exchanger and a preselected or predetermined temperature of the drilling fluid, a mud chiller may or may not be utilized to a degree to cool the drilling fluid further. The mud chiller may utilize electrical power. As the temperature of the drilling fluid increases, the electrical power utilized by the mud chiller may increase. In an embodiment, to offset such an increase in utilized electrical power, the ORC unit may supply electrical power to the mud chiller.

As noted, other heat sources may be utilized, for example engine exhaust and/or fluid from an engine's water (or other coolant) jacket. In such embodiments, a second working fluid flow control device may control a flow of working fluid to an exhaust heat exchanger. The exhaust fluid heat exchanger may be configured to transfer heat from exhaust generated by the engine to the flow of the working fluid, the transferred heat to cause an ORC unit to generate electrical power. Adjustment of the second working fluid flow control device may cause an increase or decrease in working fluid flow to the exhaust heat exchanger. An increase in working fluid may cause an increase in overall electrical power generated by the ORC unit due to the high heat of the exhaust. Such an action may be performed to optimize engine and generator set performance (e.g., the engine may be utilized to generate a lesser amount of electrical power). A third working fluid flow control device may control a flow of working fluid to a water jacket heat exchanger (or a heater exchanger that uses another type of coolant, for example). The water jacket fluid heat exchanger may be configured to transfer heat from water jacket fluid of a water jacket, the water jacket configured to cool the engine, to the flow of the working fluid, the transferred heat to cause an ORC unit to generate electrical power. Adjustment of the third working fluid flow control device may cause an increase or decrease in working fluid flow to the water jacket heat exchanger. Increasing flow of working fluid to the water jacket heat exchanger may cause an increase in engine performance due to increased heat transfer from the engine to the working fluid (e.g., extending life of consumables and parts of the engine, as well as increasing engine efficiency and/or output).

After passing through the heat exchanger, the drilling fluid may be cooled for a period of time in the drilling fluid tank or container. After a period of time or preselected or predetermine time interval in the drilling fluid tank the drilling fluid may be cooled radiantly. In other words, as the drilling fluid resides in the tank, over time, the drilling fluid may cool or the drilling fluid temperature may decrease. In such embodiments, as the drilling fluid is pumped from the drilling fluid tank, the drilling fluid may be pumped through a drilling fluid chiller, also known as a mud chiller. The mud chiller, utilizing electrical power, may further cool the drilling fluid. The drilling fluid pumped from the drilling fluid tank may be pumped back through the same fluidic path again (e.g., back to the drill string or drill pipe) and the operation repeated for the duration of the drilling operation. Thus, heat from the flow of drilling fluid, exhaust, fluid from a water jacket (or other coolant jacket), and/or other fluid may be utilized to generate electrical power in a power generation unit such as an ORC unit as will be understood by those skilled in the art, while increasing efficiency of and/or optimizing drilling rig operations.

Such embodiments of systems, for example, may include various components, devices, or apparatuses, such as temperature sensors, pressure sensors or transducers, flow meters, control valves, smart valves, valves actuated via control signal, controllers, a master or supervisory controller, other computing devices, computing systems, user interfaces, in-field equipment, and/or other equipment as will be understood by those skilled in the art. The controller, for example, may monitor and adjust various aspects of the system to ensure that a flow of gas does not drop below the threshold where volatiles may condense in the flow of gas, that the temperature of the flow of gas stays below the threshold where a compressor or pump provides a higher output, that the flow of gas remains within a selected operating range, that the working fluid remains within a selected operating range, and/or that electrical power is generated efficiently and economically.

Figure 1B:
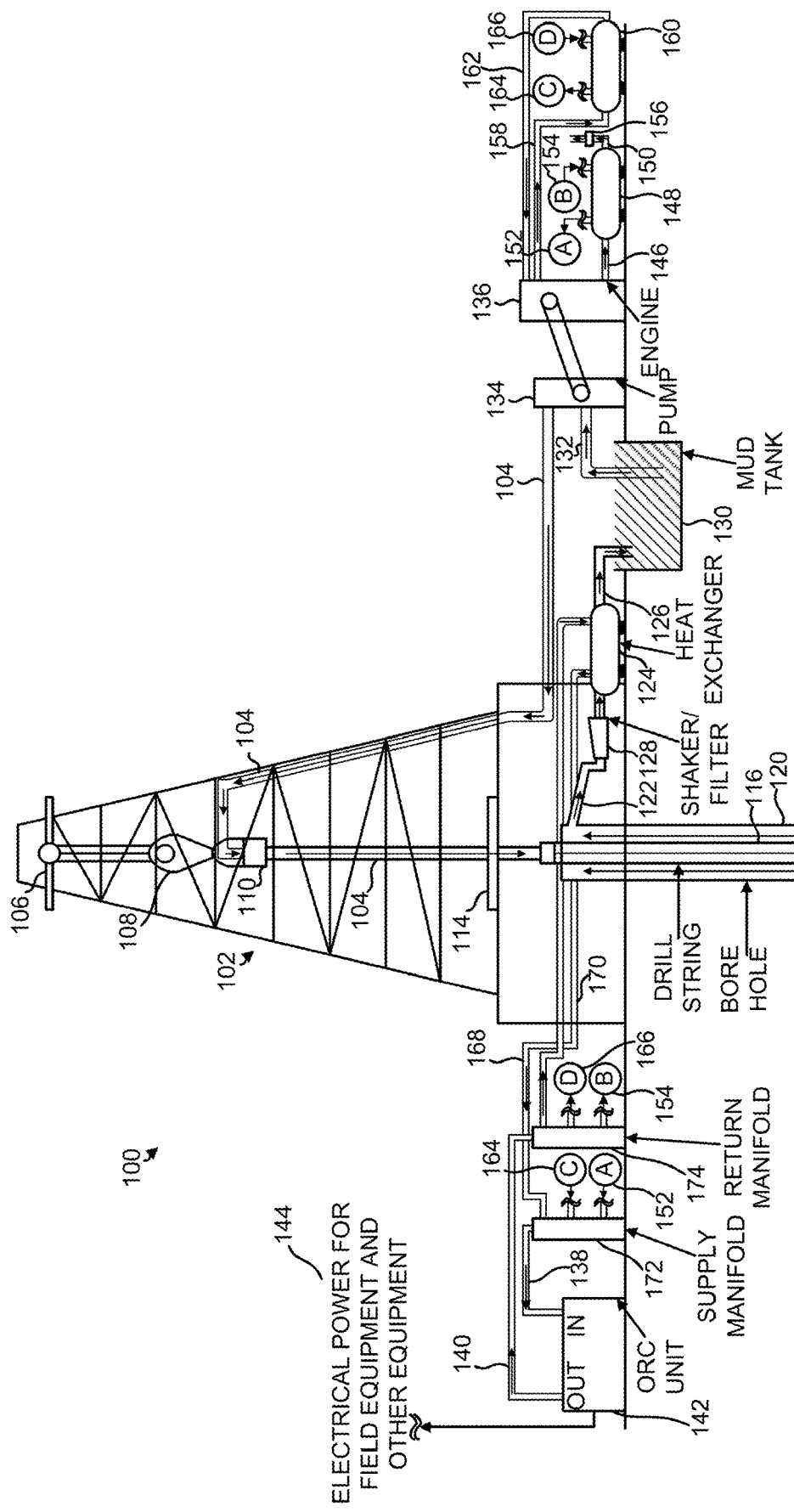
Figure 1C:
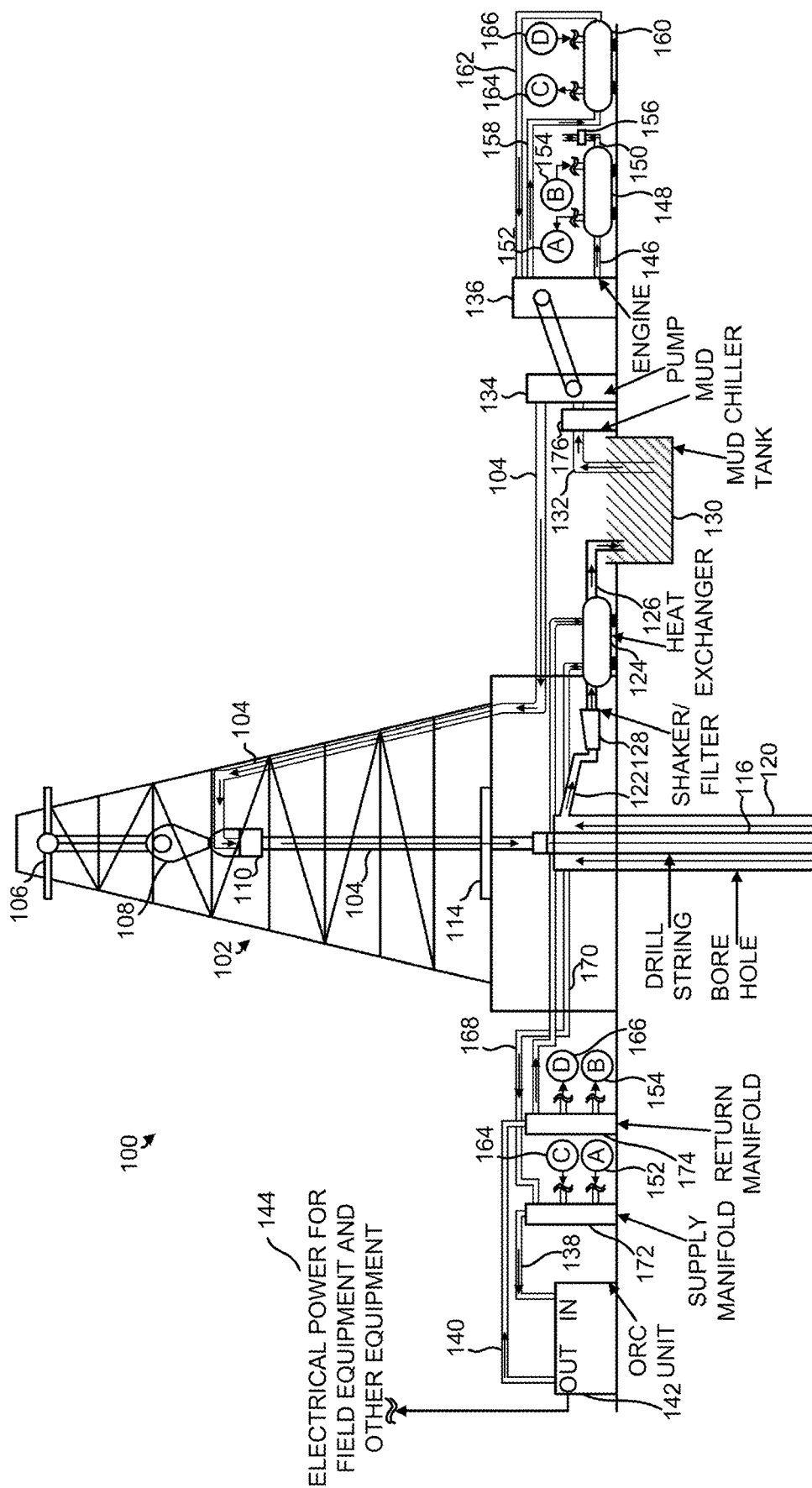

FIG. 1A, FIG. 1B, and FIG. 1C are side-view perspectives of example implementations of systems to generate electrical power at a drilling rig, according to one or more embodiments of the disclosure. A drilling rig 100, as illustrated in FIG. 1A, may include various equipment and/or devices. The equipment and/or devices may include a drilling fluid tank, also referred to as a drilling fluid pit or drilling fluid container. The drilling fluid tank (e.g., a mud tank 130) may store drilling fluid (e.g., drilling mud). The drilling fluid tank may be comprised of steel or other metal configured to withstand corrosion. The drilling fluid tank may store varying amounts of drilling fluid. The amount of drilling fluid may vary at different time intervals as the length of the borehole increases and/or as additional drilling fluid is added to the drilling fluid tank. The drilling fluid, also referred to as drilling mud, may include a water-based mud (e.g., dispersed or non-dispersed), non-aqueous mud (e.g., oil based mud), and/or a gaseous drilling fluid. During drilling operations, the drilling fluid may be pumped (e.g., via a pump 134 driven by an engine 136) to a drill bit 118 to cool the drill bit 118, carry cuttings, and/or to provide hydrostatic pressure (e.g., preventing formation fluids from entering the borehole 120).

The drilling rig 100, as noted, may include a pump 134 to pump the drilling fluid to a borehole 120. The pump 134 may first pump the drilling fluid from the drilling fluid tank via drilling fluid input pipe 132. The pump 134 may pump such fluid through a stand pipe 104. In other embodiments, the stand pipe 104 may be a goose neck pipe, a kelly hose, another pipeline or hose configured to withstand high pressure, or some combination thereof. The stand pipe 104 may pass through and/or be supported by a swivel 110. The swivel 110 may connect to a travel block 108 and the travel block 108 may connect to a crown block 106. The crown block 106 may be stationary and may be configured to raise and lower the travel block 108 thereby allowing the stand pipe 104 or other pipeline or hose to move in a vertical direction. The stand pipe 104 may pass through a table 114 at the drill floor 112. The stand pipe 104 may then connect to the drill string 116 or drill pipe thereby allowing drilling fluid to be pumped through the stand pipe 104 to an inner cavity of the drill string 116. The inner cavity of the drill string 116 may be defined by the space substantially within the inner surface of the drill string 116.

The drill string 116 may include a proximal end and a distal end. The proximal end may connect to the stand pipe 104. The distal end may include or may be connected to a drill bit 118. The drill string 116 may rotate, via the rotary table 114 and/or other equipment or devices, as will be understood by a person skilled in the art. As the drill string rotates 116, the drill bit 118 may rotate. In another embodiment, in addition to or rather than the rotation of the drill string 116 causing rotation of the drill bit 118, the drilling fluid pumped through the drill string 116 may cause the drill bit 118 to rotate. As the drill bit 118 rotates, the drill bit 118 may cut or break apart rock and/or other materials in the subsurface formation. Such an action may create a borehole 120 in the subsurface formation, which may be utilized for various purposes, including, but not limited to, for oil and gas extraction (e.g., via fracturing or a well), water well formation, carbon dioxide sequestration, and/or geothermal well generation.

The pump 134 may be driven by an engine 136. In an embodiment, the rotary table 114 or the rotation of the drill string 116 may be driven by the engine 136 and/or another engine. Further, additional engines and/or generators or generator sets (e.g., to provide electrical power to equipment and/or devices at the drilling rig 100) may be included or positioned at the drilling rig 100. Such additional engines may be utilized to generate electrical power and/or drive other equipment and/or devices. The engine 136 and/or other additional engines at the drilling rig 100 may include a water (or other fluid) jacket as will be understood by those skilled in the art. Further, the engine, during operation, may produce exhaust. In other embodiments, the engine 136 may be an electric engine and, thus, no exhaust may be produced. The pump 134 may be in fluid communication with the mud tank 130, for example, via pipeline 132 (e.g., a tank or container pipe or pipeline). As the pump 134 is driven by the engine 136, the drilling fluid may flow through the pump 134 to the stand pipe 104 and from the stand pipe 104 to the drill string 116. The drilling fluid may flow through and/or around the drill bit 118, thus cooling the drill bit 118 and carrying cuttings up the borehole 120 (e.g., via an annulus defined by a space between an outer surface of the drill string 116 and an inner surface of the borehole 120).

As the drilling fluid flows up the borehole 120, the drilling fluid may reach a drilling fluid return pipeline 122. The drilling fluid return pipeline 122 may, in an embodiment, connect directly to a heat exchanger 124 (e.g., a drilling fluid heat exchanger). In another embodiment, the drilling fluid return pipeline 122 may connect to the mud tank 130 or other equipment (e.g., a shale shaker 128 or filter, a degasser, and/or a mud chiller) positioned therebetween. For example, the drilling fluid return pipeline 122 may connect to a shale shaker 128. The shale shaker 128 may remove any solids from the drilling fluid flowing therethrough. The shale shaker 128 may connect to the heat exchanger 124 and the heat exchanger may connect to the mud tank 130. In another embodiment, a second pipeline may be connected to the drilling fluid return pipeline 122. The second pipeline may include a control valve and the drilling fluid return pipeline 12 may include a control valve. Thus, based on various factors, the amount of drilling fluid flowing to the heat exchanger 124 may be controlled. In the embodiments, the heat exchanger 124 may connect to the mud tank 130 via a third pipeline 126.

In an embodiment, different types of heat exchangers may be utilized at the drilling rig 100. The heat exchanger 124 may be internal to the ORC unit 142 and/or external to the ORC unit 142. In an embodiment, the heat exchanger 124 may be a shell and tube heat exchanger, a spiral plate or coil heat exchanger, a heliflow heat exchanger, or another heat exchanger configured to withstand high temperatures, high pressure, and/or corrosive fluids. To prevent damage or corrosion to the heat exchanger 124 over a period of time, the fluid path inside the heat exchanger 124 for the flow of drilling fluid may be configured to withstand damage or corrosion by including a permanent coating, a semi-permanent coating, a temporary anti-corrosive coating, an injection point for anti-corrosive chemical additive injections, and/or some combination thereof. Further, at least one fluid path of the heat exchanger 124 may be comprised of an anti-corrosive material, e.g., anti-corrosive metals or polymers.

The direction of drilling fluid flowing through the heat exchanger 124 may be opposite of the flow of working fluid flowing through the heat exchanger 124, thereby the heat exchanger 124 facilitates transfer of heat from the drilling fluid to the working fluid. The working fluid may flow from the ORC unit 142 to the heat exchanger via pipeline 140.

After heat transfer within the heat exchanger 124, the working fluid may flow through pipeline 138 to the ORC unit 142, thereby causing an ORC operation to occur and electrical power 144 to be generate. In another embodiment, the heat exchanger 124 may be internal to the ORC unit 142 and, in such embodiments, pipeline 140 and pipeline 138 may be internal to the ORC unit 142.

In an example, the working fluid may be a fluid with a low boiling point and/or high condensation point. In other words, a working fluid may boil at lower temperatures (for example, in relation to water), while condensing at higher temperatures (e.g., in relation to water) as will be understood by a person skilled in the art. The working fluid may be an organic working fluid. The working fluid may be one or more of pentafluoropropane, carbon dioxide, ammonia and water mixtures, tetrafluoroethane, isobutene, propane, pentane, perfluorocarbons, other hydrocarbons, a zeotropic mixture of pentafluoropentane and cyclopentane, other zeotropic mixtures, and/or other fluids or fluid mixtures. The working fluid's boiling point and condensation point may be different depending on the pressure within the working fluid pipelines e.g., the higher the pressure, the higher the boiling point. In another example, the working fluid may be an intermediate working fluid. The intermediate working fluid may be a fluid with a higher boiling point. For example, the intermediate working fluid may be water or a water glycol mixture. In such examples, as heat is transferred from the flow of drilling fluid, the exhaust, the fluid from the water (or other fluid) jacket, and/or from another source, the intermediate working fluid may, rather than exhibiting a vaporous phase change, remain in a liquid phase, while retaining the transferred heat. As a liquid, the higher boiling point intermediate working fluid may be more manageable and/or easier to transport through the pipelines. In such examples, the ORC unit 142 may include an internal heat exchanger.

In an embodiment, the ORC unit 142 may include a generator, a gas expander, a condenser, an internal heat exchanger, a loop for the flow of working fluid, or some combination thereof. As an intermediate working fluid or other fluid flows into the ORC unit 142, the internal heat exchanger may facilitate transfer of heat in the intermediate working fluid or other fluid to a working fluid of the ORC unit 142. The heat may cause the working fluid of the ORC unit 142 to exhibit a phase change from a liquid to a vapor. In another embodiment, the working fluid may enter the ORC unit 142 as a vapor or vaporous working fluid (e.g., such an ORC unit 142 may not include an internal heat exchanger). The vaporous working fluid may flow into the gas expander. In an example, the gas expander may be a turbine expander, positive displacement expander, scroll expander, screw expander, twin-screw expander, vane expander, piston expander, other volumetric expander, and/or any other expander suitable for an ORC operation or cycle. As gas flows through the gas expander, a rotor or other component connected to the gas expander may begin to turn, spin, or rotate. The rotor may include an end with windings. The end with windings may correspond to a stator including windings and a magnetic field (e.g., the end with windings and stator with windings being a generator). As the rotor spins within the stator, electricity may be generated. Other generators may be utilized, as will be understood by those skilled in the art. The generator may produce DC power, AC power, single phase power, or three phase power. The vaporous working fluid may then flow from the gas expander to a condenser, where the vaporous working fluid may exhibit a phase change back to the liquid working fluid. The liquid working fluid may then flow back to the internal heat exchanger, the process repeating.

The electrical power 144 may be transferred to or utilized by the equipment at the site 100 (e.g., a mud chiller 176 and/or other equipment), to an energy storage device (e.g., if excess power is available), to equipment at other nearby sites, to the grid or grid power structure (e.g., via a transformer through power lines), to other types of equipment (e.g., cryptographic currency and/or block chain miners, hydrolyzers, carbon capture machines, nearby structures such as residential or business structures or buildings, and/or other power destinations), or some combination thereof. Such electrical power 100 may be utilized at the drilling rig 100 in lieu or in addition too electrical power generate by a generator or generator set driven by additional engines.

Turning to FIG. 1B and as noted, the engine 136 or one or more engines may produce exhaust exhibiting high heat or temperature. The exhaust may be transported via an exhaust duct 146 or pipeline to a heat exchanger 148 or ORC unit 142 (e.g., via pipeline 152). After the exhaust flows through the heat exchanger 148 or the ORC unit 140, the exhaust may be output to the atmosphere, via an exhaust outlet duct 150. In another embodiment, prior to output of the exhaust to the atmosphere, the exhaust may pass through a filter 156 or catalyst. The filter 156 may remove specific chemicals deemed harmful to the environment. In another embodiment, prior to input into the heat exchanger 148, the exhaust may be filtered or pass through a catalyst to prevent buildup within the heat exchanger 148. If additional engines are positioned at the drilling rig 100, then, in an embodiment, the exhaust from such additional engines may be transported to the heat exchanger 148 or ORC unit 142 or may be transported to one or more additional heat exchangers.

In an embodiment, sensors and/or meters may be disposed throughout the drilling rig 100. The sensors and/or meters may be temperature sensors, densitometers, density measuring sensors, pressure transducers, pressure sensors, flow meters, turbine flow meters, mass flow meters, Coriolis meters, spectrometers, other measurement sensors to determine a temperature, pressure, flow, composition, density, or other variables as will be understood by those skilled in the art, or some combination thereof. Further, the sensors and/or meters may be in fluid communication with a fluid to measure the temperature, pressure, or flow or may indirectly measure flow (e.g., an ultrasonic sensor). In other words, the sensors or meters may be a clamp-on device to measure flow indirectly (such as via ultrasound passed through the pipeline to the fluid).

In an embodiment, the exhaust duct 146 or pipeline may include an exhaust valve. In an embodiment, the exhaust from the engine 136 may be at a high temperature or have a high thermal mass (e.g., temperature of the exhaust multiplied by the flow rate of the exhaust). If the temperature or thermal mass of the exhaust (e.g., as measured by a temperature sensor) is outside of a range (e.g., defined by the operating temperature range of the heat exchanger 148, ORC unit 142, or other equipment or devices interacting with the exhaust and/or based on thermal mass) or above or below a threshold, the exhaust control valve may close, thereby partially or fully preventing the exhaust from flowing to the heat exchanger 148. If the exhaust control valve is fully closed, the exhaust may be fully diverted to a typical exhaust output. If the exhaust control valve is partially closed, the exhaust may be partially diverted to a typical exhaust output, while the remaining portion may flow to the heat exchanger 148. The partial or full prevention of the flow of exhaust to the heat exchanger 148 may prevent interruption of catalyst performance of the engine 136 and/or deposition of particulates in equipment.

In another embodiment, the flow of exhaust, prior to flowing through the heat exchanger 148, may pass through a filter, converter, or some other device to reduce particulates within the exhaust. As noted, the exhaust may cause scaling and/or deposition of such particulates. The filter or other device may ensure that the heat exchanger 148 may not exhibit such scaling and/or deposition of particulates or may not exhibit the scaling and/or deposition at rates higher than if there were no filter or other device.

The engine 136 or one or more engines may include a water (or other fluid) jacket. As an engine 136 operates, the water or other coolant (i.e., fluid) inside the water jacket may indirectly remove heat from the engine 136. Heat from the engine 136 may be transferred to the water or other coolant, thereby producing heated water or other coolant. The heated water or other coolant may pass through a radiator, heat sink, or other type of heat exchanger to reduce the temperature of heated water or coolant, the cooled water or coolant then flowing back to the water jacket to cool the engine 136. In an embodiment, the output of the water jacket may connect to a pipeline 158 to divert the flow of water to the heat exchanger 160.

In an embodiment, a water jacket control valve may be positioned on the pipeline to control the flow water or coolant from the water jacket. A pipeline 162 may be connected to the input of the water jacket to return the water or other coolant to the water jacket. In such embodiments, rather than or in addition to the water or other coolant passing through the typical radiator or heat exchanger, the heated water or other coolant may pass through heat exchanger 160 thereby transferring heat to a working fluid. The working fluid may flow, in one embodiment, to the ORC unit 142 via pipeline 164 and the working fluid may return to heat exchanger 160 via pipeline 166. In another embodiment, the engine's 136 water jacket may be configured to transport the water or other coolant directly to the ORC unit 142. In another embodiment, the water jacket control valve may close if the water or other coolant is outside a selected operating range (e.g., if the water or other coolant is too cool, then, if utilized, water or other coolant may not be sufficient for the ORC unit 142 to generate electrical power, and/or if the water or coolant is too hot, then, if utilized, the heated water or other coolant may damage equipment not rated for a high temperature) thus preventing fluid from flowing to the heat exchanger 160 and/or the ORC unit 142. Temperature of the water or coolant may be determined or sensed via one or more temperature sensors. The temperature of the working fluid or intermediate working fluid may be determined or sensed via one or more temperature sensors.

As noted, heat may be transferred from the engine's 136 exhaust, from working fluid, and/or from drilling fluid to an intermediate working fluid or a working fluid. The intermediate working fluid may be stored in another storage tank or expansion tank. The temperature of the intermediate working fluid flowing from the heat exchanger 148 may be determined based on measurements from temperature sensors proximate to the heat exchanger 148. The temperature of the intermediate working fluid may be measured at various other points, such as after the storage tank or the storage tank control valve or prior to entry into the heat exchanger. Based on these measurements, a storage tank control valve may open or close to prevent or allow the storage tank to fill up and/or to prevent over-filling the storage tank. In an embodiment, the storage tank may be an expansion tank, such as a bladder or diaphragm expansion tank. The expansion tank may accept a varying volume of the intermediate working fluid as the pressure within the working fluid pipeline varies, as will be understood by a person skilled in the art. Thus, the expansion tank may manage any pressure changes exhibited by the intermediate working fluid.

In an embodiment, various temperature sensors and/or other sensors or meters may be disposed and/or positioned throughout the drilling rig 100. In another embodiment, the heat exchangers and/or ORC unit or units may be added to the site as a kit. In such examples, temperature sensors and/or other sensors or meters, in addition to control valves and/or other devices or equipment, may be included in the added kit (e.g., along added or installed conduits or pipelines) installed at a drilling rig 100, rather than in existing equipment.

The drilling rig 100, as shown, utilizes an ORC unit 142 to generate electrical power. In another embodiment, rather than or in addition to the ORC unit 142, other geothermal-based generators may be utilized to generate electrical power using the heat transferred to the working fluid from the flow of drilling fluid, engine exhaust, and/or fluid from a water jacket. For example, the geothermal-based generator may be another type of binary-cycle generator. In another embodiment, one or more of the one or more heat sources (e.g., the heat from the drilling fluid, engine exhaust, and/or fluid from the water jacket, among other heat sources) may be utilized to generate electrical power in the ORC unit 142 or other geothermal-based generators based on a number of factors, the factors including but not limited to, an amount of electrical power utilized at the drilling rig 100, engine performance, engine life expectancy, drill bit and/or bottom-hole assembly component life expectancy, ambient temperature, and/or other aspects.

Additionally, as illustrated in FIG. 1B and FIG. 1C, the drilling rig 100 may include additional heat exchangers and a return manifold 174 and supply manifold 172. In another embodiment, the drilling rig 100 may include additional ORC units. As illustrated in FIG. 1B and FIG. 1C, each heat exchanger may connect to a supply manifold 172 to transport the flow of working fluid to the intake of an ORC unit 142. Further, each heat exchanger may connect to a return manifold 174 to receive the working fluid from the ORC unit 174. In another embodiment, the supply manifold 172 and/or return manifold 174 may control, either directly or indirectly (e.g., via another flow control device), the amount or rate of flow of working fluid flowing to the ORC unit 142 and/or to each heat exchanger.

In another embodiment, the drilling rig 100 may include a separate supply manifold and return manifold for hot working fluid supply/return and for cool working fluid supply/return. In such examples, the separate supply manifolds and return manifolds may control the flow of working fluid based on temperature of the working fluid from each source (e.g., each heat exchanger).

In FIG. 1C, the drilling rig 100 may include a mud chiller 176. As noted, the drilling fluid may cool the drill bit 118 to extend the life or use of the drill bit 118 and/or other bottom-hole assembly components. As such, the drilling fluid may be cooled further prior to pumping the drilling fluid back to the drill bit 118 (e.g., via the same fluidic path described herein). In some examples, the heat exchanger 124 may sufficiently cool the drilling fluid. In other examples, the drilling fluid may reside in the mud tank 130 for a period of time or a preselected or predetermined time interval sufficient to cause the drilling fluid to radiantly cool to a specified temperature. In other example, a mud chiller 176 may be included to further cool the drilling fluid. The mud chiller 176 may utilize electrical power generated by a generator or generator set. The mud chiller 176 may be positioned prior to (as illustrated in FIG. 1C) or after the pump 134. As drilling fluid is pumped from the mud tank 130, the drilling fluid may pass through the mud chiller 176, the mud chiller 176 further cooling the drilling fluid. In such examples, to lower reliance on fossil fuel generated electrical power, the mud chiller 176 may utilize electrical power generated by the ORC unit 142, in addition to or rather than electrical power from a generated by a generator or generator set.

Figure 2A:
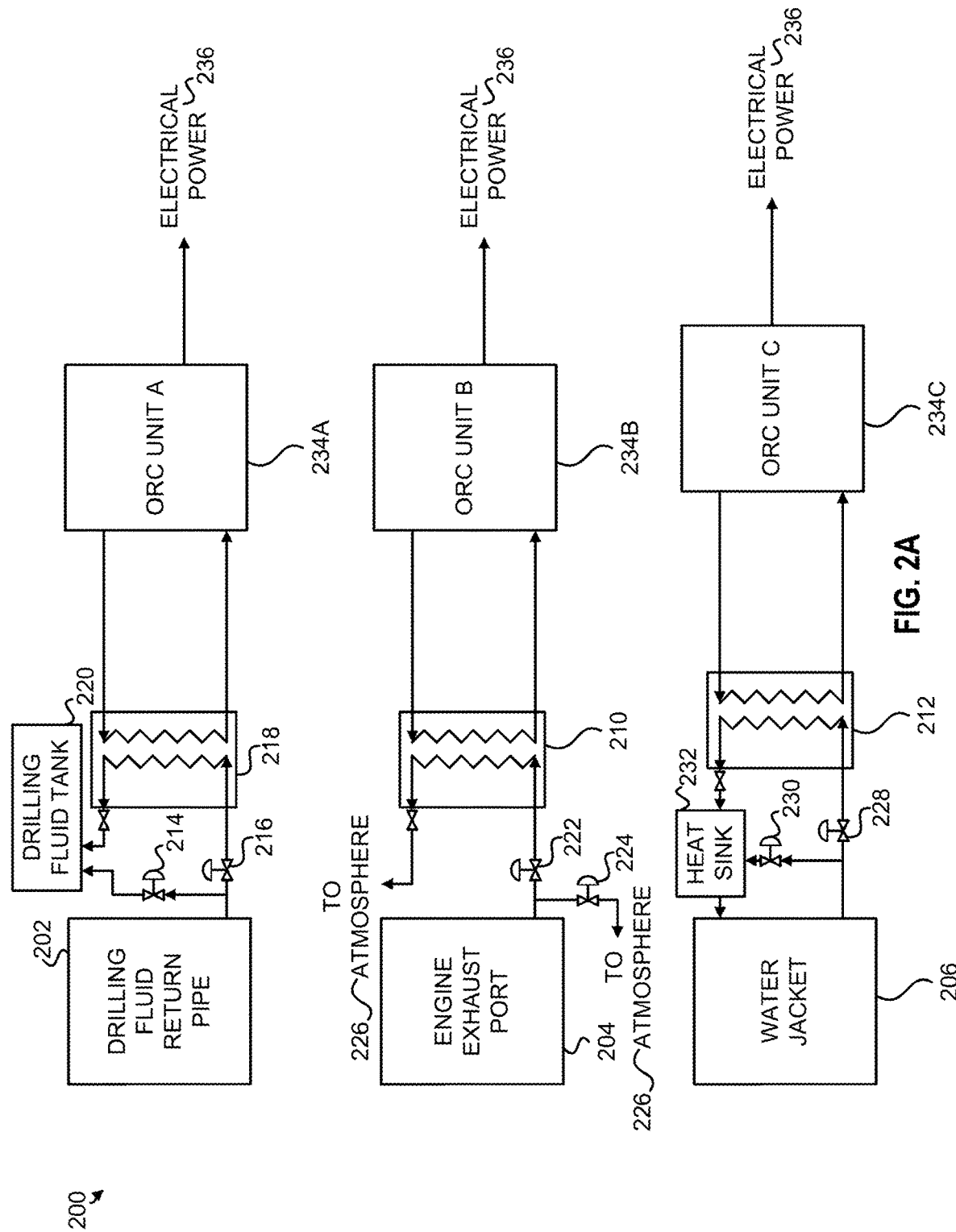
FIG. 2A, FIG. 2B, FIG. 2C, FIG. 2D, FIG. 2E, FIG. 2F, FIG. 2G, and FIG. 2H are block diagrams illustrating implementations of systems of an electrical power generation enabled drilling rig to provide electrical power to one or more of in-field equipment, equipment at other sites, energy storage devices, and the grid power structure, according to one or more embodiment of the disclosure.

FIG. 2A, FIG. 2B, FIG. 2C, FIG. 2D, FIG. 2E, FIG. 2F, FIG. 2G, and FIG. 2H are block diagrams illustrating example implementations of an electrical power generation enabled drilling rig to provide electrical power to one or more of in-field equipment, equipment at other sites, energy storage devices, and the grid power structure, according to one or more embodiment of the disclosure. Turning first to FIG. 2A, a drilling rig 200 may include one or more heat sources. The one or more heat sources may include drilling fluid from a drilling fluid return pipe 202, exhaust from an engine exhaust port 204, water or other coolant from a water jacket 206, additional engines (e.g., providing additional exhaust and/or fluid from a water jacket) among other sources.

Figure 2B:
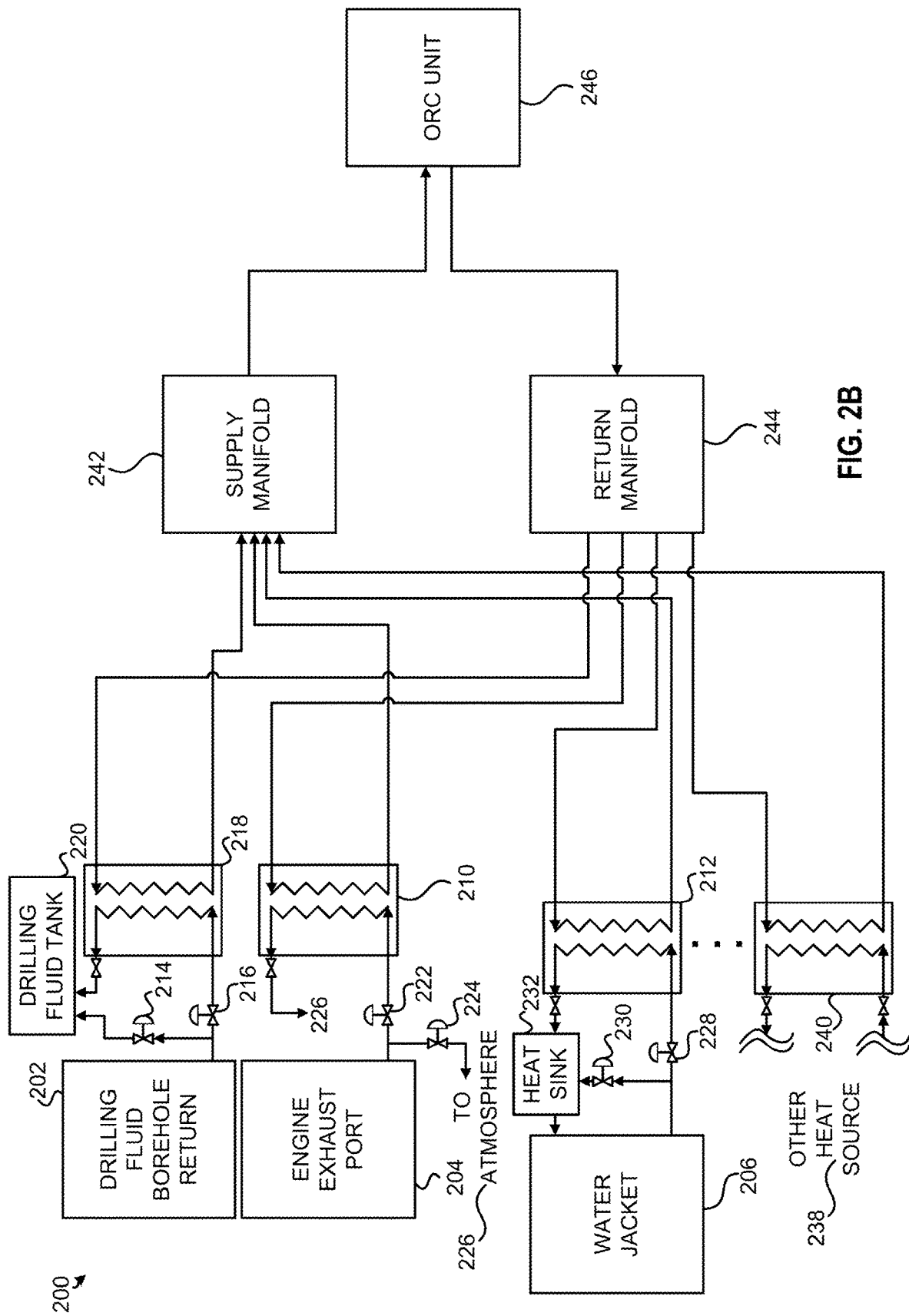

The drilling fluid from the drilling fluid return pipe 202 may, after cooling the drill bit of a drilling rig 200, be heated to about 100 degrees Fahrenheit to about 500 degrees Fahrenheit, or in some examples, hotter than 500 degrees Fahrenheit. As the heated drilling fluid flows into or from the drilling fluid return pipe 202, the temperature of the drilling fluid may be determined or sensed (e.g., via sensor 278 as illustrated in FIG. 2G). If the temperature of the drilling fluid is within a specified or preselected temperature range, control valve 216 may open to a position to allow a portion or all of the drilling fluid to flow therethrough to the heat exchanger 218. Further, if the temperature of the drilling fluid is above or below the specified or preselected temperature range, then the control valve 216 may close fully or partially and the control valve 214 may open fully or partially, thus drilling fluid is directed directly, at least partially, to a drilling fluid tank 220. If drilling fluid flows through the heat exchanger 218, then the heat exchanger 218 may facilitate heat transfer from the drilling fluid to a working fluid. The heated working fluid produced by heat exchanger 218 may flow to the ORC unit A 234A and cause the ORC unit A 234A to generate electrical power 236.

The exhaust from the engine exhaust port 204 may be heated to about 500 degrees Fahrenheit to about 1200 degrees Fahrenheit. The exhaust may exit the engine at about 2000 cubic feet per minute to about 20000 cubic feet per minute. As the exhaust flows from the engine exhaust port 204, the temperature and/or thermal mass of the exhaust may be determined or sensed (e.g., via sensor 284 as illustrated in FIG. 2G). If the temperature of the exhaust is within a specified or preselected temperature or thermal mass range, control valve 222 may open to a position to allow a portion or all of the exhaust to flow therethrough to the heat exchanger 210. Further, if the temperature of the exhaust is above or below the specified or preselected temperature or thermal mass range, then the control valve 222 may close fully or partially and the control valve 224 may open fully or partially, thus exhaust is directed directly, at least partially, to the atmosphere. If exhaust flows through the heat exchanger 210, then the heat exchanger 210 may facilitate heat transfer from the exhaust to a working fluid. The heated working fluid may flow to the ORC unit B 234B and may cause the ORC unit B 234B to generate electrical power 236.

The fluid from the water jacket 206 may, after cooling the engine at a drilling rig 200, be heated to about 165° F. to about 230° F. at rate of about 70 gallons per minute to about 250 gallons per minute. As the fluid flows from the water jacket 206, the temperature of the fluid may be determined or sensed (e.g., via sensor 292 as illustrated in FIG. 2G). If the temperature of the fluid is within a specified or preselected temperature range, control valve 228 may open to a position to allow a portion or all of the drilling fluid to flow therethrough to the heat exchanger 212. Further, if the temperature of the fluid is above or below the specified or preselected temperature range, then the control valve 228 may close fully or partially and the control valve 230 may open fully or partially, thus the fluid is directed directly, at least partially, to a heat sink 232. If the fluid flows through the heat exchanger 212, then the heat exchanger 212 may facilitate heat transfer from the fluid to a working fluid. The heated working fluid may flow to the ORC unit C 234C and may cause the ORC unit C 234C to generate electrical power 236.

In an embodiment, one or more of the heat sources may be utilized to generate electrical power 236 in any of the ORC units present at the drilling rig 200. For example, drilling fluid may be utilized, in addition to engine exhaust, to generate electrical power 236 in ORC unit A 234A and ORC unit B 234B (as illustrated in FIG. 2A), respectively. In such an example, heat from the engine exhaust and drilling fluid may be utilized to maximize the amount of electrical power 236 generated, as the engine exhaust may exhibit high temperatures and a cooled drilling fluid may not be cooled further or be cooled less by a mud chiller thereby less electrical power is utilized at the drilling rig 200 overall. In another example, engine exhaust and/or fluid from the water (or other fluid) jacket 206 may be utilized to generate electrical power 236 in ORC unit 246 (as illustrated in FIG. 2B). In such an example, heat from the engine exhaust and/or fluid from the water jacket 206 may be utilized to maximize electrical power 236 and engine performance, as the engine exhaust, as noted, may exhibit a high temperature and transferring heat from the fluid from the water jacket 206 may cool such fluid to a temperature lower than normal thereby enabling additional heat to be transferred from the engine to the fluid in the water jacket 206 and causing the engine to operate for longer (e.g., less wear on parts and/or consumables) and operate at higher efficiency.

As illustrated in FIG. 2B, the drilling rig 200 may include a supply manifold 242 and a return manifold 244. In such examples, the working fluid may coalesce or combine at each manifold (e.g., the supply manifold 242 and the return manifold 244). For example, the working fluid may flow from each of the heat exchangers 210, 212, 218, and up to 240 and combine at the supply manifold 242. The working fluid may then flow through the ORC unit 246 then back to the return manifold 244, where the working fluid may then flow back to each of the heat exchangers 210, 212, 218, and up to 240. The supply manifold 242 and/or return manifold 244 may each include (e.g., internal to or external and proximate to) flow control devices configured to adjust the amount of working fluid flowing to each heat exchanger, thus various aspects of the drilling rig 200 may be controlled (e.g., electrical power generation, engine performance, drill bit and/or bottom-hole assembly component life span, and/ or other aspects). As noted and described herein, the flow drilling fluid, exhaust, and/or fluid from a water jacket, among other fluids from other heat sources, may flow to one of the one or more exchangers 210, 212, 218, and up to 240 via various valves and pipeline. The supply manifold 242, return manifold 244, the flow control devices, the sensors, and/or any other devices described in FIGS. 2A-2H may be positioned or disposed at various points in between the ORC units and heat exchangers in FIG. 1A through FIG. 1C.

Figure 2C:
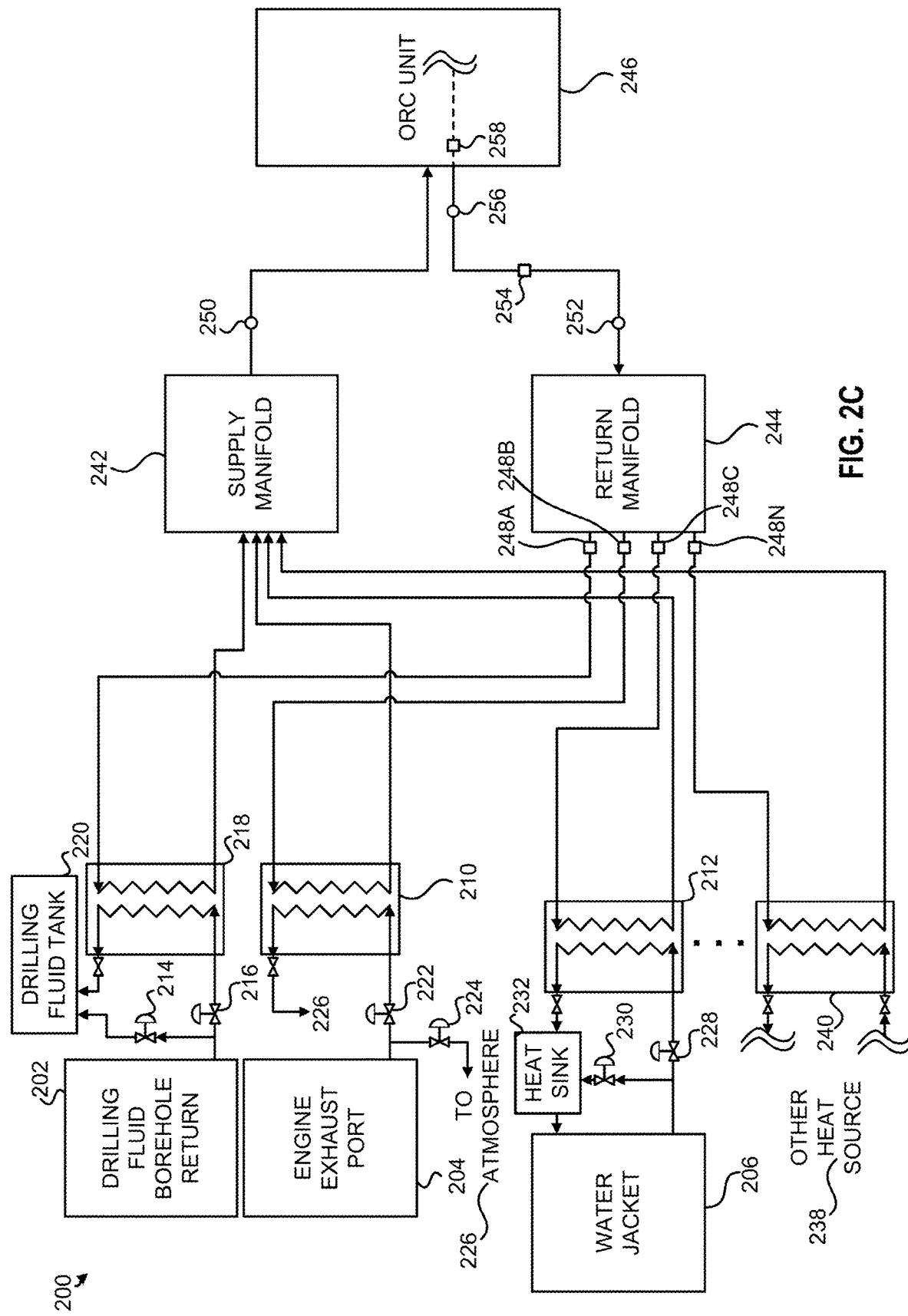
Figure 2D:
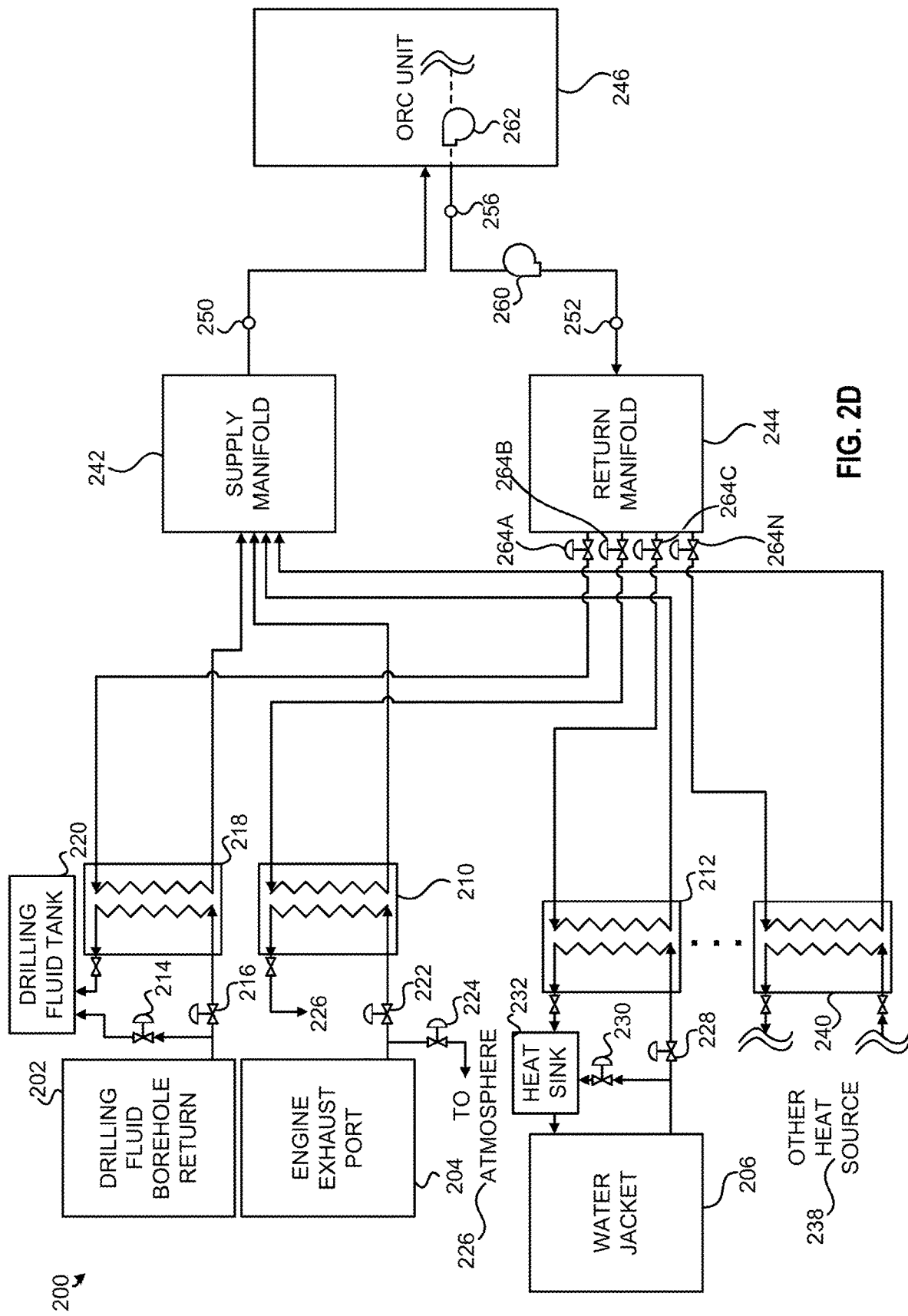
Figure 2E:
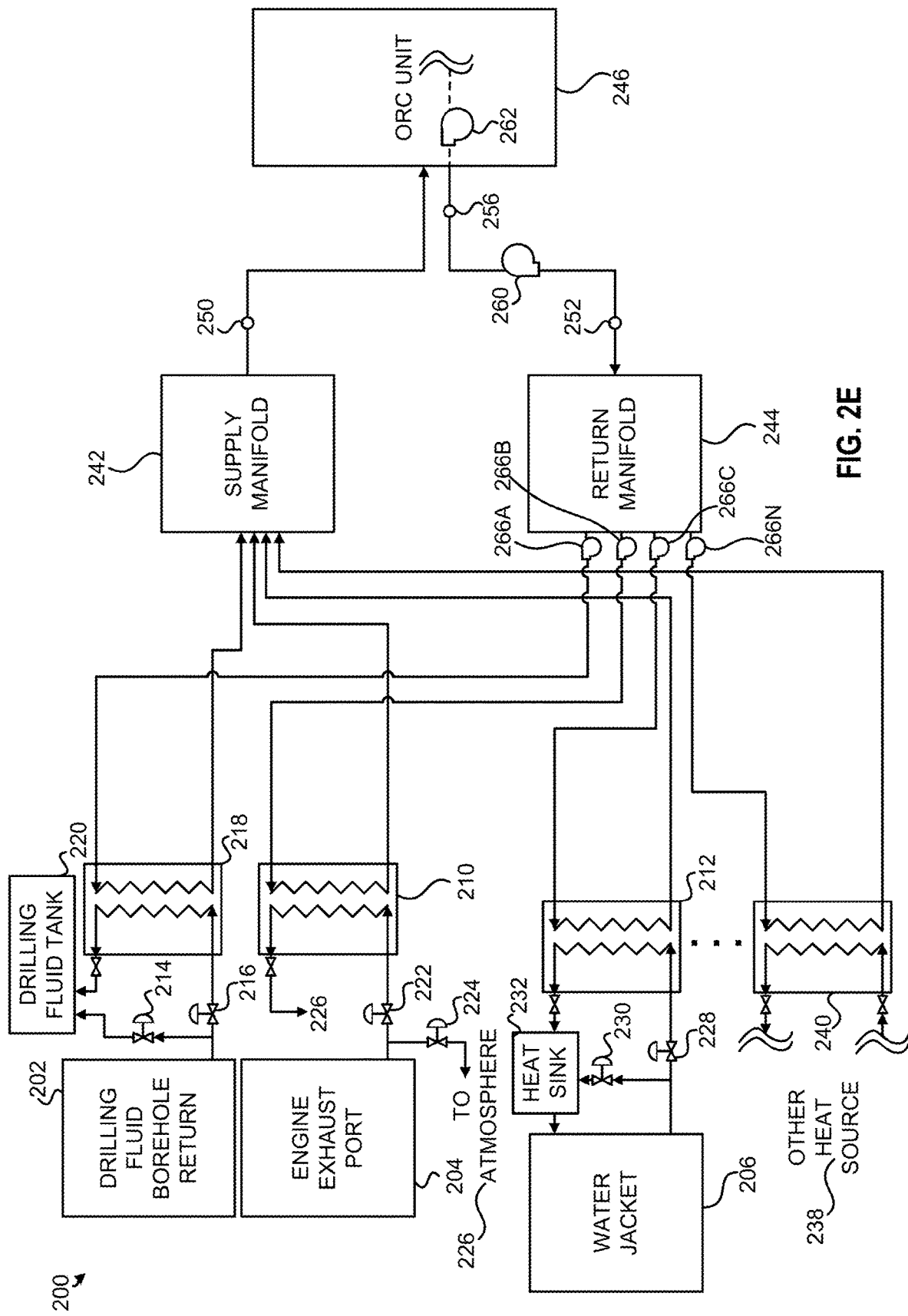
Figure 2F:
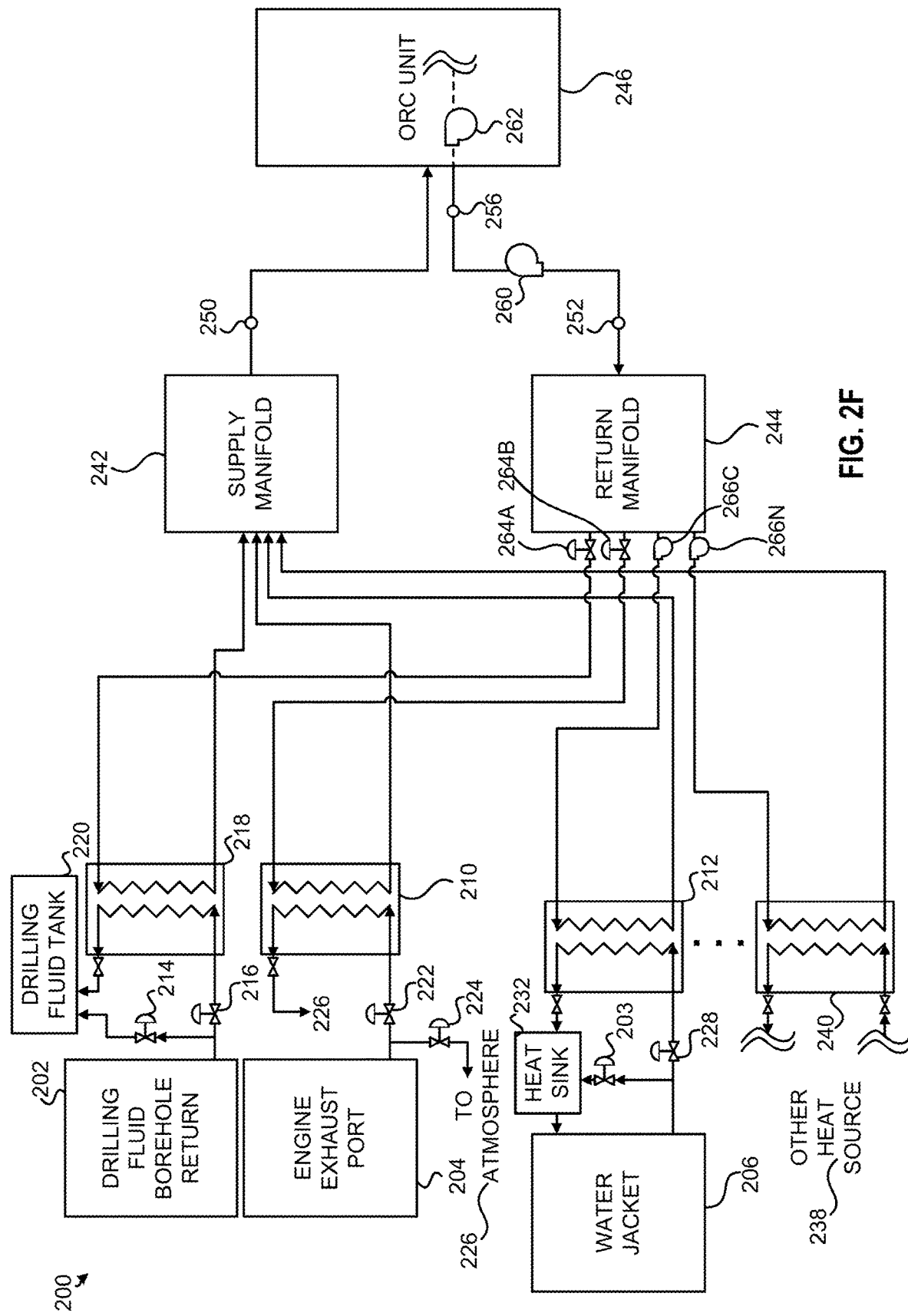
Figure 2G:
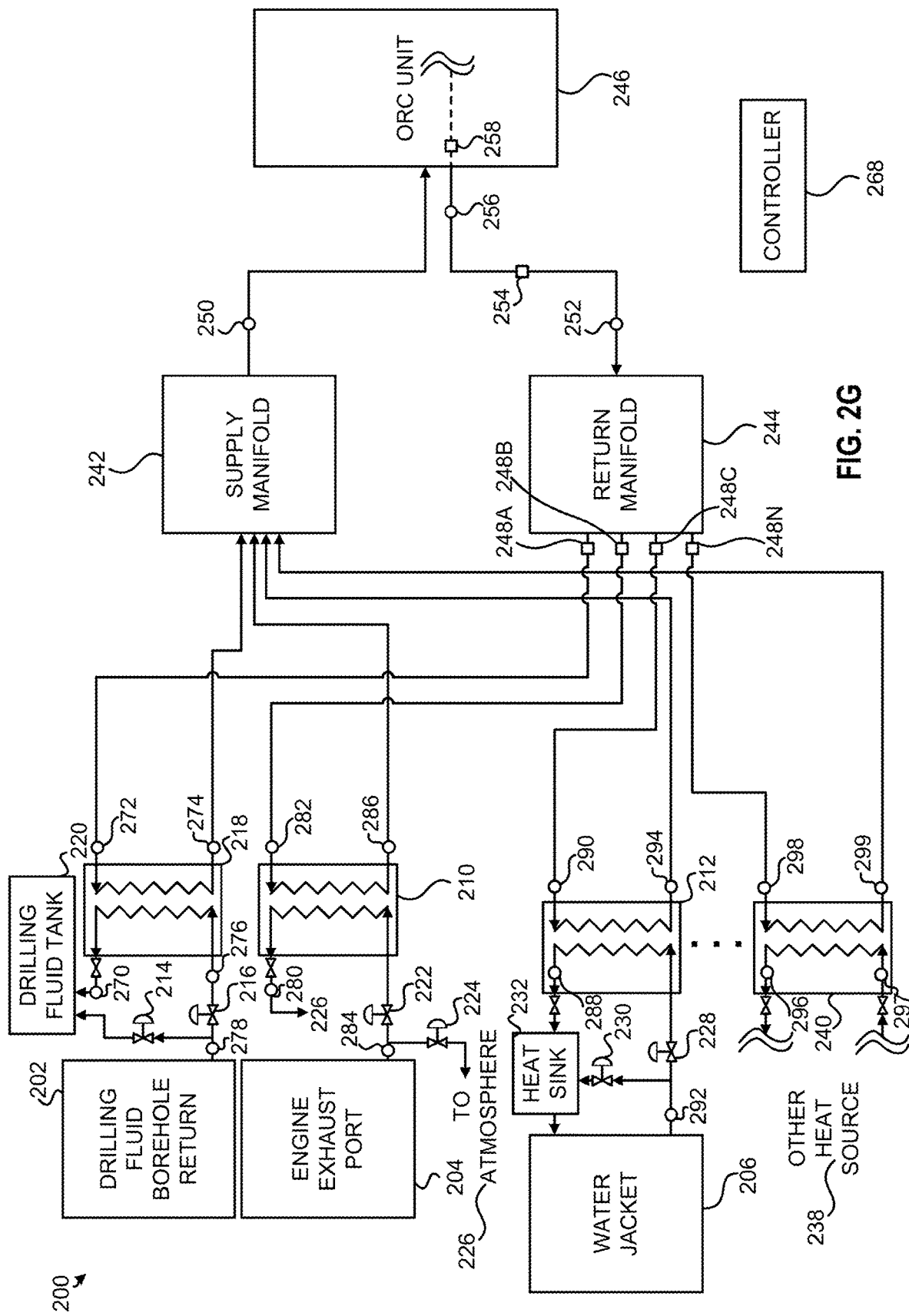

In FIG. 2C, each pipeline from the heat exchangers 210, 212, 218, and up to 240 to the supply manifold 242 may include a sensor (e.g., sensor 274, 286, 294, and 299 as illustrated in FIG. 2G), such as a temperature sensor, flow meter, or other sensor may measure or sense some characteristic of the working fluid. Each pipeline from the return manifold 244 to the heat exchangers 210, 212, 218, and up to 240 may include a sensor (e.g., sensor 272, 282, 290, and 298 as illustrated in FIG. 2G), such as a temperature sensor, flow meter, or other sensor to measure some characteristic of the working fluid. Further, the pipeline positioned between the return manifold 244 and the ORC unit 246 may include one or more flow control devices 254, 258, in addition to one or more sensors 252, 256 (e.g., temperature sensors or some other suitable sensor), thereby controlling the flow of working fluid from the ORC unit 246 to the return manifold 244. Each pipeline from the return manifold 244 to the heat exchangers 210, 212, 218, and up to 240 may further include a flow control device 248A, 248B, 248C, and up to 248N thereby controlling the flow of the working fluid from the return manifold 244 to each of the heat exchangers 210, 212, 218, and up to 240. Utilizing various combinations of each sensor and each flow control device, the temperature and flow of the working fluid may be concisely controlled. The pipeline from the supply manifold 242 to the ORC unit 246 can include a sensor 250 to measure temperature or some other characteristic of the working fluid. Based on the measurements or determinations of the temperature or other characteristic of the working fluid (e.g., flow, pressure, density, etc.), the flow control devices may adjust the amount of working fluid flowing to each of the one or more heat exchangers ensuring that the proper amount of working fluid flows to each of the one or more exchangers. For example, one of the heat exchangers may not be producing heat for use in the ORC unit 246. In such examples, the flow control device associated with that particular heat exchanger may prevent further flow of working fluid to the that heat exchanger.

In FIG. 2D, the flow control devices positioned between the return manifold 244 and each of the one or more heat exchangers 210, 212, 218, and up to 240 may be control valves 264A, 264B, 264C, and up to 264N. The flow control devices between the return manifold 244 and the ORC unit 246 may be a pump 260, while the flow control device within the ORC unit 246 may be a pump 262. In FIG. 2E, the flow control devices used throughout the site may be pumps 266A, 266B, 266C, and up to 266N or variable speed pumps. In FIG. 2F, the flow control devices may include some combination of one or more control valves 264A, 264B, 264C, and up to 264N and/or one or more pumps 266A, 266B, 266C, and up to 266N. In an embodiment, the one or more flow control devices 254, 256, 248A, 248B, 248C, and up to 248N may include one or more of a fixed speed pump, a variable speed drive pump, a control valve, an actuated valve, or other suitable device to control flow of a fluid.

Figure 3:
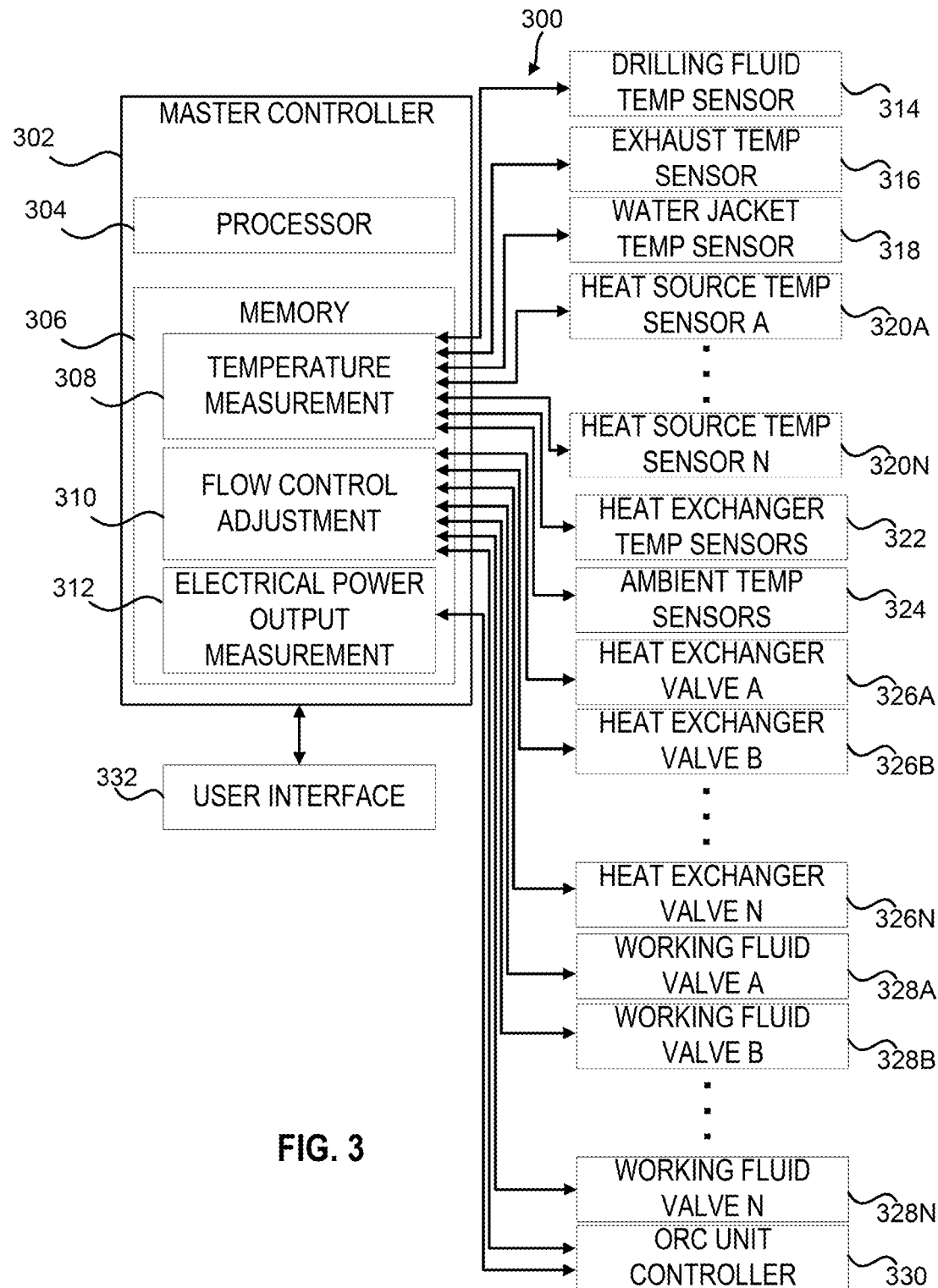
FIG. 3 is a simplified diagram illustrating a control system for managing electrical power production at a drilling rig, according to one or more embodiments of the disclosure.

In FIG. 2G, the drilling rig 200 may include a controller 268 (e.g., such as the master controller in FIG. 3). The controller 268 may include instructions executable by a processor included in the controller 268. The controller 268 may receive various aspects of or data related to the drilling rig 200, such as temperature, pressure, flow rate, and/or other factors from the various sensors disposed or positioned throughout (e.g., sensors 270, 272, 274, 276, 278, 280, 282, 284, 286, 288, 290, 292, 294, 296, 297, 298, 299). Based on the aspects or data received, the controller 268 may adjust each of the control valves and/or flow control devices positioned through the drilling rig 200.

In such embodiments, the flow of working fluid to any of the heat exchangers (e.g., heat exchangers 218, 210, 212, and up to 240) may be controlled via the flow control devices. The controller 268 may utilize the flow control devices to manage, adjust, or maintain a temperature of the flow of drilling fluid, if a flow of drilling fluid flows therethrough. For example, the total percentage of working fluid flowing to each heat exchanger, for example heat exchangers 218, 210, 212, and up to 240, may initially be equal. As temperatures vary and the temperature of the flow of drilling fluid rises or falls and/or the temperature of the engine (based on the temperature of the fluid from the water jacket) rises or falls, then the percentage or amount of working fluid to a particular heat exchanger may be increased or decreased to lower or raise, respectively, the temperature of the flow of drilling fluid and/or fluid from the water jacket flowing therethrough.

For example, the controller 268 may include instructions to optimize or maximize the amount of electrical power generated. Based on the temperatures of each fluid received from a heat source and/or the temperature of working fluid flowing from each heat exchanger, the controller 268 may increase (e.g., via control valves or flow control devices) the amount of working fluid flowing to heat exchangers with higher temperatures, thus increasing the overall temperature of the working fluid and thereby generating an increased amount of electrical power in the ORC unit 246. In another embodiment, the controller 268 may include instructions to increase engine efficiency. In such examples, the controller may increase (e.g., via control valves or flow control devices) the amount of working fluid flowing to heat exchanger 212 associated with the water jacket 206. In yet another embodiment, the controller 268 may include instructions to lower the temperature of the drilling fluid to the lowest potential temperature by increasing the flow of working fluid to the heat exchanger 218 associated with the drilling fluid borehole return 202. Such working fluid flow rate adjustments may be made or performed intermittently or continuously. In a further example, an adjustment to a particular working fluid flow rate may be performed and then temperatures, flow rates, and/or other characteristics may be determined. Further adjustments may be performed and temperatures, flow rates, and/or other characteristics may be determined again. Such operations may be performed until the temperature of the flow of gas and/or the working fluid is at a desired temperature, with a selected operating range or window, and/or steady-state temperature.

Figure 2H:
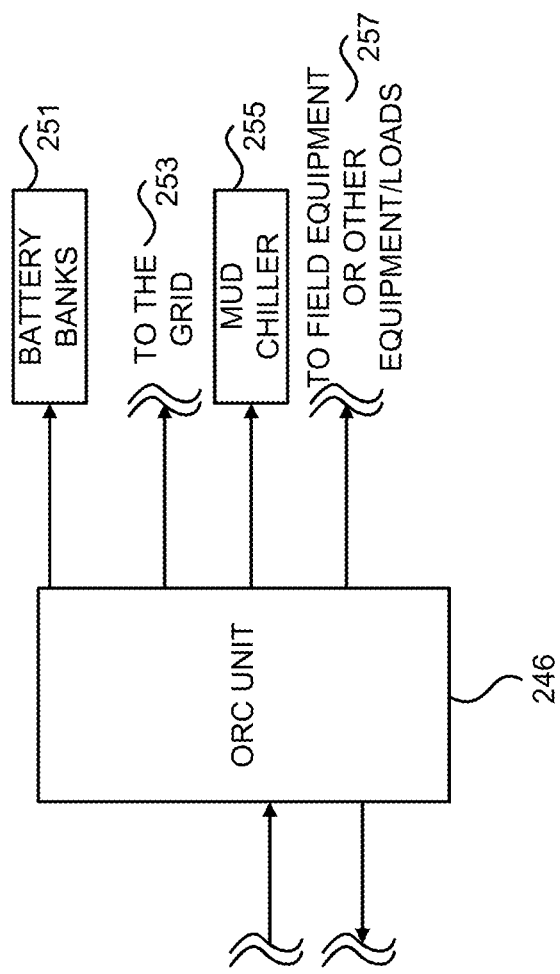

In FIG. 2H and as noted, the ORC unit 246 may produce electricity based on received heated working fluid. The ORC unit 246, in an embodiment, may provide electrical power to battery banks 251 or other energy storage devices, to the grid 253, to a mud chiller 255, and/or to field equipment or other equipment/loads 257.

In an embodiment, the site may include a warm supply manifold and a warm return manifold, for controlling the flow of warm working fluid from warm water heat exchangers (e.g., working fluid from the heat exchangers associated with the drilling fluid borehole return 202, fluid from the water jacket 206, and/or fluid from another heat source 238) to a warm fluid intake/outtake of the ORC unit 246. The site may also include a hot supply manifold and a hot return manifold, for controlling the flow of hot working fluid from hot water heat exchangers (e.g., working fluid from the heat exchangers associated with the drilling fluid borehole return 202, exhaust from the engine exhaust port 204, fluid from the water jacket 206, and/or fluid from another heat source 238) to a hot fluid intake/outtake of the ORC unit 246.

FIG. 3 is a simplified diagram illustrating a control system for managing electrical power production at a drilling rig, according to one or more embodiments of the disclosure. A master controller 302 may manage the operations of electrical power generation at a facility during gas compression. The master controller 302 may be one or more controllers, a supervisory controller, programmable logic controller (PLC), a computing device (such as a laptop, desktop computing device, and/or a server), an edge server, a cloud based computing device, and/or other suitable devices. The master controller 302 may be located at or near the drilling rig. The master controller 302 may be located remote from the facility. The master controller 302, as noted, may be more than one controller. In such cases, the master controller 302 may be located near or at the drilling rig, various facilities and/or at other off-site locations. The master controller 302 may include a processor 304, or one or more processors, and memory 306. The memory 306 may include instructions. In an example, the memory 306 may be a non-transitory machine-readable storage medium. As used herein, a "non-transitory machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. As noted, the memory 306 may store or include instructions executable by the processor 304. As used herein, a "processor" may include, for example one processor or multiple processors included in a single device or distributed across multiple computing devices. The processor may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

As used herein, "signal communication" refers to electric communication such as hard wiring two components together or wireless communication for remote monitoring and control/operation, as understood by those skilled in the art. For example, wireless communication may be Wi-Fi®, Bluetooth®, ZigBee, cellular wireless communication, satellite communication, or forms of near field communications. In addition, signal communication may include one or more intermediate controllers or relays disposed between elements that are in signal communication with one another.

The master controller 302 may include instructions 308 to measure the temperature at various points at the drilling rig or at the site. For example, the temperature at the inlet of one or more heat exchangers may be measured or sensed from one or more heat exchanger temperature sensors 320A and up to 320N. In another embodiment, the temperature at the outlet of one or more heat exchangers may be measured from one or more heat exchanger temperature sensors 320A and up to 320N. In another embodiment, temperature sensors may be positioned at both the inlet and outlet of the heat exchanger. The master controller 302 may further include instructions 312 to measure the amount of electrical power output from the ORC unit 330. In an embodiment, the drilling rig or at the site may include one or more ORC units and, in such examples, each ORC unit may connect to the master controller 302 to provide, among other information or data, the amount of electrical power output over time.

The master controller 302 may further connect to one or more heat exchanger valves 326A, 326B, and up to 326N and working fluid valves 328A, 328B, and up to 328N. The master controller 302 may include instructions 310 to adjust each of these valves based on various factors. For example, if the temperature measured from one of the heat exchangers is below a threshold or outside of a selected operating temperature range or window and/or if the ambient temperature from the ambient temp sensor 322 is above a preselected threshold, then the master controller 302 may transmit a signal causing one or more of the heat exchanger valves 326A, 326B, up to 362N to close. Such a threshold may be defined by the temperature sufficient to ensure the ORC unit generates an amount of electrical power. The operating temperature range or window may be defined by an operating temperature of the ORC unit and/or by the lowest and highest potential temperature of the flow of drilling fluid. The ambient threshold may be defined by an ambient temperature at which engine performance may degrade and/or drilling fluid may not cool sufficiently. In another example, based on a heat exchanger inlet temperature and an outlet temperature, the master controller 302 may adjust, via a signal transmitted to, one of the one or more of the heat exchanger valves 326A, 326B, and up to 326N and/or working fluid valves 328A, 328B, and up to 328N. The master controller 302 may consider other factors (e.g., temperature, pressure, flow rate, density, composition, etc.) as described herein.

The master controller 302 may include instructions 306 to measure the working fluid temperature via a sensor (e.g., via one or more heat exchanger temperature sensors 322). The master controller 302 may include instructions 310 to adjust the flow of working fluid to any one of the one or more heat exchangers based on the measured temperatures. The flow of the working fluid may be adjusted by the master controller 302, as noted, based on various temperature measurements of the working fluid, via one or more working fluid flow control devices (e.g., working fluid valves 328A, 328B, up to 328N) and/or a master flow control device. In an embodiment, the adjustment of the flow of working fluid may occur to adjust the temperature of the flow of gas through a corresponding heat exchanger.

As noted, the master controller 302 may adjust the amount of working fluid flowing to each of the heat exchangers based on an aspect of the drilling rig to be optimized. For example, adjustment of a working fluid valve (e.g., working fluid valves 328A, 328B, and/or up to 328N) associated with the drilling fluid may cause a decrease in the temperature of the drilling fluid to thereby decrease cooling via a mud chiller and to further thereby decrease overall electrical power utilized at the drilling rig. Adjustment of a second working fluid control valve (e.g., working fluid valves 328A, 328B, and/or up to 328N) may cause an increase in working fluid flow to the heat exchanger associated with the exhaust output from the engine, thereby causing an increase in overall electrical power generated by the ORC unit due to the high heat of the exhaust and to thereby optimize engine and generator set performance. Adjustment of a third working fluid flow control device (e.g., working fluid valves 328A, 328B, and/or up to 328N) may cause an increase in working fluid flow to the water jacket heat exchanger thereby causing an increase in engine performance due to increased heat transfer from the engine to the working fluid. Various adjustments may be made over varying time intervals, the temperatures or other characteristic of the drilling rig to be measured at each interval and further adjustments made. Finally, the master controller 302 may maximize each aspect of the drilling rig or maximize one or more aspect based on other factors. For example, the master controller 302 may maximize the electrical power generated by the ORC unit during peak hours of electrical power usage of the drilling rig. In other words, when the most electrical power is utilized by equipment at the drilling rig, then the master controller 302 may adjust working fluid control valves, such that the most heat is transferred to the working fluid thereby enabling the ORC unit to generate the most electrical power. In another example, during off-peak hours, the master controller 302 may adjust the working fluid to heat exchangers such that enough electrical power is generated to supply the electrical power requirements during such off-peak hours.

In an embodiment, the master controller 302 may connect to a user interface 332. A user may interact with the master controller 302 via the user interface 332. The user may manually enter each of the thresholds, the operating temperature ranges or windows, or some aspect to optimize described herein and/or may manually adjust any of the control valves described herein.

Figure 4A:
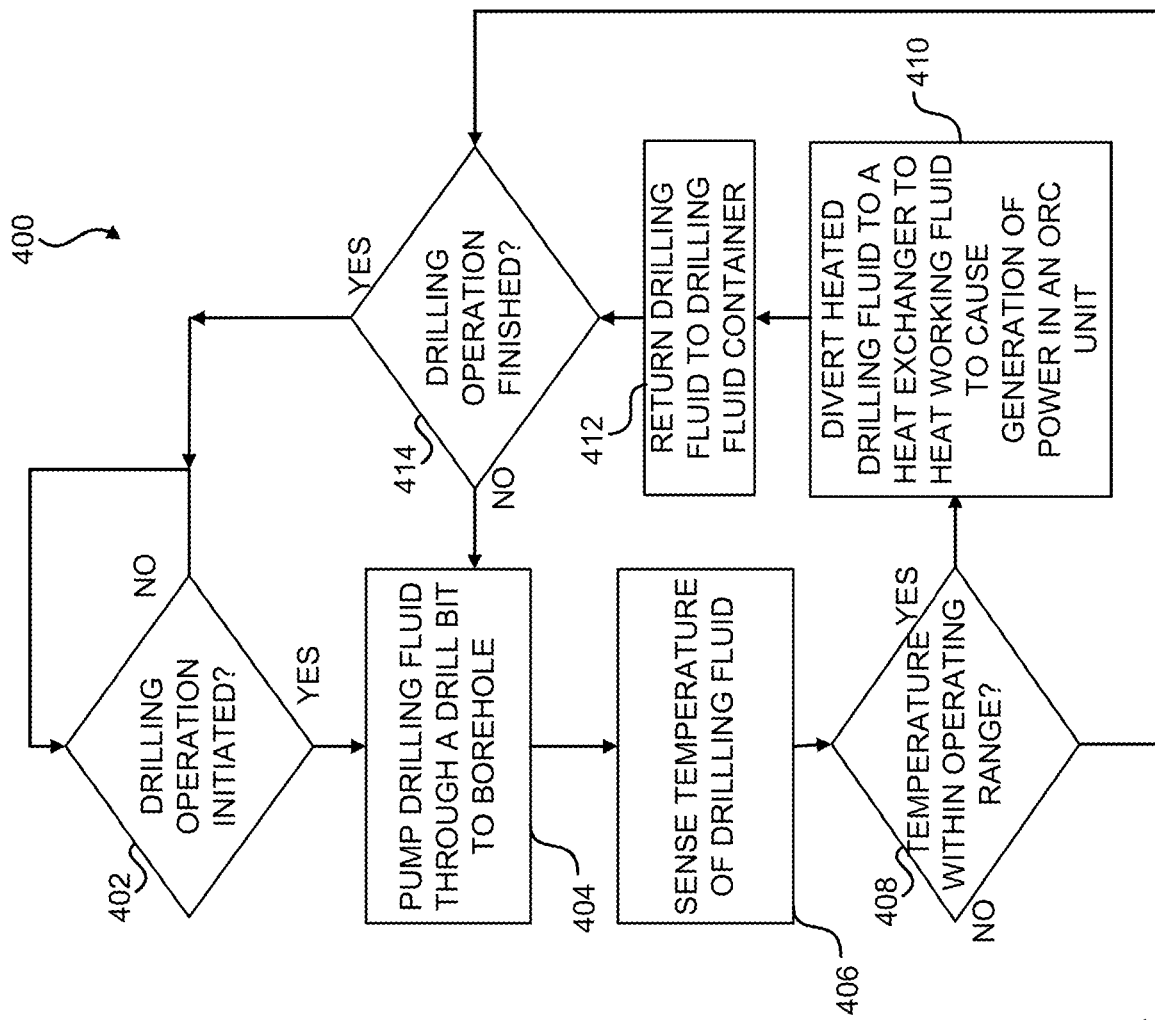
FIG. 4A, FIG. 4B, and FIG. 4C are flow diagrams of methods of electrical power generation in which, during a drilling operation, working fluid is heated via one or more of drilling fluid or drilling mud, engine exhaust, and/or water (or other fluid) jacket fluid flow, according to one or more embodiments of the disclosure.

FIG. 4A is a flow diagram of electrical power generation in which, during a drilling operation, working fluid is heated via one or more of drilling fluid or drilling mud, engine exhaust, and/or water jacket fluid flow, according to one or more embodiments of the disclosure. The method is detailed with reference to the master controller 302 and the drilling rig 100 of FIGS. 1A through 1C. Unless otherwise specified, the actions of method 400 may be completed within the master controller 302. Specifically, method 400 may be included in one or more programs, protocols, or instructions loaded into the memory of the master controller 302 and executed on the processor or one or more processors of the master controller 302. The order in which the operations are described is not intended to be construed as a limitation, and any number of the described blocks may be combined in any order and/or in parallel to implement the methods.

Turning to FIG. 4A, at block 402, the master controller 302 may determine whether a drilling operation is occurring. If a drilling operation is not occurring, the master controller 402 may wait and perform such a determination may be performed again. If a drilling operation is occurring or has begun, the master controller 302 may proceed to perform the next operation.

At block 404, a pump may pump drilling fluid through and around a drill bit thereby cooling the drill bit. The drilling fluid may then flow up a borehole to a drilling fluid return pipe.

At block 406, the master controller 302 may determine or sense a temperature of the drilling fluid, for example, via a drilling fluid return temperature sensor. In an embodiment, other aspects of the drilling fluid or any other fluid may be determined.

At block 408, the master controller 302 may determine whether the temperature of the drilling fluid is within a range or window. The range or window may be defined by a maximum operating temperature of the first heat exchanger and a minimum temperature at which ORC equipment generates electricity.

At block 410, if the temperature is above or below of a range, the master controller 302 may determine if the drilling operation is finished or still occurring. If the temperature is within the range or window, the master controller 302 may adjust a divert a drilling fluid to a drilling fluid heat exchanger via a drilling fluid control valve. The drilling fluid control valve may partially or fully divert a portion of the exhaust produced by the engine. In another embodiment, the exhaust control valve may be adjusted to maintain the first heat exchanger. In another embodiment, other aspects may be considered when adjusting a drilling fluid control valve, such as an amount of electrical power generated, temperature of an engine, temperature of an engine's exhaust, temperature of fluid from a water jacket, and so on. In such embodiments, in addition to adjusting the amount of drilling fluid flowing to a heat exchanger, the amount of working fluid flowing to that particular heat exchanger may be adjusted (e.g., an increase in working fluid causing greater heat transfer from the drilling fluid to the working fluid and a decrease in working fluid causing lesser heat transfer from the drilling fluid to the working fluid). In other words, the temperature of the drilling fluid may be controlled based on the amount of working fluid flowing through the corresponding heat exchanger.

At block 412, the drilling fluid may be returned to the drilling fluid container from the heat exchanger. At block 414, the master controller 302 may determine whether the drilling operation is finished. If the drilling operation is finished, the master controller 302 may wait until another drilling operation begins. If the drilling operation is not finished, the master controller 302 may perform method 400 again, for the duration of a drilling operation.

Figure 4B:
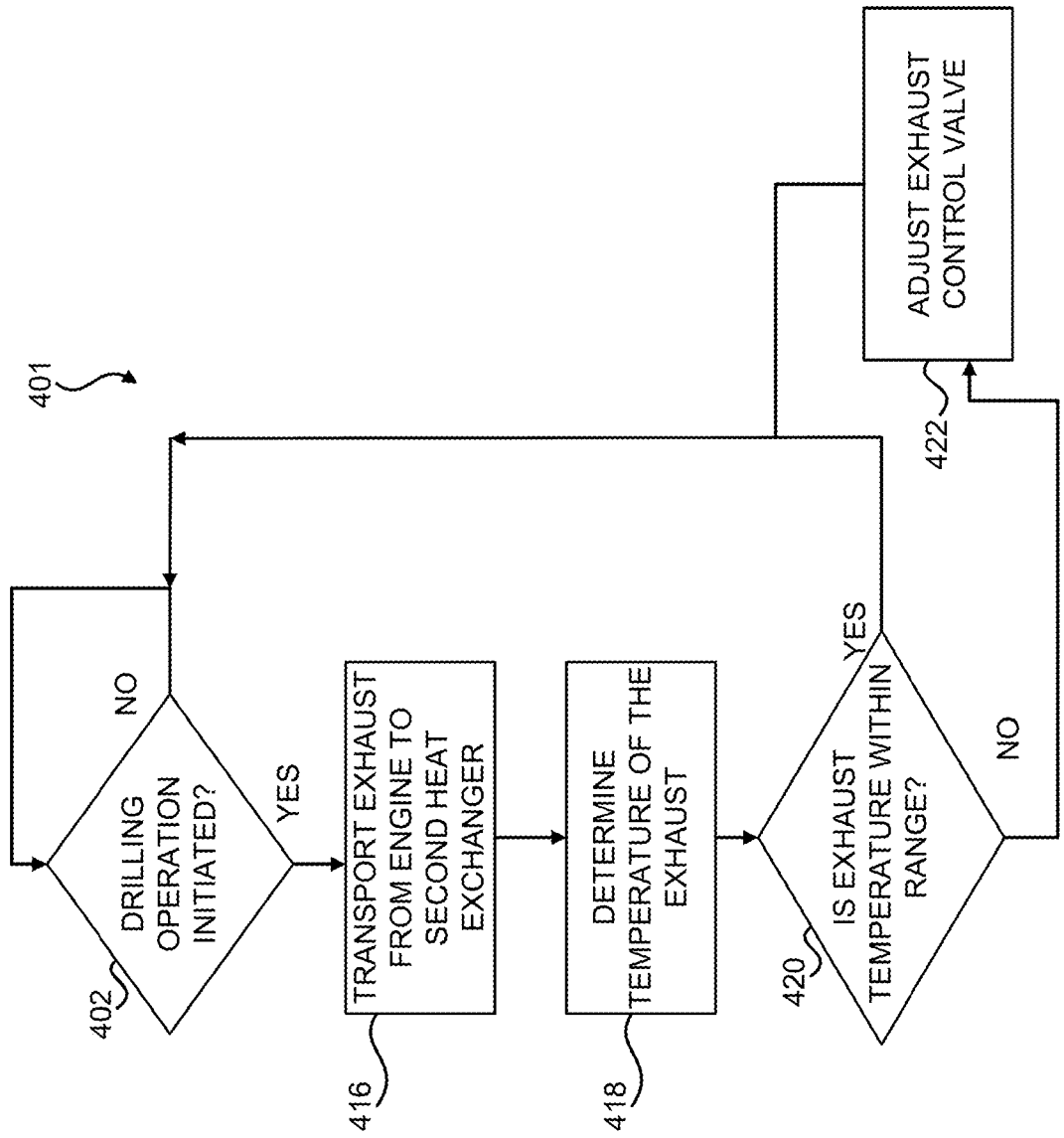
Figure 4C:
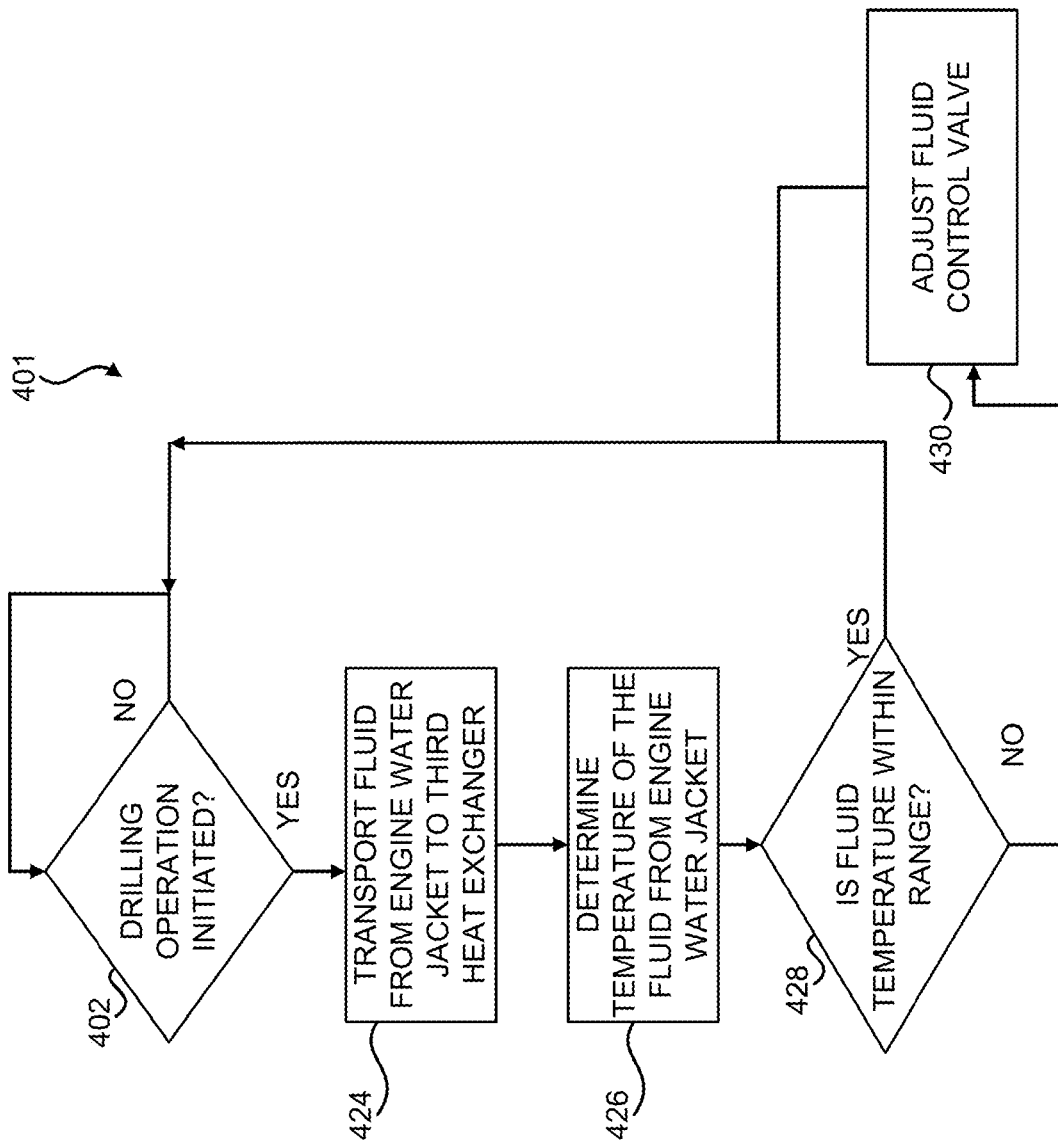

FIGS. 4B and 4C are flow diagrams of electrical power generation in which, during drilling operations, working fluid is heated via engine exhaust and/or water jacket fluid flow, according to one or more embodiment of the disclosure. The method is detailed with reference to the master controller 302 and drilling rig 100 of FIGS. 1A through 1C. Unless otherwise specified, the actions of method 401 may be completed within the master controller 302. Specifically, method 900 may be included in one or more programs, protocols, or instructions loaded into the memory of the master controller 302 and executed on the processor or one or more processors of the master controller 302. The order in which the operations are described is not intended to be construed as a limitation, and any number of the described blocks may be combined in any order and/or in parallel to implement the methods.

Turning to FIG. 4B, at block 402, the master controller 302 may determine whether a drilling operation is occurring. If a drilling operation is not occurring, the master controller 402 may wait and perform such a determination may be performed again. If a drilling operation is occurring or has begun, the master controller 302 may proceed to perform the next operation.

At block 416, fluid (e.g., exhaust) produced by the engine may be transported to a second heat exchanger. The second heat exchanger may facilitate heat transfer from the fluid (e.g., exhaust) to a working fluid or intermediate working fluid. The heated working fluid or intermediate working fluid may be utilized by an ORC unit to generate electrical power during an ORC operation. The working fluid or intermediate working fluid may be considered warm or hot and may be utilized in a warm or low temperature ORC operation or a hot or high temperature ORC operation, respectively.

At block 418, the master controller 302 may sense or determine the temperature of the exhaust. The master controller 302 may sense or determine the temperature of the exhaust via a temperature sensor.

At block 420, the master controller 302 may determine whether the temperature or thermal mass of the exhaust is within a range or window. The range or window may be defined by a maximum operating temperature or thermal mass of the first heat exchanger and a minimum temperature or thermal mass at which ORC equipment generates electricity.

At block 422, if the temperature or thermal mass is within a range, the master controller 302 may re-execute or perform method 401 again. If the temperature or thermal mass is above or below the range or window, the master controller 302 may adjust an exhaust control valve. The exhaust control valve may partially or fully divert a portion of the exhaust produced by the engine. In another embodiment, the exhaust control valve may be adjusted to maintain the second heat exchanger. Over time, scaling or depositions of particulates in the exhaust may build. As such, the second heat exchanger may be cleaned or maintained to remove the buildup and, during such cleaning or maintenance, the exhaust control valve may be fully closed. Once the second heat exchanger has been maintained, the exhaust control valve may be adjusted to allow the exhaust to flow to the second heat exchanger. In another embodiment, a portion of the exhaust may be diverted (e.g., via the exhaust control valve) from the second heat exchanger to limit the amount of scaling and/or deposition of particulates. In yet another embodiment, the exhaust control valve may be adjusted to prevent interruption of catalyst performance.

In another embodiment, the amount of electricity generated may be adjusted based on adjustment of working fluid flowing to the heat exchanger corresponding to the exhaust. Since the exhaust is output from the engine at a high temperature, the amount of heat transferred to the working fluid may be high. However, a temperature of the working fluid may produce a maximum amount of electrical power. The master controller 302 may, based on such data, adjust the working fluid flowing to the heat exchanger corresponding to the exhaust.

Turning to FIG. 4B, at block 402, the master controller 302 may determine whether a drilling operation is occurring. If a drilling operation is not occurring, the master controller 402 may wait and perform such a determination may be performed again. If a drilling operation is occurring or has begun, the master controller 302 may proceed to perform the next operation.

At block 424, fluid from a water jacket may be transported to a third heat exchanger. The third heat exchanger may facilitate heat transfer from the fluid of the water jacket to a working fluid or intermediate work fluid. The heated working fluid or intermediate working fluid may be utilized by an ORC unit to generate electrical power during an ORC operation. The working fluid or intermediate working fluid may be considered warm or hot and may be utilized in a warm or low temperature ORC operation or a hot or high temperature ORC operation, respectively.

At block 426, the master controller 302 may determine whether the temperature of the fluid from the water jacket is within a range or window. The range or window may be defined by a maximum operating temperature mass of the third heat exchanger and a minimum temperature at which ORC equipment generates electricity.

At block 428, if the temperature of the fluid from the water jacket is within a range, the master controller 302 may re-execute or perform method 401 again. If the temperature of the fluid from the water jacket is above or below the range or window, the master controller 302 may adjust water jacket control valve. The water jacket control valve may partially or fully divert a portion of the fluid from the water jacket. In another embodiment, the water jacket control valve may be adjusted to maintain the third heat exchanger. In another embodiment, the performance of the engine may be maximized based on adjustment of working fluid flowing to the heat exchanger corresponding to the fluid from the water jacket.

FIG. 5 is a flow diagram of electrical power generation in which, during a drilling operation, working fluid is heated via one or more fluids from heat sources, according to one or more embodiments of the disclosure. The method is detailed with reference to the master controller 302 and the drilling rig 100 of FIGS. 1A through 1C. Unless otherwise specified, the actions of method 500 may be completed within the master controller 302. Specifically, method 500 may be included in one or more programs, protocols, or instructions loaded into the memory of the master controller 302 and executed on the processor or one or more processors of the master controller 302. The order in which the operations are described is not intended to be construed as a limitation, and any number of the described blocks may be combined in any order and/or in parallel to implement the methods.

At block 502, the master controller 302 and/or a user may begin a drilling operation. In an embodiment, when a drilling operation begins, the master controller 302 may receive a signal indicating that the drilling operation has begun. In another embodiment, the activation or use of pumps, control valves, engines, and/or other drilling rig equipment may indicate to the master controller 302 that a drilling rig has begun. In yet another embodiment, a user may indicate that a drilling operation has begun via the user interface 332.

At block 504, the master controller 302 may check or determine, at varying points during the drilling operation, whether the drilling operation has finished or has been completed. The master controller 302 may, if the drilling operation is ongoing, proceed to the next block in an operation or process (e.g., block 506). In another embodiment, the master controller 302 may, if the drilling operation has finished or has been completed, proceed back to block 502 and wait until another or a next drilling operation has begun. The master controller 302 may determine that a drilling operation is complete if one or more different equipment at the drilling rig is not being utilized or not operating. For example, if a drilling fluid or mud pump is not operating, the master controller 302 may determine that the drilling operation has completed or has been paused. In another embodiment, a user may indicate that a drilling operation is complete or paused via the user interface 332. In yet another embodiment, the master controller 302 may determine that a drilling operation is ongoing based on the flow and/or other characteristics of various fluids at the drilling rig (e.g., a flow of drilling fluid, flow of exhaust, a flow of fluid from an engine water or fluid jacket, temperatures of various fluids, etc.).

At block 506, the master controller 302 or a user may select one or more fluids, each of the fluids corresponding to one or more heat sources at a drilling rig. As noted, a drilling rig may include various sources of heat. For example, an engine, during operation, may produce heated exhaust.

Further, as the engine operates, the engine's temperature may increase. Such a temperature increase may decrease the overall life of consumables and/or parts of the engine. To prevent such a decrease, the engine may include a water jacket or fluid jacket (e.g., a jacket utilizing a fluid capable of transporting heat from the engine) to cool the engine via circulation of water or fluid within the jacket and a heat sink or other cooling equipment. The drilling rig may include other heat sources, such as heated drilling fluid from a borehole. One or more of the fluids associated with these various heat sources may each flow through added or installed heat exchangers at the site (e.g., a heat exchanger for drilling fluid, one or more heat exchangers corresponding to one or more engines for exhaust, one or more heat exchangers corresponding to one or more engines for fluid from a fluid jacket, and/or heat exchangers for other sources).

The master controller 302 and/or a user may determine which heat source and/or associated or corresponding heat exchanger to utilize for ORC operations (e.g., selecting a heat source). Such a selection may be based on the temperature of the fluid flowing from the heat source and whether the temperature is within an operating range of the ORC unit and/or of a corresponding heat exchanger. The selection may also be based on flow rates of the fluid and whether the flow rate is sufficient to facilitate heat transfer from the fluid to a working fluid in the associated or corresponding heat exchanger. For example, the flow rate may be at such a rate to prevent sufficient heat transfer. The selection may be based on the thermal mass of the fluid and whether the thermal mass is within operating range of the associated or corresponding heat exchanger. Other factors may be utilized in such selections, such as a desired, specified, selected, or pre-selected electrical power output; the ambient temperature at the drilling rig; whether engine optimization, electrical power output maximization, and/or electrical power utilization (e.g., off-setting equipment power use) is sought; a number and type of available heat exchangers at the drilling rig; and/or among other environmental factors at the drilling rig.

In an embodiment, based on the choice of fluid to be utilized for ORC operations, corresponding heat exchanger valves may be opened or closed. For example, if engine exhaust and fluid from the fluid jacket is chosen, then heat exchanger valves configured to divert fluid from normal fluid pathways or pipeline to a corresponding heat exchanger may be opened (e.g., heat exchanger valves corresponding to fluid pathways or pipeline for the exhaust and fluid from the fluid jacket), while other heat exchanger valves may be closed (e.g., a heat exchanger valve corresponding to the fluid pathway or pipeline for the drilling fluid). The heat exchanger valves may be opened or closed based on signals transmitted via the master controller 302 or manually by a user. Other various combinations of heat sources may be selected.

For example, if a user or if the master controller 302 selects one or more fluids based on electrical power utilization, then the master controller 302 may select the drilling fluid, in addition to engine exhaust and/or fluid from a fluid jacket. In such examples, the drilling fluid may be cooled to a specified or preselected temperature via a corresponding heat exchanger and then further cooled via a mud chiller. The mud chiller may utilize electrical power, thus, to ensure electrical power utilization is optimized, the amount of working fluid flowing to the heat exchanger corresponding to the drilling fluid may be increased, the amount of drilling fluid flowing through the heat exchanger may be increased, and/or the electrical power generated by the ORC unit may be directed to or utilized by the mud chiller.

In another example, if a user or if the master controller 302 selects one or more fluids based on engine optimization or performance, then the master controller 302 may select the fluid from the fluid jacket, as well as, in some embodiments, to engine exhaust. In such examples, to ensure that the engine operates efficiently, the fluid from the fluid jacket may pass through a corresponding heat exchanger and the working fluid flowing to that heat exchanger may be increased, thus cooling the fluid in the fluid jacket to a lower than typical temperature. After passing through the heat exchanger the fluid in the fluid jacket may pass through a heat sink or other cooler typically used in such components thereby further cooling the fluid. The cooled fluid may then flow to the fluid jacket and cool the engine. The engine may be cooled more than typical due to the lower temperature fluid in the fluid jacket. Exhaust may be utilized to generate additional electrical power (e.g., additional to the electrical power generated via the fluid in the fluid jacket). The additional electrical power may be utilized by equipment at the drilling rig, thus allowing the engine to operate at lower speeds or operate for a reduced time thereby reducing engine wear, extending or increasing engine life, and/or extending or increasing generator set life.

In another example, if a user or if the master controller 302 selects one or more fluids based on electrical power generated, then the master controller 302 may select the exhaust from the engine, as well any other heat source. Since exhaust typically has a high thermal mass and temperature, the exhaust may be utilized to generate substantial amounts of electrical power. Any other heat source selected may be based on the temperature of the heat source (e.g., higher temperature heat sources being selected first).

In another example, if a user or if the master controller 302 selects one or more fluids based on drilling fluid temperature, then the master controller 302 may select the drilling fluid, as well as engine exhaust and/or fluid from a fluid jacket. In such examples, the drilling fluid may be cooled to a specified or preselected temperature via a corresponding heat exchanger and then further cooled via a mud chiller. The cooled drilling fluid may ensure that bottom-hole assembly components operate longer (e.g., extending the life span of the components).

At block 508, the master controller 302 may sense an ambient temperature at a drilling rig. One or more ambient temperature sensors may be positioned at various points throughout the drilling rig. For example, an ambient temperature sensor may be positioned proximate to or nearby the engine. Another ambient temperature sensor may be positioned at a preselected distance from the engine and/or at a location where heat is not generated to thereby produce an actual ambient temperature of the environment or atmosphere at the drilling rig. Other ambient temperature sensors may be positioned throughout the drilling rig. Each of the one or more ambient temperature sensors may provide a signal to the master controller 302. The signal may indicate the temperature at the location where the ambient temperature is disposed or positioned.

At block 510, the master controller 302 may sense the temperature of each selected fluid. In such examples, temperature sensors may be positioned nearby, within, or proximate to a pipeline, conduit, or fluid path corresponding to the selected fluid. The temperature sensor may be positioned upstream of the heat exchanger (e.g., prior to where the selected fluid enters the heat exchanger). The master controller 302 may utilize temperature or other characteristics or aspects of the selected fluid from other sensors positioned throughout the drilling rig, such as temperature sensors positioned downstream of the heat exchangers, flow meters positioned upstream and/or downstream of the heat exchangers, pressure sensors or transducers positioned upstream and/or downstream of the heat exchangers, and/or other sensors positioned throughout the drilling rig.

At block 512, the master controller 302 may sense the temperature of working fluid associated with each of the selected fluids. In such examples, temperature sensors may be positioned nearby, within, or proximate to a pipeline, conduit, or fluid path corresponding to working fluid associate with or corresponding to a selected fluid. The temperature sensor may be positioned upstream or downstream of the heat exchanger (e.g., prior to where the working fluid enters the heat exchanger or subsequent to where the working fluid exits the heat exchanger). The master controller 302 may utilize temperature or other aspects or characteristics of the working fluid from other sensors positioned throughout the drilling rig, such as flow meters positioned upstream and/or downstream of the heat exchangers, pressure sensors or transducers positioned upstream and/or downstream of the heat exchangers, and/or other sensors positioned throughout the drilling rig.

At block 514, the master controller 302 may determine an amount electrical power utilized. In an embodiment, one or more ORC units may be positioned at the drilling rig. The ORC units may be configured to generate a range of electrical power. The upper range or maximum amount of electrical power of the ORC unit may be known or may be provided to the master controller 302. Further, the master controller 302 may be in signal communication with each component or equipment at the drilling rig that utilizes electrical power. The master controller 302 may determine the amount of electrical power utilized by each of the components or equipment. As such, the master controller 302 may determine the total amount of electrical power utilized at the drilling rig at an any particular time interval or on an ongoing basis.

At block 516, the master controller 302 may determine whether any selected fluid is outside a specified operating range. The operating range may be defined by the operating temperature of the corresponding heat exchanger (e.g., the highest temperature which a heat exchanger may be able to withstand and/or the lowest temperature at which heat transfer to a working fluid is facilitated) and/or the ORC unit (e.g., the temperature of fluid at which the ORC unit generates electrical power or the maximum amount of electrical power). The operating range may include or may be defined by temperatures to optimize various aspects of electrical power generation and/or engine performance at the drilling rig. For example, the fluid selected (e.g., at block 506) may be based on optimizing a certain aspect, such as engine optimization or performance, electrical power generated, drilling fluid temperature, and/or electrical power utilization (e.g., off-setting electrical power use at the drilling rig). If any of the selected fluids are outside of the specified operating range, then the method 500 may proceed to block 524, otherwise the method 500 may proceed to block 518.

At block 518, the master controller 302 may determine whether the ambient temperature exceeds a threshold. The threshold may be defined by a temperature at which an engine's performance degrades and/or a temperature at which drilling fluid may not be cooled sufficiently. If the ambient temperature exceeds the threshold, then the method 500 may proceed to block 524, otherwise the method 500 may proceed to block 520.

At block 520, the master controller 302 may determine whether the electrical power utilized at the drilling rig exceeds a threshold. The threshold may be defined by the maximum amount of electrical power generated by the ORC unit. The threshold may be defined by an arbitrary amount of electrical power or by the maximum amount of electrical power generated by the ORC unit plus an amount of electrical power utilized or an amount of electrical power allowable from a fossil fuel based generator set. If the electrical power utilized exceeds the threshold, then the method 500 may proceed to block 524, otherwise the method 500 may proceed to block 522.

At block 522, the master controller 302 may determine whether the working fluid for each selected fluid is within an operating range. The operating range may be defined by a temperature of working fluid at which an ORC unit generates electrical power and a temperature of working fluid at which the ORC unit generates a maximum amount of electrical power. If the working fluid is within the operating range, then the method 500 may proceed to block 504, otherwise the method 500 may proceed to block 524.

At block 524, the master controller 302 may adjust each working fluid flow control device associated with each selected fluid. The working fluid flow control device may control an amount of working fluid flowing to a heat exchanger. The adjustment of the position of each working fluid flow control device may be based on the various temperatures and/or other aspects, as well as whether an aspect exceeds a threshold and/or is within an operating range. For example, if the working fluid associated with a heat exchanger corresponding to drilling fluid is lower than the smallest value of the operating range of the ORC unit, then the corresponding working fluid flow control device may be closed. In such an example and in other examples, an increase in working fluid flowing to a heat exchanger may increase facilitation of heat from a fluid to the working fluid, while a decrease in working fluid flowing to a heat exchanger may decrease the facilitation of heat from a fluid to the working fluid.

At block 526, the master controller 302 may adjust each heat exchanger valve associated with each selected fluid. The valve associated with a specified heat exchanger may control the amount of a selected fluid flowing to a heat exchanger. The adjustment of the position of each valve may be based on the various temperatures and/or other aspects, as well as whether an aspect exceeds a threshold and/or is within an operating range. For example, if the selected fluid associated with a heat exchanger is lower than the least value of the operating range of the ORC unit, then the corresponding valve may be closed. In such an example and in other examples, an increase in a selected fluid flowing to a heat exchanger may increase facilitation of heat transfer from the selected fluid to the working fluid, while a decrease in selected fluid flowing to the heat exchanger may decrease the facilitation of heat from the selected fluid to the working fluid.

In an embodiment, after all adjustments are made the method 500 may be performed again or until the drilling operation has finished. Further, the master controller 302 may wait a preselected interval of time between each sensing or measurement of temperature and/or other aspects or characteristics and adjustment. The preselected interval of time may be sufficient to allow temperatures to stabilize (e.g., after adjustment, temperatures may vary due to such adjustments, thus the master controller 302 may wait until temperatures and/or other aspects are stabilized). The preselected interval of time may be about 30 seconds, about 1 minute, about 5 minutes, about 15 minutes, about 30 minutes, or longer.

Figure 6:
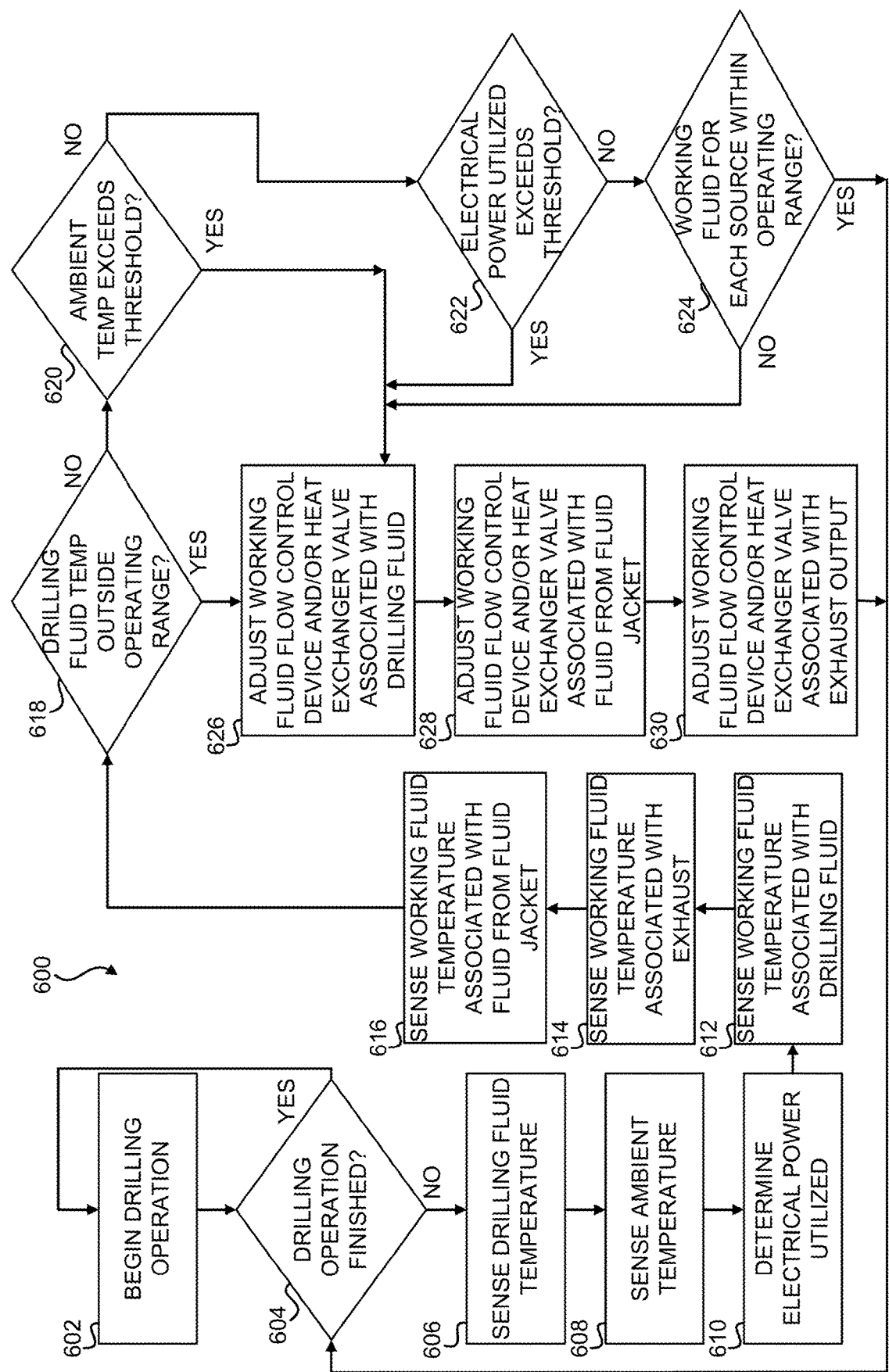
FIG. 6 is a flow diagram of a method of electrical power generation in which, during a drilling operation, working fluid is heated via one or more of drilling fluid or drilling mud, engine exhaust, and/or water (or other fluid) jacket fluid flow, according to one or more embodiments of the disclosure.

FIG. 6 is a flow diagram of electrical power generation in which, during a drilling operation, working fluid is heated via one or more fluids from heat sources, according to one or more embodiments of the disclosure. The method is detailed with reference to the master controller 302 and the drilling rig 100 of FIGS. 1A through 1C. Unless otherwise specified, the actions of method 600 may be completed within the master controller 302. Specifically, method 600 may be included in one or more programs, protocols, or instructions loaded into the memory of the master controller 302 and executed on the processor or one or more processors of the master controller 302. The order in which the operations are described is not intended to be construed as a limitation, and any number of the described blocks may be combined in any order and/or in parallel to implement the methods.

At block 602, the master controller 302 and/or a user may begin a drilling operation. In an embodiment, when a drilling operation begins, the master controller 302 may receive a signal indicating that the drilling operation has begun. In another embodiment, the activation or use of pumps, control valves, engines, and/or other drilling rig equipment may indicate to the master controller 302 that a drilling rig has begun. In yet another embodiment, a user may indicate that a drilling operation has begun via the user interface 332.

At block 604, the master controller 302 may check or determine, at varying points during the drilling operation, whether the drilling operation has finished or has been completed. The master controller 302 may, if the drilling operation is ongoing, proceed to the next block in an operation or process (e.g., block 506). In another embodiment, the master controller 302 may, if the drilling operation has finished or has been completed, proceed back to block 502 and wait until another or a next drilling operation has begun. The master controller 302 may determine that a drilling operation is complete if one or more different equipment at the drilling rig is not being utilized or not operating. For example, if a drilling fluid or mud pump is not operating, the master controller 302 may determine that the drilling operation has completed or has been paused. In another embodiment, a user may indicate that a drilling operation is complete or paused via the user interface 332. In yet another embodiment, the master controller 302 may determine that a drilling operation is ongoing based on the flow of various fluids at the drilling rig (e.g., a flow of drilling fluid, exhaust, fluid from an engine water or fluid jacket, etc.).

At block 606, the master controller 302 may sense a drilling fluid temperature. In such an embodiment, a temperature sensor may be positioned along a drilling fluid return pipeline. The temperature sensor may provide a signal to the master controller 302 indicating the temperature of the drilling fluid.

At block 608, the master controller 302 may sense an ambient temperature at a drilling rig. One or more ambient temperature sensors may be positioned at various points throughout the drilling rig. For example, an ambient temperature sensor may be positioned proximate to or nearby the engine. Another ambient temperature sensor may be positioned at a preselected distance from the engine and/or at a location where heat is not generated to thereby produce an actual ambient temperature of the environment or atmosphere at the drilling rig. Other ambient temperature sensors may be positioned throughout the drilling rig. Each of the one or more ambient temperature sensors may provide a signal to the master controller 302. The signal may indicate the temperature at the location where the ambient temperature is disposed or positioned.

At block 610, the master controller 302 may determine an amount electrical power utilized at the drilling rig. In an embodiment, one or more ORC units may be positioned at the drilling rig. The ORC units may be configured to generate a range of electrical power. The upper range or maximum amount of electrical power of the ORC unit may be known or may be provided to the master controller 302. Further, the master controller 302 may be in signal communication with each component or equipment at the drilling rig that utilizes electrical power. The master controller 302 may determine the amount of electrical power utilized by each of the components or equipment. As such, the master controller 302 may determine the total amount of electrical power utilized at the drilling rig at an any particular time interval or on an ongoing basis. In another embodiment, in addition to or rather than the determination of electrical power utilized, the master controller 302 may determine an amount of electrical power generated by a generator set.

At block 612, may sense a working fluid temperature associated with drilling fluid. In such an embodiment, a temperature sensor may be positioned proximate to an outlet where working fluid exits the heat exchanger. An additional temperature sensor may be positioned at an inlet where working fluid enters the heat exchanger. The temperature sensors may provide signals to the master controller 302 indicating the temperature of the working fluid.

At block 614, may sense a working fluid temperature associated with exhaust. In such an embodiment, a temperature sensor may be positioned proximate to an outlet where working fluid exits the heat exchanger. An additional temperature sensor may be positioned at an inlet where working fluid enters the heat exchanger. The temperature sensors may provide signals to the master controller 302 indicating the temperature of the working fluid.

At block 616, may sense a working fluid temperature associated with fluid from the fluid jacket. In such an embodiment, a temperature sensor may be positioned proximate to an outlet where working fluid exits the heat exchanger. An additional temperature sensor may be positioned at an inlet where working fluid enters the heat exchanger.

In an embodiment, additional temperature sensors and/or other types of sensors may be included or positioned throughout the drilling rig. For example, the temperature of the exhaust and/or the fluid from the fluid jacket may be sensed prior to entry into or after exit from the heat exchanger.

At block 618, the master controller 302 may determine whether the drilling fluid is outside an operating range. The operating range may be defined by a temperature at which heat transferred to working fluid may cause the ORC unit to generate electrical power. Other temperatures of other fluids (e.g., exhaust and/or fluid from the fluid jacket) may be considered. If the temperature of the drilling fluid is outside of the specified operating range, then the method 600 may proceed to block 620, otherwise the method 600 may proceed to block 626.

At block 620, the master controller 302 may determine whether the ambient temperature exceeds a threshold. The threshold may be defined by a temperature at which an engine's performance degrades and/or a temperature at which drilling fluid may not be cooled sufficiently. If the ambient temperature exceeds the threshold, then the method 600 may proceed to block 622, otherwise the method 600 may proceed to block 626.

At block 622, the master controller 302 may determine whether the electrical power utilized at the drilling rig exceeds a threshold. The threshold may be defined by the maximum amount of electrical power generated by the ORC unit. The threshold may be defined by an arbitrary amount of electrical power (e.g., the amount set by a user or the master controller 302) or by the maximum amount of electrical power generated by the ORC unit plus an amount of electrical power utilized or an amount of electrical power allowable from a fossil fuel based generator set. If the electrical power utilized exceeds the threshold, then the method 500 may proceed to block 524, otherwise the method 500 may proceed to block 522.

At block 624, the master controller 302 may determine whether the working fluid for each heat source (e.g., the drilling fluid, the exhaust, and/or the fluid from a fluid jacket) is within an operating range. The operating range may be defined by a temperature of working fluid at which an ORC unit generates electrical power and a temperature of working fluid at which the ORC unit generates a maximum amount of electrical power. If the working fluid is within the operating range, then the method 600 may proceed to block 604, otherwise the method 600 may proceed to block 626.

At block 626, the master controller 302 may adjust the amount of working fluid flowing to the heat exchanger associated with the drilling fluid and/or the amount of drilling fluid flowing to the heat exchanger. By adjusting the amount of working fluid and drilling fluid flowing through the heat exchanger, the temperature of the working fluid and/or the drilling fluid may be controlled. Such adjustments may occur based on which block of the method precedes block 626. For example, if the temperature of the drilling fluid is outside of the operating range, such as at a temperature to not sufficiently transfer heat to working fluid to generate electrical power in the ORC unit, then the working fluid flow and the drilling fluid to the heat exchanger may be prevented (e.g., corresponding valves closed).

At block 628, the master controller 302 may adjust the amount of working fluid flowing to the heat exchanger associated with the fluid from the fluid jacket and/or the amount of fluid from the fluid jacket flowing to the heat exchanger. By adjusting the amount of working fluid and fluid from the fluid jacket flowing through the heat exchanger, the temperature of the fluid from the fluid jacket and/or the working fluid may be controlled. For example, if engine performance is prioritized and ambient temperature is above a threshold, then working fluid flow to the heat exchanger associated with fluid from the fluid jacket may be increased to thereby further cool the fluid from the fluid jacket.

At block 630, the master controller 302 may adjust the amount of working fluid flowing to the heat exchanger associated with the exhaust and/or the amount of exhaust flowing to the heat exchanger. By adjusting the amount of working fluid and exhaust flowing through the heat exchanger, the temperature of the working fluid may be controlled. For example, if electrical power generation is prioritized, after checking electrical power utilization and generation, working fluid flow to the heat exchanger associated with exhaust may be increased, thereby increasing the temperature of the working fluid and increasing electrical power output by the ORC unit. The master controller 302 may, after adjustment, perform method 600 until the drilling operation is finished.

This application is a non-provisional of and claims priority to and the benefit of U.S. Provisional Application No. 63/269,862, filed Mar. 24, 2022, titled "Systems and Methods for Generation of Electrical Power at a Drilling Rig," and U.S. Provisional Application No. 63/269,572, filed Mar. 18, 2022, titled "Systems and Methods for Generation of Electrical Power at a Drilling Rig," U.S. Provisional Application No. 63/261,601, filed Sep. 24, 2021, titled "Systems and Methods Utilizing Gas Temperature as a Power Source," and U.S. Provisional Application No. 63/200,908, filed Apr. 2, 2021, titled "Systems and Methods for Generating Geothermal Power During Hydrocarbon Production," the disclosures of all of which are incorporated herein by reference in their entireties. This application also is a continuation-in-part of U.S. Non-Provisional application Ser. No. 17/305,297, filed Jul. 2, 2021, titled "Systems for Generating Geothermal Power in an Organic Rankine Cycle Operation During Hydrocarbon Production Based on Working Fluid Temperature," which claims priority to and the benefit of U.S. Provisional Application No. 63/200,908, filed Apr. 2, 2021, titled "Systems and Methods for Generating Geothermal Power During Hydrocarbon Production," the disclosures of all of which are incorporated herein by reference in their entireties. This application further is a continuation-in-part of U.S. Non-Provisional application Ser. No. 17/578,520, filed Jan. 19, 2022, titled "Systems and Methods Utilizing Gas Temperature as a Power Source," which claims priority to and the benefit of U.S. Provisional Application No. 63/261,601, filed Sep. 24, 2021, titled "Systems and Methods Utilizing Gas Temperature as a Power Source," and U.S. Provisional Application No. 63/200,908, filed Apr. 2, 2021, titled "Systems and Methods for Generating Geothermal Power During Hydrocarbon Production," the disclosures of all of which are incorporated herein by reference in their entireties. This application also further is a continuation-in-part of U.S. Non-Provisional application Ser. No. 17/578,528, filed Jan. 19, 2022, titled "Systems and Methods Utilizing Gas Temperature as a Power Source," which claims priority to and the benefit of U.S. Provisional Application No. 63/261,601, filed Sep. 24, 2021, titled "Systems and Methods Utilizing Gas Temperature as a Power Source," and U.S. Provisional Application No. 63/200,908, filed Apr. 2, 2021, titled "Systems and Methods for Generating Geothermal Power During Hydrocarbon Production," the disclosures of all of which are incorporated herein by reference in their entireties. The application still further is a continuation-in-part of U.S. Non-Provisional application Ser. No. 17/578,542, filed Jan. 19, 2022, titled "Systems and Methods Utilizing Gas Temperature as a Power Source," which claims priority to and the benefit of U.S. Provisional Application No. 63/261,601, filed Sep. 24, 2021, titled "Systems and Methods Utilizing Gas Temperature as a Power Source," and U.S. Provisional Application No. 63/200,908, filed Apr. 2, 2021, titled "Systems and Methods for Generating Geothermal Power During Hydrocarbon Production," the disclosures of all of which are incorporated herein by reference in their entireties. This application additionally is a continuation-in-part of U.S. Non-Provisional application Ser. No. 17/578,550, filed Jan. 19, 2022, titled "Systems and Methods Utilizing Gas Temperature as a Power Source," which claims priority to and the benefit of U.S. Provisional Application No. 63/261,601, filed Sep. 24, 2021, titled "Systems and Methods Utilizing Gas Temperature as a Power Source," and U.S. Provisional Application No. 63/200,908, filed Apr.

2, 2021, titled "Systems and Methods for Generating Geothermal Power During Hydrocarbon Production," the disclosures of all of which are incorporated herein by reference in their entireties. The application is also a continuation-in-part of U.S. Non-Provisional application Ser. No. 17/650,811, filed Feb. 11, 2022, titled "Systems for Generating Geothermal Power in an Organic Rankine Cycle Operation During Hydrocarbon Production Based on Wellhead Fluid Temperature," which is a continuation of U.S. Non-Provisional application Ser. No. 17/305,298, filed Jul. 2, 2021, titled "Controller for Controlling Generation of Geothermal Power in an Organic Rankine Cycle Operation During Hydrocarbon Production," now U.S. Pat. No. 11,280,322, issued Mar. 22, 2022, which claims priority to and the benefit of U.S. Provisional Application No. 63/200,908, filed Apr. 2, 2021, titled "Systems and Methods for Generating Geothermal Power During Hydrocarbon Production," the disclosures of all of which are incorporated herein by reference in their entireties. This application further still is a continuation-in-part of U.S. Non-Provisional application Ser. No. 17/670,827, filed Feb. 14, 2022, titled "Systems and Methods for Generation of Electrical Power in an Organic Rankine Cycle Operation," which is a continuation-in-part of U.S. Non-Provisional application Ser. No. 17/305,296, filed Jul. 2, 2021, titled "Controller for Controlling Generation of Geothermal Power in an Organic Rankine Cycle Operation During Hydrocarbon Production," now U.S. Pat. No. 11,255,315, issued Feb. 22, 2022, which claims priority to and the benefit of U.S. Provisional Application No. 63/200,908, filed Apr. 2, 2021, titled "Systems and Methods for Generating Geothermal Power During Hydrocarbon Production," the disclosures of all of which are incorporated herein by reference in their entireties. This application yet further is a continuation-in-part of U.S. Non-Provisional application Ser. No. 17/682,126, filed Feb. 28, 2022, titled "Systems and Methods for Generation of Electrical Power in an Organic Rankine Cycle Operation," which is a continuation of U.S. Non-Provisional application Ser. No. 17/494,936, filed Oct. 6, 2021, titled "Systems and Methods for Generation of Electrical Power in an Organic Rankine Cycle Operation," now U.S. Pat. No. 11,293,414, issued Apr. 5, 2022, which is a continuation-in-part of U.S. Non-Provisional application Ser. No. 17/305,296, filed Jul. 2, 2021, titled "Controller for Controlling Generation of Geothermal Power in an Organic Rankine Cycle Operation During Hydrocarbon Production," now U.S. Pat. No. 11,255,315, issued Feb. 22, 2022, which claims priority to and the benefit of U.S. Provisional Application No. 63/200,908, filed Apr. 2, 2021, titled "Systems and Methods for Generating Geothermal Power During Hydrocarbon Production," the disclosures of all of which are incorporated herein by reference in their entireties.

In the drawings and specification, several embodiments of systems and methods to provide electrical power from heat of a flow of gas and/or other source have been disclosed, and although specific terms are employed, the terms are used in a descriptive sense only and not for purposes of limitation. Embodiments of systems and methods have been described in considerable detail with specific reference to the illustrated embodiments. However, it will be apparent that various modifications and changes can be made within the spirit and scope of the embodiments of systems and methods as described in the foregoing specification, and such modifications and changes are to be considered equivalents and part of this disclosure.

What is claimed is:

1. A system for generating power in an Organic Rankine Cycle (ORC) operation in the vicinity of a drilling rig during drilling operations, the system comprising:
    a drilling fluid container to store an amount of drilling fluid;
    a container pipe including a first end and a second end, the first end of the container pipe positioned in fluid communication with the drilling fluid container;
    a drilling fluid pump positioned in fluid communication with the second end of the container pipe;
    a drilling fluid pipe including a first end and a second end, the first end of the drilling fluid pipe connected to the drilling fluid pump, the drilling fluid pump to pump drilling fluid therethrough;
    a drill string including a proximal end, a distal end, an outer surface, and an inner surface, the proximal end of the drill string connected to the second end of the drilling fluid pipe, the drill string inner surface configured so as to define a cavity and the drilling fluid to flow therethrough;
    a drill bit connected to the distal end of the drill string and positioned to rotate based on rotation of the drill string and flow of the drilling fluid;
    a drilling fluid return pipe positioned above a subsurface geological formation and connected to an annulus defined by an inner surface of a borehole and the outer surface of the drill string;
    a heat exchanger connected to drilling fluid return pipe, the heat exchanger to facilitate heat transfer from the drilling fluid to a working fluid flow; and
    an ORC unit to generate electrical power using heat from the working fluid flow.

2. The system of claim 1, wherein the ORC unit includes a generator, a gas expander, a condenser, an internal heat exchanger, and a loop for the flow of working fluid, the loop defined by a fluid path through the condenser, gas expander, and a first fluid path of the internal heat exchanger, the internal heat exchanger including a second fluid path to connect to the heat exchanger and the working fluid flowing therethrough, the internal heat exchanger to transfer heat indirectly from the working fluid to the working fluid, thereby to cause the organic working fluid to change phases from a liquid to a vapor, the flow of the vapor to cause the generator to generate electrical power via rotation of a gas expander as defined by an ORC operation, the condenser to cool the flow of the organic working fluid so as to cause the organic working fluid to change phases from the vapor to the liquid.

3. The system of claim 1, further comprising:
    a pump engine to drive the drilling pump;
    one or more generation sets to generate electrical power for use at the drilling rig; and
    one or more engines connected to the one or more generation sets and to drive the one or more generation sets.

4. The system of claim 3, wherein the pump engine and one or more engines produce exhaust, and wherein each of the pump engine and one or more engines include exhaust outlets, and the system further comprising:
    one or more exhaust conduits including a first end and a second end, each of the one or more exhaust conduit first ends positioned in fluid communication with each of the exhaust outlets of the pump engine and one or more engines; and an exhaust manifold to connect to each of the one or more exhaust conduit second ends, the exhaust from each of the pump engine and one or more engines to aggregate therein.

5. The system of claim 4, further comprising:
one or more exhaust heat exchangers (a) to connect to the exhaust manifold, (b) to receive aggregated exhaust from each of the pump engine and one or more engines, and (c) configured to facilitate heat transfer from exhaust to a second working fluid.

6. The system of claim 5, further comprising:
one or more fluid jackets, each of the one or more fluid jackets corresponding to one of the pump engine and one or more engines and positioned to cool the one of the pump engine and one or more engines during drilling operation; and
one or more fluid jacket heat exchangers in fluid communication with one of the one or more fluid jackets and configured to facilitate heat transfer from fluid within the fluid jacket to a third working fluid, and wherein the drilling fluid includes aggregate from the drill bit when flowing therethrough.

7. A system for generating power in the vicinity of a drilling rig during drilling operations, the system comprising:
a drilling fluid container to store an amount of drilling fluid;
a container pipe including a first end and a second end, the first end of the container pipe positioned in fluid communication with the drilling fluid container;
a drilling fluid pump in fluid communication with the second end of the container pipe;
a drilling fluid pipe including a first end and a second end, the first end of the drilling fluid pipe connected to the drilling fluid pump, the drilling fluid pump to pump drilling fluid therethrough;
a drill string including a proximal end, a distal end, an outer surface, and an inner surface, the proximal end of the drill string connected to the second end of the drilling fluid pipe, the drill string inner surface configured so as to define a cavity for drilling fluid to flow therethrough;
a drill bit connected to the distal end of the drill string, the drill bit to rotate based on rotation of the drill string and flow of the drilling fluid;
a drilling fluid return pipe positioned above a subsurface geological formation and connected to an annulus defined by an inner surface of a borehole and the outer surface of the drill string, the drilling fluid including aggregate from the drill bit when flowing therethrough;
a heat exchanger connected to drilling fluid return pipe, the heat exchanger to facilitate heat transfer from the drilling fluid to a working fluid flow; and
a power generation unit to generate electrical power by use of the heat transferred to the working fluid flow.

8. The system of claim 7, further comprising:
a heat exchanger valve positioned on the drilling fluid return pipe to one or more (a) divert drilling fluid to heat exchanger or (b) allow drilling fluid to flow to a drilling fluid tank.

9. The system of claim 8, wherein the heat exchanger valve position is based on one or more of a temperature of the drilling fluid entering the drilling fluid return pipe and a temperature of the working fluid flow exiting the heat exchanger, and wherein the power generation unit comprises an Organic Rankine Cycle (ORC) unit.

10. A system to generate power in the vicinity of a drilling rig, the system comprising:
a drilling fluid container to store an amount of drilling fluid;
a container pipe including a first end and a second end, the first end of the container pipe positioned in fluid communication with the drilling fluid container;
a drilling fluid pump in fluid communication with the second end of the container pipe;
a drilling fluid pipe including a first end and a second end, the first end of the drilling fluid pipe connected to the drilling fluid pump, the drilling fluid pump to pump drilling fluid therethrough;
a drill string including a proximal end, a distal end, an outer surface, and an inner surface, the proximal end of the drill string connected to the second end of the drilling fluid pipe, the drill string inner surface configured so as to define a cavity for drilling fluid to flow therethrough;
a drill bit connected to the distal end of the drill string, the drill bit to rotate based on rotation of the drill string and flow of the drilling fluid;
a drilling fluid return pipe positioned above a subsurface geological formation and connected to an annulus defined by an inner surface of a borehole and the outer surface of the drill string;
a heat exchanger connected to drilling fluid return pipe, the heat exchanger to facilitate heat transfer from the drilling fluid to a working fluid flow; and
a power generation unit to generate electrical power by use of the heat transferred to the working fluid flow.

11. The system of claim 10, further comprising:
a heat exchanger valve positioned on the drilling fluid return pipe to one or more (a) divert drilling fluid to heat exchanger or (b) allow drilling fluid to flow to a drilling fluid tank.

12. The system of claim 11, wherein the heat exchanger valve position is based on one or more of a temperature of the drilling fluid entering the drilling fluid return pipe and a temperature of the working fluid flow exiting the heat exchanger, and wherein the power generation unit comprises an Organic Rankine Cycle (ORC) unit.

13. The system of claim 10, wherein the drilling fluid includes aggregate from the drill bit when flowing therethrough.

14. A controller to control electrical power generated in an Organic Rankine Cycle (ORC) operation in the vicinity of a drilling rig during drilling operations, the controller comprising:
an input in signal communication with a drilling fluid return pipe sensor to provide a temperature of a drilling fluid entering a drilling fluid return pipe and flowing from the drilling fluid return pipe to a drill string and to a drill bit connected to the drill string, the drill bit positioned to rotate based on one or more of rotation of the drill string and flow of the drilling fluid; and
a set of inputs/outputs in signal communication with a heat exchanger valve and a working fluid flow control device, the controller configured to:
in response to the drilling fluid being within an operating range, transmit one or more signals (a) to adjust the heat exchanger valve's position to thereby divert drilling fluid to a heat exchanger, the heat exchanger to facilitate transfer of heat from the drilling fluid to a working fluid flow, the heat transferred to the working fluid to cause an ORC unit to generate electricity or (b) to adjust the working fluid flow control device, thereby to control an amount of heat transferred to the working fluid flow.

15. The controller of claim 14, further comprising:
a second input in signal communication with a heat exchanger working fluid outlet temperature sensor, the heat exchanger working fluid outlet temperature sensor to provide a working fluid outlet temperature of a working fluid flow from the heat exchanger, and
wherein adjustment of the one or more of (a) heat exchanger valve's position or (b) working fluid flow control device further is based on the working fluid outlet temperature.

16. The controller of claim 15, wherein the controller further is configured to adjust the working fluid flow control device, thereby to cause an increase in working fluid flow to the drilling fluid heat exchanger and to cause a decrease in the temperature in drilling fluid, decrease cooling via a mud chiller, and decrease overall electrical power utilized at the drilling rig.

17. The controller of claim 14, wherein the controller further is configured to adjust opened and closed positions of the heat exchanger valve, thereby to allow continuous diversion of the drilling fluid to the heat exchanger, facilitate transfer of heat from heated drilling fluid to a flow of working fluid, and generate cooled drilling fluid.

18. The system of claim 1, further comprising:
a heat exchanger valve positioned on the drilling fluid return pipe configured to divert or allow amounts of the drilling fluid to flow to the heat exchanger or the drilling fluid container.

19. The system of claim 6, further comprising:
a supply manifold (a) connected to an output of each of the heat exchanger, the one or more exhaust heat exchanger, and the one or more fluid jacket heat exchangers and the ORC unit and (b) configured to (1) combine the working fluid flow, the second working fluid, and third working fluid, thereby to define a combined working fluid and (2) supply the combined working fluid to the ORC unit.

20. The system of claim 19, further comprising:
a return manifold (a) connected to an input of each of the heat exchanger, the one or more exhaust heat exchanger, and the one or more fluid jacket heat exchangers and to the ORC unit and (b) configured to distribute cooled working fluid from the ORC unit to the input of each of the heat exchanger, the one or more exhaust heat exchanger, and the one or more fluid jacket heat exchangers.

21. The system of claim 20, wherein the return manifold further is configured to control an amount of the cooled working fluid flowing from the ORC unit to the input of each of the heat exchanger, the one or more exhaust heat exchanger, and the one or more fluid jacket heat exchangers based on one or more of an amount of electrical power utilized at the drilling rig, engine performance, engine life expectancy, drill bit life expectancy, or ambient temperature.

22. The system of claim 13, further comprising a filter (a) positioned along the drilling fluid return pipeline and (b) configured to remove the aggregates from the drilling fluid flowing therethrough prior to the drilling fluid flowing into the heat exchanger, and
wherein the heat exchanger connects to the drilling fluid container, and
wherein drilling fluid flowing through the heat exchanger flows to the drilling fluid container.

* * * * *